United States Patent [19]

Grewal et al.

[11] Patent Number: 4,689,815
[45] Date of Patent: Aug. 25, 1987

[54] CONTROLLING MULTI-PORT HUNT GROUPS IN A DISTRIBUTED CONTROL SWITCHING SYSTEM

[75] Inventors: Kalwant S. Grewal, Long Valley, N.J.; Michael R. Ordun, Randolph, Ill.; Zoe S. Quan, Chicago, Ill.; Albert J. Sawyer; Elbert L. Sneed, Jr., both of Wheaton, Ill.

[73] Assignee: American Telephone and Telegraph Company, AT&T Bell Laboratories, Murray Hill, N.J.

[21] Appl. No.: 768,820

[22] Filed: Aug. 23, 1985

[51] Int. Cl.[4] .............................................. H04Q 3/42
[52] U.S. Cl. ..................................... 379/269; 379/274
[58] Field of Search ........ 179/18 AB, 18 ES, 18 HA; 370/58, 66, 68; 379/269, 274, 284, 220

[56] References Cited

U.S. PATENT DOCUMENTS

| | | | |
|---|---|---|---|
| 3,643,032 | 2/1972 | Ulrich et al. | 379/269 |
| 3,860,761 | 1/1975 | O'Neill, Jr. | 370/54 |
| 4,256,926 | 3/1981 | Pitroda et al. | 379/269 |
| 4,259,549 | 3/1981 | Stehman | 379/204 |
| 4,317,962 | 3/1982 | Cox et al. | 370/58 |
| 4,322,843 | 3/1982 | Beuscher et al. | 370/63 |
| 4,340,776 | 7/1982 | Ganz et al. | 178/3 |
| 4,421,955 | 12/1983 | Mori et al. | 379/269 |
| 4,442,321 | 4/1984 | Stehman | 379/220 |

OTHER PUBLICATIONS

H. Takeda et al., "Time Division Switching Control System", *Review of the Electrical Communication Laboratories*, vol. 27, No. 9–10, Sep.–Oct., 1979, pp. 773–782.
G. Becker et al., "Call Processing in a Distributed Control System", ICC '80 Conference Record, vol. 3 of 3, Jun. 8–12, 1980, pp. 46.4.1–46.4.7.
D. Jackson and K. Patfield, "Impacts of Multiprocessing on GTD-5 EAX Call Processing and Operating System", ISS '81 CIC Montreal, 21–25 Sep. 1981, pp. 1–7.
M. Akiyama et al., "Time Division Distributed Switching System", ISS '81 CIC Montreal, 21–25 Sep. 1981, pp. 1–7.
U.S. patent application of M. M. Chodrow et al., Case 1-1-3-4, "Switching System Having Remote Switching Capability", Ser. No. 493,683, Filed May 11, 1983.
U.S. patent application of S. Chang et al., Case 6-1-1-3, "Controlling Multi-Port Hunt Groups in a Distributed Control Switching System", Ser. No. 699,462, Filed Feb. 7, 1985.

*Primary Examiner*—Thomas W. Brown
*Attorney, Agent, or Firm*—Ross T. Watland

[57] ABSTRACT

A distributed control switching system where multi-port hunt groups are controlled by hunting for idle group members in a sequential fashion starting with the members on one of the switching modules of the system and continuing through a predetermined sequence of modules until an idle group member is found. The busy/idle hunt data is distributed across the modules so that each module maintains the hunt data for only the group members on that module. Therefore, no inter-module control communication is devoted to updating the hunt data of other modules.

21 Claims, 45 Drawing Figures

16-BIT DATA WORD
(PRIOR ART)

ROUTING PROGRAM
(PRIOR ART)

| RTREQ | PATHDES, RTGDATA, DIALDATA, GPI, TREAT, ... |

| LNTREQ | PATHDES, RTGDATA, FARPID, GPI, ... |

| TKTREQ | PATHDES, RTGDATA, FARPID, GPI, DIGDATA, ... |

| ANTREQ | PATHDES, RTGDATA, FARPID, GPI, ... |

*(PRIOR ART)*
FIG. 14

RTREQ MESSAGE

| RDBLK | HEADER, TEXT, ORIGTPI, RTGSTATE, RICOUNT, ... |

| CFBLK | FIXEDRI, SCRNING, DNTRAN, ROUTING, ... |

| GRPBLK | PORTGROUP, MHG, LNSTAT, GROUPPORT, TRKG, TKOWNER, TKQUE, TKSTAT, ... |

GPI

| TERMBLK | MODULE, PORT, GRPNUM, MEMBER, ... |

*(PRIOR ART)*
FIG. 15

| | |
|---|---|
| FIXEDRI | TREAT,RI,··· |
| SCRNING | DI,SI,PI,RI,NOC,ROUTETYPE,··· |
| DNTRAN | DN,TERMCLASS,GPI,··· |
| ROUTING | RI,GRPNUM,SECRI,··· |
| PORTGROUP | GPI,GRPNUM,MEMBER,··· |
| GROUPPORT | GRPNUM,MEMBER,GPI,··· |

*(PRIOR ART)*
*FIG. 16*

| MHG | GRPNUM,HTYPE··· |
| LNSTAT | GRPNUM,GMFLAG··· |

*(PRIOR ART)*
FIG. 17

| TRKG | GRPNUM,HTYPE··· |
| TKOWNER | GRPNUM,QKEY··· |
| TKQUE | QKEY,GPI,NIM···· |
| TKSTAT | GRPNUM,GMFLAG··· |

*(PRIOR ART)*
FIG. 18

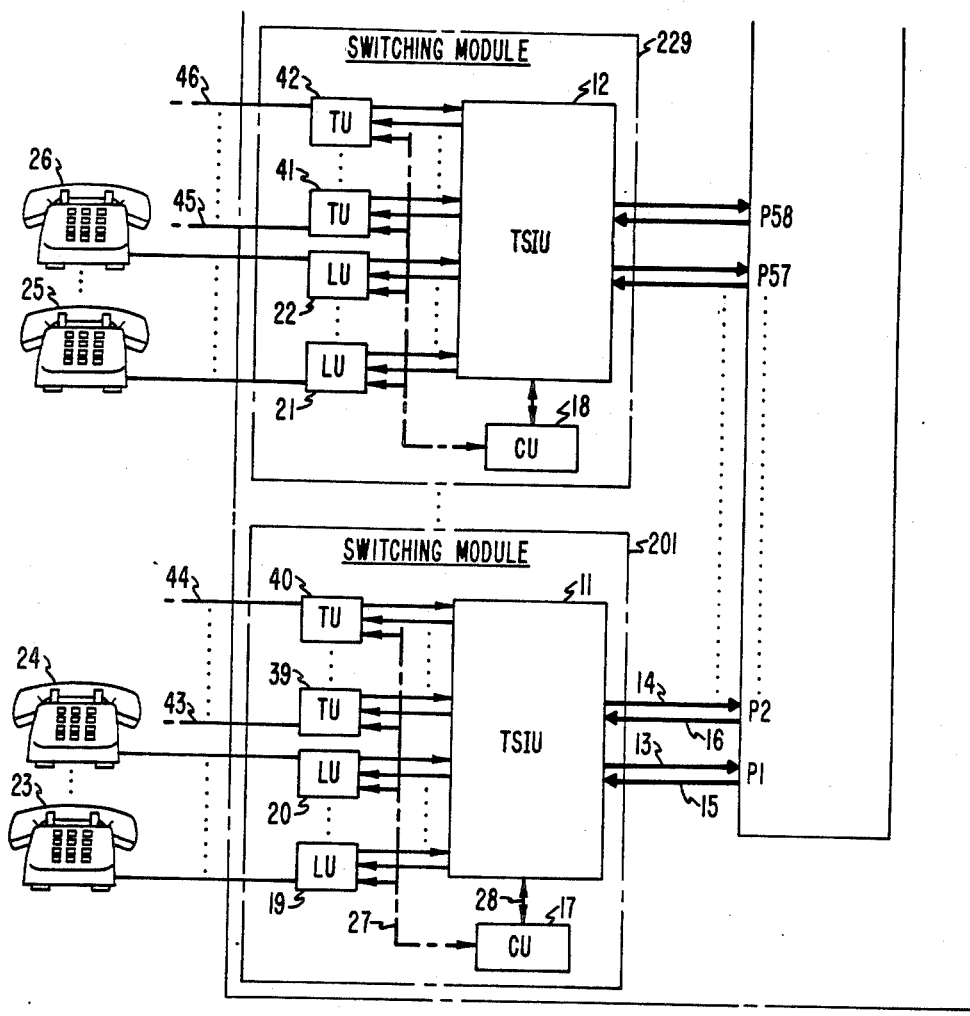
FIG. 19   SYSTEM II
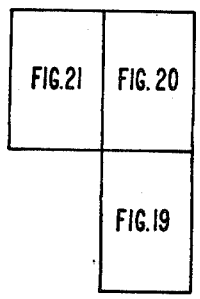
FIG. 22

ROUTING PROGRAM

| RTGEN | PATHDES,RTGDATA,FARPID,REQTERM,RTCONTDA,ORIGGPI,TERMGPI··· |
|---|---|
| RDBLK | HEADER,TEXT,ORIGGPI,RTGSTATE,RICOUNT,RTSEQ,SWREQ,··· |
| MHG | GRPNUM,HTYPE,MODULE,··· |
| TRKG | GRPNUM,HTYPE,MODULE,··· |
| PORTSTATUS | GPI,BUSY/IDLE,CF,SC,··· |

FIG. 32

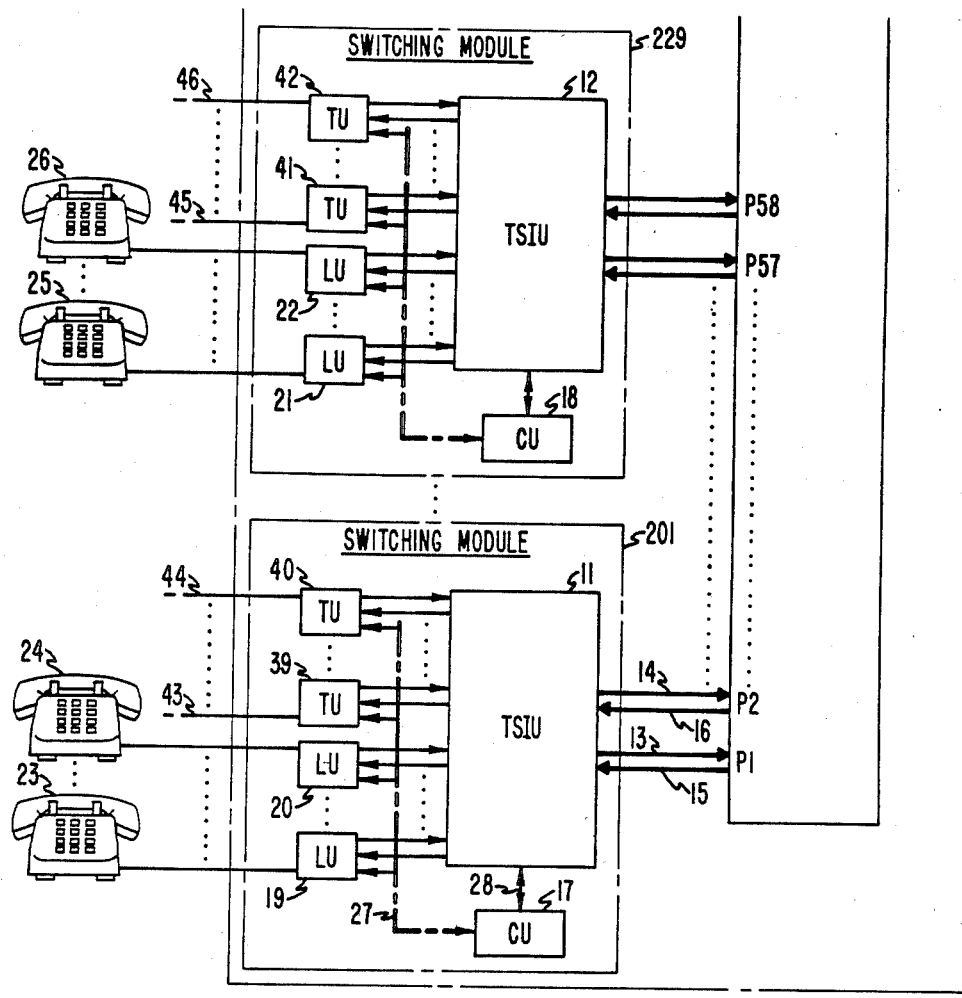
FIG. 33    SYSTEM III
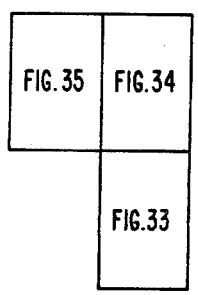
FIG. 36

| CLIDAT | CLID, MOD1, MOD2, MOD3, MOD4 |
|---|---|
| | 1 , 501, 502, 503, 504 |
| | ⋮ ⋮ ⋮ ⋮ ⋮ |

| RDBLK | HEADER,TEXT,ORIGGPI,RTGSTATE,RTSEQ,SWREQ,JUMPS |
|---|---|

| KEYLIST | GPI |
|---|---|

| HUNTKEYS | KEYGPI,KEYTYPE,BUSYGPI |
|---|---|

*FIG. 38*

ROUTING PROGRAM

CONTROLLING MULTI-PORT HUNT GROUPS IN A DISTRIBUTED CONTROL SWITCHING SYSTEM

TECHNICAL FIELD

This invention relates to distributed control switching systems and, more particularly, to the control of multi-port hunt groups, i.e., multi-line and trunk hunt groups, in such systems.

BACKGROUND OF THE INVENTION

Stored program controlled switching systems have traditionally included a central computer that controlled switching functions in response to a program stored in memory. Although recent switching systems have distributed the call processing function among a number of system control units, many of the time-consuming tasks involved in call setup are still typically performed by a central control. For example, in one known digital switching system, the switching function is distributed among a plurality of switching modules. Each switching module has a plurality of ports and provides connections among the lines and trunks connected to the ports of that module. Calls involving lines or trunks connected to different modules are completed through a time multiplexed switch that interconnects the modules. Each switching module includes a control unit that controls the switching function of that module. The system also includes a central control that controls the switching function of the time-multiplexed switch. Call handling in such systems requires the execution of a number of functions in addition to establishing connections. Although many of the real-time intensive tasks associated with calls, e.g., signal processing, are performed by the switching module control units, others, notably the determination of the identity of the terminating port of the switching system for each call, are performed by the system central control. The terminating port determination function includes such steps as call screening, determining whether a line or a trunk is required, translating dialed numbers into physical system addresses and hunting for idle members of trunk groups or multi-line hunt groups. These are time-consuming tasks which involve extensive database searching and data manipulation.

One of the important advantages of a modular system of this type is that its capacity can be closely matched to the requirements of specific applications. However, as the system becomes larger and the number of switching modules increases, the performance by the system central control of the per-call tasks associated with the terminating port determination function, imposes an upper limited on the overall system call processing capacity.

In the known system, the control of multi-port hunt groups is centralized in the system central control. Such centralized hunt group control is relatively easy to implement as a sequential process since the group status, history, selection algorithm and selection process all reside in one location. However, hunt group control can become very complex when such control is distributed among the control units in a plurality of switching modules. This is particularly true in typical applications where it is important that the members of each hunt group can be spread across a number of switching modules to enhance reliability and for administrative convenience in changing group members and in load balancing.

One important aspect of the complexity of distributed hunt group control is the number of inter-module control messages that are generated. In switching systems where the speed or capacity of the inter-module control communication mechanism are limiting factors, it is important to prevent the processing of calls to hunt groups from requiring so many control messages that the overall call processing capacity of the system is substantially reduced.

In view of the foregoing, a recognized problem in the art is the difficulty in efficiently controlling multi-port hunt groups without relying on a system central control and without requiring excessive inter-module control communication.

SUMMARY OF THE INVENTION

The aforementioned problem is solved and a technical advance is achieved in accordance with the principles of the invention in an illustrative, distributed control switching system where multi-port hunt groups are controlled in an efficient manner by hunting for idle group members in a sequential fashion starting with the members on one of the modules and continuing through a predetermined sequence of modules until an idle group member is found. The busy/idle hunt data is advantageously distributed across the modules so that each module maintains the hunt data for only the group members on that module. Therefore, no inter-module control communication is devoted to updating the hunt data of other modules. The sequential nature of the hunting from one module to another requires the transmission of inter-module control messages only until an idle member is found.

An exemplary method in accordance with the invention is used in a distributed call processing system in a switching system having a number of ports including at least one multi-port hunt group. The call processing system includes a number of control units each associated with a subset of the ports. Each control unit stores hunt data defining the busy/idle status of any ports of the hunt group associated with that control unit. A call to the hunt group is processed in accordance with the exemplary method as follows. A first control unit accesses its hunt data in response to the call to determine whether any port of the hunt group is defined as idle. If the first control unit does not find an idle port, it transmits a message defining the call to a second control unit. The second control unit accesses its hunt data in response to the message to determine whether any port of the hunt group is defined as idle. If the second control unit does find an idle port, it assigns the idle port to receive the call and updates its hunt data to define the port as busy. When the status of the port subsequently changes from busy to idle at call completion, the second control unit detects the status change and updates its hunt data to again define the port as idle.

An illustrative system described herein controls multi-port hunt groups differently depending on which of two operation modes the system is presently in. In one mode, a system central control maintains the hunt data for multi-port hunt groups and calls to such groups always require the involvement of the central control. In the other mode however, the system central control is not involved and the hunt data is distributed across a plurality of distributed control units. Each distributed control unit is associated with a subset of the system ports and stores the hunt data for any group ports associated with that control unit. In the second operation mode, hunting for idle groups members is performed in a sequential manner starting with members associated with one of the distributed control units and continuing through the other distributed control units until an idle group member is found.

BRIEF DESCRIPTION OF THE DRAWING

A more complete understanding of the present invention may be obtained from a consideration of the following description when read in conjunction with the drawing in which:

FIGS. 14 through 18 define a number of messages, data structures and database relations used in System I;

FIGS. 19 through 21, when arranged in accordance with FIG. 22, present a diagram of a switching system referred to herein as System II, which builds on System I by integrating four individual, remote switching modules into the system;

FIG. 32 defines certain messages, data structures and database relations used in System II;

FIGS. 33 through 35, when arranged in accordance with FIG. 36, present a diagram of a switching system, referred to herein as System III, which also has four, remote switching modules in the system as does System II, but rather than being individual modules, the four remote modules in System III being interconnected in a grouping referred to herein as a cluster;

FIG. 38 defines certain data structures and database relations used in System III;

GENERAL DESCRIPTION

Figure 1:
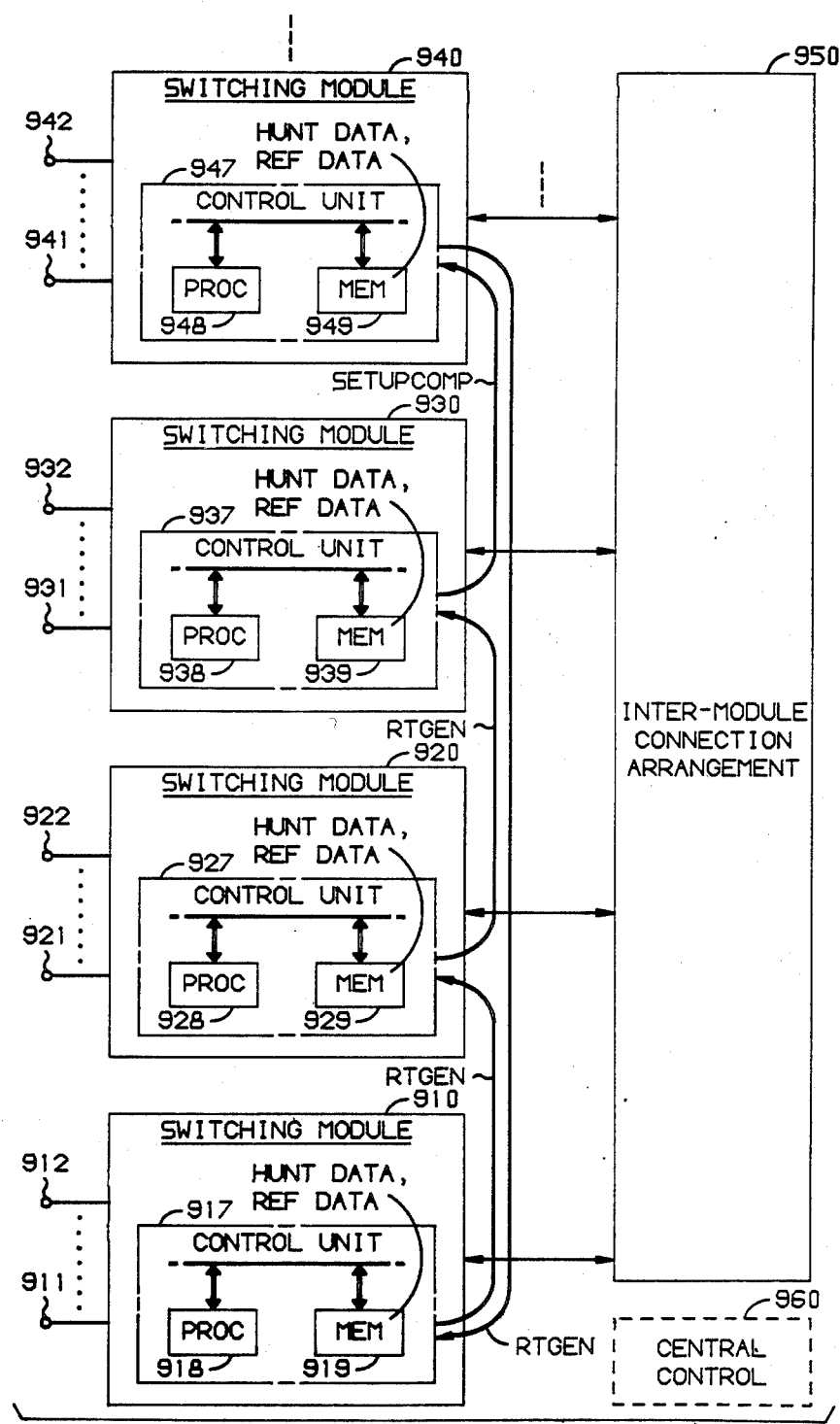
FIG. 1 is a generalized diagram of a distributed control switching system used to illustrate the principles of the present invention.

FIG. 1 is a generalized diagram of a distributed control switching system used to illustrate the principles of the present invention. The system includes a plurality of switching modules each associated with a corresponding plurality of ports, only modules 910, 920, 930 and 940 being shown in FIG. 1. The ports are connectible to analog or digital lines and trunks of any of a number of well-known types. Each switching module, e.g., 910, provides communication channels among its associated ports, e.g., 911 and 912, and between its associated ports and an inter-module connection arrangement 950. Connection arrangement 950 provides communication channels between the switching modules for inter-module communication. Inter-module connection arrangement 950 may be implemented in a number of ways, for example using a time-multiplexed switch or using a number of bidirectional transmission facilities each directly interconnecting one pair of switching modules. Switching modules 910, 920, 930 and 940 are controlled by distributed control units 917, 927, 937 and 947 respectively included therein. The control units 917, 927, 937 and 947 communicate via a control information communication arrangement (not shown in FIG. 1) of any of a number of types, several of which are described in detail later herein. Each control unit receives directory numbers for calls from its associated ports and effects the transmission of alerting signals to its associated ports. Each control unit includes a processor and an associated memory, for example control unit 917 includes processor 918 and memory 919. Processor 918 executes programs stored in memory 919 to perform its control functions. One of the important functions provided by this exemplary system involves the control of multi-port hunt groups, i.e., multi-line hunt groups and trunk groups. A multi-line hunt group is a group of lines which are assigned one or more common pilot directory numbers. Examples are groups of lines used to provide directory assistance, lines used by a catalog order department or lines connected to banks of modems on dial-up computers. Trunk groups are groups of trunks connecting one switching system to another. An important characteristic of the multi-port hunt groups provided by this exemplary system is that the members of a given group can span a number of the switching modules. For example, a multi-line hunt group A may include lines connected to ports 911, 912, 921, 922, 931, 932 and 941. The memory of each control unit stores reference data and hunt data. The hunt data stored in the memory of a given control unit, e.g., memory 919 in control unit 917, stores, for each multi-port hunt group, the busy/idle status of each group member port that is associated with the given control unit. For example, for group A defined above, memory 919 stores the busy/idle status of ports 911 and 912, memory 929 stores the busy/idle status of ports 921 and 922, memory 939 stores the busy/idle status of ports 931 and 932, and memory 949 stores the busy/idle status of port 941. The reference data stored in the memory of a given control unit, e.g., memory 919 in control unit 917, defines the control unit where hunting is to be continued when hunting is not successfully completed in the given control unit. For example, the reference data in memory 919 may define that hunting is to be continued in control unit 927 if unsuccessful in control unit 917. The reference data in memories 929, 939 and 949 may similarly define the continuation of hunting in control units 937, 947 and 917 respectively. In the system referred to as System III and described in the detailed description hereafter, the hunt data for multi-line hunt groups is stored in the LNSTAT relation and the hunt data for trunk groups is stored in the TKOWNER, TKQUE and TKSTAT relations. The reference data for all such groups is stored in the CLIDAT relation.

Consider the following example. A pilot directory number associated with the above-defined multi-line hunt group A is dialed from port 942 associated with control unit 947. Assume for the example, that the subscriber sets connected to ports 911, 912, 921, 922 and 941 are busy and that the subscriber sets connected to portions 931 and 932 are idle. In control unit 947, processor 948 accesses the hunt data for group A stored in memory 949 and determines that no group A member is defined as idle. Processor 948 then accesses the reference data stored in memory 949 and determines that hunting should be continued in control unit 917. Control unit 947 transmits a message, referred to herein as a RTGEN message, to control unit 917 defining the call to hunt group A. In control unit 917, processor 918 accesses the hunt data for group A stored in memory 919 and determines that no group A member is defined as idle. Processor 918 then accesses the reference data stored in memory 919 and determines that hunting should be continued in control unit 927. Control unit 917 transmits a RTGEN message to control unit 927 defining the call to hunt group A. In control unit 927, processor 928 accesses the hunt data for group A stored in memory 929 and determines that no group A member is defined as idle. Processor 928 then accesses the reference data stored in memory 929 and determines that hunting should be continued in control unit 937. Control unit 927 transmits a RTGEN message to control unit 937 defining the call to hunt group A. In control unit 937, processor 938 accesses the hunt data for group A stored in memory 939 and determines that the subscriber set connected to port 931 is defined as idle. Processor 938 assigns port 931 to receive the call and updates the hunt data stored in memory 939 to define port 931 as busy. Control unit 937 then effects the transmission of an alerting signal to port 931. Control unit 937 also transmits a setup completion (SETUPCOMP) message to control unit 947. Control units 947 and 937 cooperatively control the establishment by inter-module connection arrangement 950 of a given available communication channel between switching modules 940 and 930. Control unit 947 controls the connection by switching module 940 of port 942 and the given communication channel and control unit 937 controls the connection by switching module 930 of port 931 and the given communication channel. Later, when the status at port 931 returns to idle, processor 938 updates the hunt data for group A stored in memory 939 to define port 931 as idle.

It should be noted that although the above-described example is illustrative of the sequential fashion in which hunting is completed, it represents a worst-case scenario in terms of the number of control messages required. If port 941 had been idle, for example, no control messages would have been needed. If port 941 was busy but either ports 911 or 912 had been idle, only one control message would be required to complete the port assignment for the call.

In the detailed description of System III which follows, a group of four remote switching modules referred to as a cluster, controls global multi-port hunt groups, i.e., groups that span more than one switching module, in the above-described manner when operating in a stand-alone mode of operation. When operating in a normal mode of operation, such global groups are controlled by a central control of a host switching system. In the normal mode of operation, the hunt data for global groups is maintained only in the central control. In the stand-alone mode of operation, each remote switching module of the cluster stores hunt data for global groups. In a given remote switching module, the hunt data defines global group members not on the given remote switching module as busy. The hunt data in the given remote switching module defines only the global group members on the given remote switching module as busy or idle in accordance with the present status of the members. A central control 960 is shown by the dashed-line box in FIG. 1, to define the controller of global hunt groups in one operation mode of such a two-mode switching system.

DETAILED DESCRIPTION

The following description relates to three time division switching systems, referred to herein as Systems I through III, which vary in the degree to which the call processing function is distributed throughout the system.

System I is a time division switching system where the switching function is distributed to a plurality of switching modules each connected to a number of lines and trunks. Each switching module provides connections among the lines and trunks connected to that module. Calls involving lines or trunks connected to different modules are completed through a time-multiplexed switch that interconnects the modules. Each switching module includes a control unit that controls the switching function of that module. The system also includes a central control that controls the switching function of the time-multiplexed switch. All calls within the system require the selection of what is referred to as a network time slot. For inter-module calls, the network time slot is used for transmission from one switching module, through the time-multiplexed switch, to another switching module. For intra-module calls, the network time slot is used within the switching module to connect one line or trunk to another line or trunk. (In the present embodiment, two network time slots are used for intra-module calls, one for each transmission direction.) Although the call processing function is distributed in System I in that the real-time intensive tasks associated with calls, e.g., signal processing, are performed by the switching module control units, the routing function, defined herein as the function of determining the terminating port, selecting the network time slot and setting up the time-multiplexed switching path if the call is an inter-module call, is centralized, being performed by the system central control. System I described herein is substantially the same as the time division switching system disclosed in U.S. Pat. No. 4,322,843, issued to H. J. Beuscher et al. on Mar. 30, 1982.

System II builds on System I by integrating four individual, remote switching modules into the system. However, in System II the routing function is performed in a distributed manner by the remote switching module control units and the system central control. The distribution is done in an efficient manner such that work done by one control entity, in particular time consuming database access tasks, need not be repeated by the next control entity.

System III also has four, remote switching modules in the system but rather than being individual modules, the four remote modules in System III are interconnected in a grouping referred to herein as a cluster. In System III, the routing function is again performed in a distributed manner. Systems II and III described herein are the same in many respects as the time division switching system including remote switching capability described in U.S. Pat. No. 4,550,404, issued Oct. 29, 1985. However, in the system of the Chodrow et al. U.S. Pat. No. 4,550,404, the routing function is not distributed but rather is performed centrally by the system central control.

System III includes an exemplary method and apparatus for controlling multi-port hunt groups in a distributed control switching system in accordance with the present invention.

SYSTEM I

Figure 2:
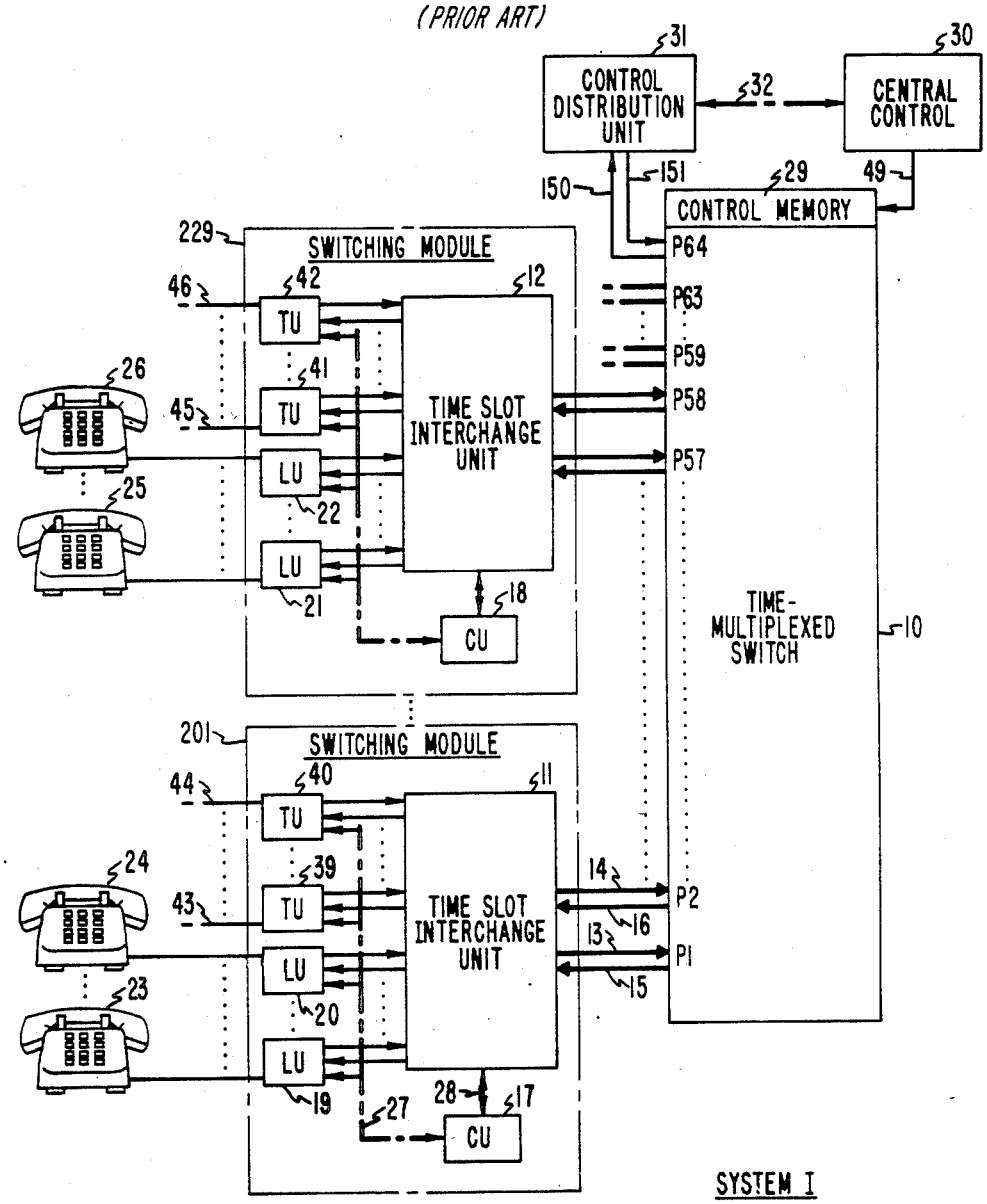
FIG. 2 is a diagram of a time division switching system that is referred to herein as System I and that is substantially the same as the system disclosed in U.S. Pat. No. 4,322,843, issued to H. J. Beuscher et al. on Mar. 30, 1982.

The time division switching system of FIG. 2, referred to herein as System I, is used to interconnect subscriber sets such as subscriber sets 23 through 26 and trunks such as trunks 43 through 46 and includes a time-multiplexed switch 10 comprising a time-shared space division switch having 64 input terminals and 64 output terminals. Also included are 29 time-slot interchange units of which representative time-slot interchange units 11 and 12 are specifically shown. Each time-slot interchange unit 11 and 12 includes a bidirectional time-slot interchanger. Additionally, each time-slot interchange unit 11 and 12 is connected to two input terminals and two output terminals of time-multiplexed switch 10. In System I, time-slot interchange unit 11 is connected to two time-multiplexed switch input terminals via time-multiplexed lines 13 and 14 and to two output terminals, via time-multiplexed lines 15 and 16.

In the description which follows, the input and output terminals of time-multiplexed switch 10 are referred to as input/output terminal pairs. This term is used since the source for data words to an input terminal of a given input/output terminal pair is also the destination for data words from the output terminal of that pair. As shown in FIG. 2, input/output terminal pair P1 is associated with time-multiplexed lines 13 and 15. Each time-multiplexed line 13 through 16 conveys digital information in 125-microsecond frames each comprising 256 time separated channels. Accordingly, each time-slot interchange unit transmits and receives up to 512 channels of digital information during each 125-microsecond frame.

Each time-slot interchange unit is uniquely associated with a control unit of which control unit 17 is associated with time-slot interchange unit 11, and control unit 18 is associated with time-slot interchange unit 12. Additionally, each time-slot interchange unit is connected via individual time-multiplexed lines to a plurality of peripheral units of which line units 19 through 22 and trunk units 39 through 42 are shown in FIG. 2. A time-slot interchange unit and its associated control unit and peripheral units are collectively referred to herein as a switching module. Line units 19 and 20 and trunk units 39 and 40 are connected to time-slot interchange unit 11 in switching module 201 and line units 21 and 22 and trunk units 41 and 42 are connected to time-slot interchange unit 12 in switching module 229. Each of the line units is connected to a number of subscriber sets of which subscriber sets 23 through 26 are shown. The exact number of line units associated with each time-slot interchange unit and the exact number of subscriber sets associated with each line unit is determined by the number of subscribers to be served and the calling rates of those subscribers. Each line unit terminates the analog loop of the well-known type from a plurality of subscriber sets, e.g., 23 through 26, and converts call information including analog speech signals into digital data words which are transmitted to its associated time-slot interchange unit. Further, each line unit detects service requests from the subscriber sets and generates certain signaling information for those subscriber sets. The particular subscriber sets from which speech samples are taken and encoded, and the particular time-multiplexed channels used to transmit the resulting code between the line unit and its associated time-slot interchange unit are determined by the control unit of the associated time-slot interchange unit.

The trunks units, e.g., 39 and 40, perform analogous functions for trunks such as detecting trunk seizures and controlling and detecting trunk signaling with other systems. The trunks can be either of the analog or digital type. One example of such a digital trunk is the T1 carrier system disclosed in the J. H. Green et al., U.S. Pat. No. 4,059,731, on which 24 separate communication channels are multiplexed.

The relationship of subscriber sets, line units and time-slot interchange units is substantially the same for each of such groups of interconnected units. Accordingly, while the description which follows relates directly to subscriber set 23, line unit 19 and time-slot interchange unit 11, it shows the relationships for all other groups of such units. Furthermore, an analogous relationship exists between trunks, trunk units and time-slot interchange units. Line unit 19 scans the lines connected to each subscriber set to detect requests for service. When such a request is detected, line unit 19 transmits to control unit 17, a message indicating the request and the identity of the requesting subscriber set. This message is transmitted to control unit 17 via a communication path 27. Control unit 17 performs the necessary translation based on the service requested, the identity of the requesting subscriber set and the available equipment, and transmits a message to line unit 19 via communication path 27 defining which of the plurality of time separated channels between line unit 19 and time-slot interchange unit 11 is to be used to transmit information from subscriber set 23 to time-slot interchange unit 11. Based on this message, line unit 19 encodes the analog information from subscriber set 23 into digital data words and transmits the resulting data words in the assigned channels. Line unit 19 also transmits in the assigned channel an indication of the DC state, i.e., open circuit, closed circuit, of the subscriber loop associated with subscriber set 23.

After a time separated channel between line unit 19 and time-slot interchange unit 11 is assigned to a given subscriber set, control unit 17 detects signaling information from the subscriber set by sampling the information transmitted in the assigned channel. Such sampling operations are performed via a communication path 28. Control unit 17 responds to the signaling information from the subscriber's channel, and to control messages from other control units, e.g., 18, and a central control unit 30, by controlling the time-slot interchange function of the time-slot interchange unit 11. As previously stated, each time-multiplexed line between a time-slot interchange unit and the time-multiplexed switch 10 has 256 channels each 125-microsecond frame. These channels are assigned numerical designations from 1 to 256 in sequence as they occur. This sequence of channels recurs so that a given channel will be available every 125 microseconds. The time-slot interchange function takes the data words received from the line units and places them in channels on the time-multiplexed line between the time-slot interchange units and the time-multiplexed switch 10 under the control of control units 17 and 18.

Time-multiplexed switch 10 operates in recurring frames of time slots where each 125-microsecond frame comprises 256 time slots. During each time slot, time-multiplexed switch 10 is capable of connecting data words received at any of its 64 input terminals to any of its 64 output terminals in accordance with time-slot control information stored in a control memory 29. The configuration pattern of connections through time-multiplexed switch 10 repeats itself every 256 time slots and each time slot is assigned a numerical designation in sequence from 1 to 256. Accordingly, during a first time slot TS 1 the information in a channel (1) on time-multiplexed line 13 may be switched by time-multiplexed switch 10 to an output terminal P64 while during the next time slot TS 2 the next channel (2) on time-multiplexed line 13 may be switched to an output terminal P57. Time-slot control information is written into control memory 29 by central control 30 which generates this control information from control messages obtained from various control units, e.g., 17 and 18.

Central control 30 and control units 17 and 18 exchange control messages utilizing selected channels called control channels of the time-multiplexed lines, e.g., 13 through 16, between the time-slot interchange units and the time-multiplexed switch 10. Each control message comprises a plurality of control words and each control channel can transmit one control word per frame of 256 time separated channels. The same channel of the two time-multiplexed lines associated with a given input/output terminal pair is predefined to be a control channel. Additionally, a given channel is used as a control channel for only on pair of time-multiplexed lines. For example, if channel 1 is used as a control channel on time-multiplexed line 13 and the associated time-multiplexed line 15, no other time-multiplexed line will use channel 1 as a control channel. During each time slot having the same numerical designation as a control channel, time-multiplexed switch 10 connects the data word occupying that control channel to output terminal P64 and connects input terminal P64 to the output terminal associated with the above-mentioned control channel. The following is an example of the operation of System I when channel 1 is the control channel for time-multiplexed lines 13 and 15, and channel 2 is the control channel for time-multiplexed lines 14 and 16. During time slots TS 1 information from control memory 29 defines, among other connections, that the control word in channel 1 of time-multiplexed line 13 is connected to output terminal P64 and that the control word in channel 1 at input terminal P64 is connected to time-multiplexed line 15. Similarly, during time slot TS 2, information from control memory 29 defines that the control word in channel 2 of time-multiplexed line 14 is connected to output terminal P64 and that the control word in channel 2 at input terminal P64 is connected to time-multiplexed line 16. When operating in this manner, output terminal P64 receives from time-multiplexed switch 10 all control words in a channel having the same numerical designation in which they were transmitted to the time-multiplexed switch. Further, each control channel is connected to receive control words from input terminal P64 during the time slot having the same numerical designation as their associated control channel. Control words switched to output terminal P64 are transmitted to a control distribution unit 31 which temporarily stores them in a location associated with that control channel. The association of control channels with storage locations in control distribution unit 31 identifies the source of the information stored.

Each control message from a time-slot interchange unit comprises a start character, a destination portion, a signaling information portion, and an end character. The destination portion uniquely defines the expected destination of the control message. Control distribution unit 31 interprets the destination portion of each control message to determine the proper destination for the control message and retransmits the message to input terminal P64 of time-multiplexed switch 10 in a channel having the same numerical designation as the control channel associated with the destination unit.

When operating as above described, time-slot interchange unit 11 transmits control messages to time-slot interchange unit 12 by transmitting control words during its recurring control channel to form a control message having a destination portion identifying time-slot interchange unit 12. Control distribution unit 31 accumulates the control words, interprets the destination portion, and retransmits the message to input terminal P64 during the channel having the same numerical designation as the control channel associated with time-slot interchange unit 12. A control message can also be transmitted to central control 30 by defining central control 30 in the destination portion of the control message. When this occurs, control distribution unit 31 transmits the message to central control 30 via a communication link 32 rather than returning it to time-multiplexed switch 10. Similarly, a message may be transmitted from central control 30 to one of the tme-slot interchange units by transmitting to the control distribution unit 31 a control message having a destination portion defining the particular time-slot interchange unit. This transmission is also accomplished utilizing communication link 32. The operation of a particular embodiment of control distribution unit 31 is described in detail in the above-cited Beuscher et al. U.S. Pat. No. 4,322,843.

Figure 3:
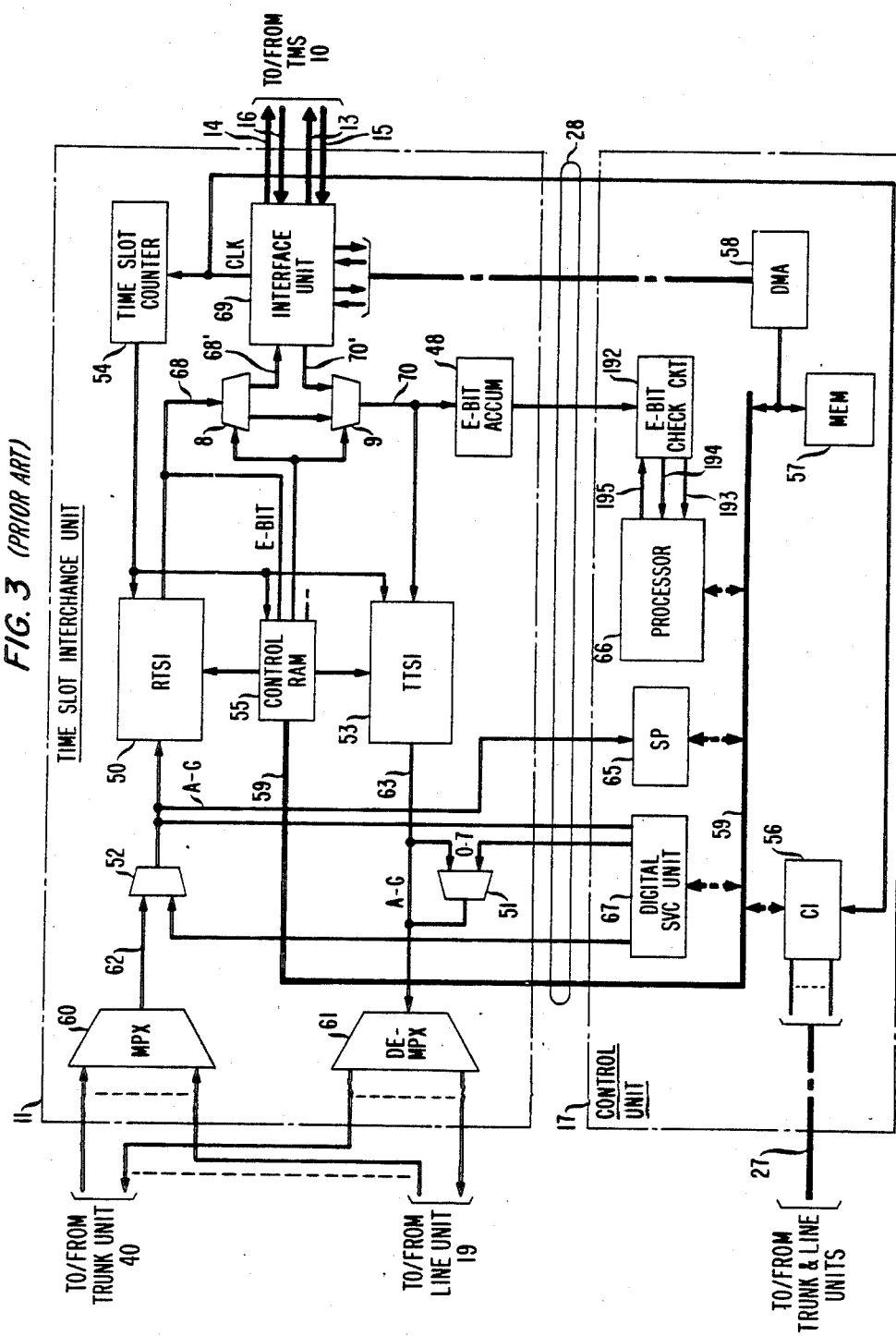
FIG. 3 is a more detailed diagram of a time-slot interchange unit and an associated control unit utilized in System I.
Figure 6:
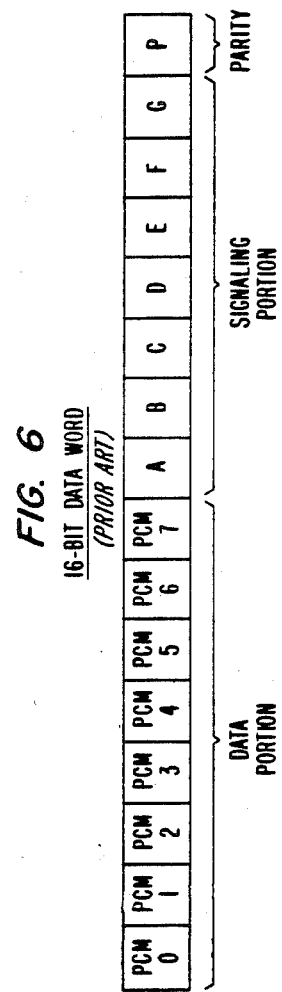
FIG. 6 is a diagram of a data word format utilized in System I.

Each of the control units, e.g., 17 and 18, includes a memory 57 (FIG. 3) which stores the program for the control of its associated control unit and data regarding the primary function of the control unit, its associated time-slot interchange unit and its associated subscribers. The main processing entity of control unit 17 is a processor 66 (FIG. 3) which operates in response to instructions stored in memory 57. Control unit 17 includes a control interface circuit 56 which receives instructions from processor 66 via a bus 59 and in response thereto, communicates with the peripheral units, e.g., line units 19 and 20 and trunk units 39 and 40, via communication path 27. Control unit 17 also includes a signal processor 65 and a digital service unit 67. Signal processor 65 reduces the real time load requirement of processor 66 by receiving and analyzing the signaling portion (bits A through G, FIG. 6) of each data word received by time-slot interchange unit 11. Digital service unit 67 receives the data portion (FIG. 6) of each data word received by time-slot interchange unit 11 to detect tone signals from subscribers which have been converted into PCM signals. Digital service unit 67 is also used to transmit tones and signals in PCM format via a gate 51 to subscribers and via a gate 52 to time-multiplexed switch 10. The operation of control interface circuit 56, signal processor 65 and digital service unit 67 as well as line unit 19 is described in detail in the above-cited Beuscher et al. U.S. Pat. No. 4,322,843. An example of trunk unit 39 includes the digital facility interface described in the above-cited U.S. Pat. No. 4,550,404, issued Oct. 29, 1985 for use with T1 carrier systems.

Each of the peripheral units transmits recurring frames each comprising 32 or 64 digital channels of 16 bits each. This information is transmitted to a multiplex unit 60 (FIG. 3) within time-slot interchange unit 11. Multiplex circuit 60 receives the output signals from the peripheral units which signals are reformatted and transmitted on an output time-multiplexed line 62 having 512 channels for each 125-microsecond frame. Similarly, a demultiplex circuit 61 receives 512 channels of 16 bits each on a time-multiplexed line 63 which channels are distributed in a predetermined arrangement to the peripheral units such as line unit 19. Further, multiplex unit 60 converts incoming channels of information from serial to parallel form and demultiplexer 61 converts the information it receives from parallel to serial form. The information transmitted in a given channel on time-multiplexed line 62 is stored in a receive time-slot interchanger 50 in a memory location uniquely associated with that given channel.

The particular memory location into which a given data word is stored is defined by time-slot designation signals generated by time-slot counter 54. Time-slot counter 54 generates a recurring sequence of 512 time-slot designations at the rate of one time-slot designation per time slot. The particular time-slot designation generated during the time slot in which a given data word is received defines the memory location within receive time-slot interchanger 50 which is to store that data word. Data words are also read from receive time-slot interchanger 50 at the rate of one data word per time slot. The memory address of the data word to be read from receive time-slot interchanger 50 during a given time slot is obtained by reading control RAM 55. Control RAM 55 is read once per time slot at an address defined by the time-slot designation from time-slot counter 54 and the quantity so read is transmitted to receive time-slot interchanger 50 as the read address for that time slot. Data words read from receive time-slot interchanger 50 are transmitted to time-multiplexed switch 10 via a time-multiplexed line 68, a gate 8, a time-multiplexed line 68' and an interface unit 69. Data words from time-multiplexed switch 10 are received by time-slot interchange unit 11 by interface unit 69, and are conveyed via a time-multiplexed line 70', a gate 9 and a time-multiplexed line 70 to transmit time-slot interchanger 53. For calls among the peripheral units connected to time-slot interchange unit 11, control RAM 55 effects the operation of gates 8 and 9 such that data words transmitted by receive time-slot interchanger 50 on time-multiplexed line 68 are conveyed via gates 8 and 9 and time-multiplexed line 70 to transmit time-slot interchanger 53. Transmit time-slot interchanger 53 stores the incoming data words in a location defined by an address from control RAM 55. Data words are read from transmit time-slot interchanger 53 at the address defined by the time-slot counter 54. Data words so read are transmitted on time-multiplexed line 63 for transmission to a peripheral unit, e.g., line unit 19. It should be noted that control RAM 55 may be implemented as a number of control memories each associated with a particular circuit, e.g., transmit time-slot interchanger 53. The particular configuration of control memories is not important to the present description and may vary depending on timing and circuitry requirements within the time-slot interchange unit 11. The general principles of time-slot interchange as performed by the receive time-slot interchanger 50, the control RAM 55, the time-slot counter 54 and the transmit time-slot interchanger 53 are well known in the art and are not described in greater detail herein. One arrangement for reading and writing data words in time-slot memories is described in detail in U.S. Pat. No. 4,035,584, J. W. Lurtz.

The primary mode of control information exchange in System I presently being described comprises the transmission of control messages from a source time-slot interchange unit through the time-multiplexed switch 10 and the control distribution unit 31 and back to the destination time-slot interchange unit. A secondary mode of communication is also used whereby control information with regard to a given call is transmitted from the source time-slot interchange unit to the destination time-slot interchange unit via the time-multiplexed switch 10 utilizing the time slot assigned for that call. The E-bit position of the data word in the call time slot is used for the secondary mode communication. However, it can be seen that any or all of the signaling bits could be used in this secondary communication mode. The E-bit serves the dual purposes of communication path continuity check and signal acknowledgment. The operation of E-bit accumulator 48 and E-bit check circuit 192, which communicates with processor 66 via conductors 193, 194, and 195 in performing these dual purposes is described in detail in the above-cited Beuscher et al. U.S. Pat. No. 4,322,843.

Figure 4:
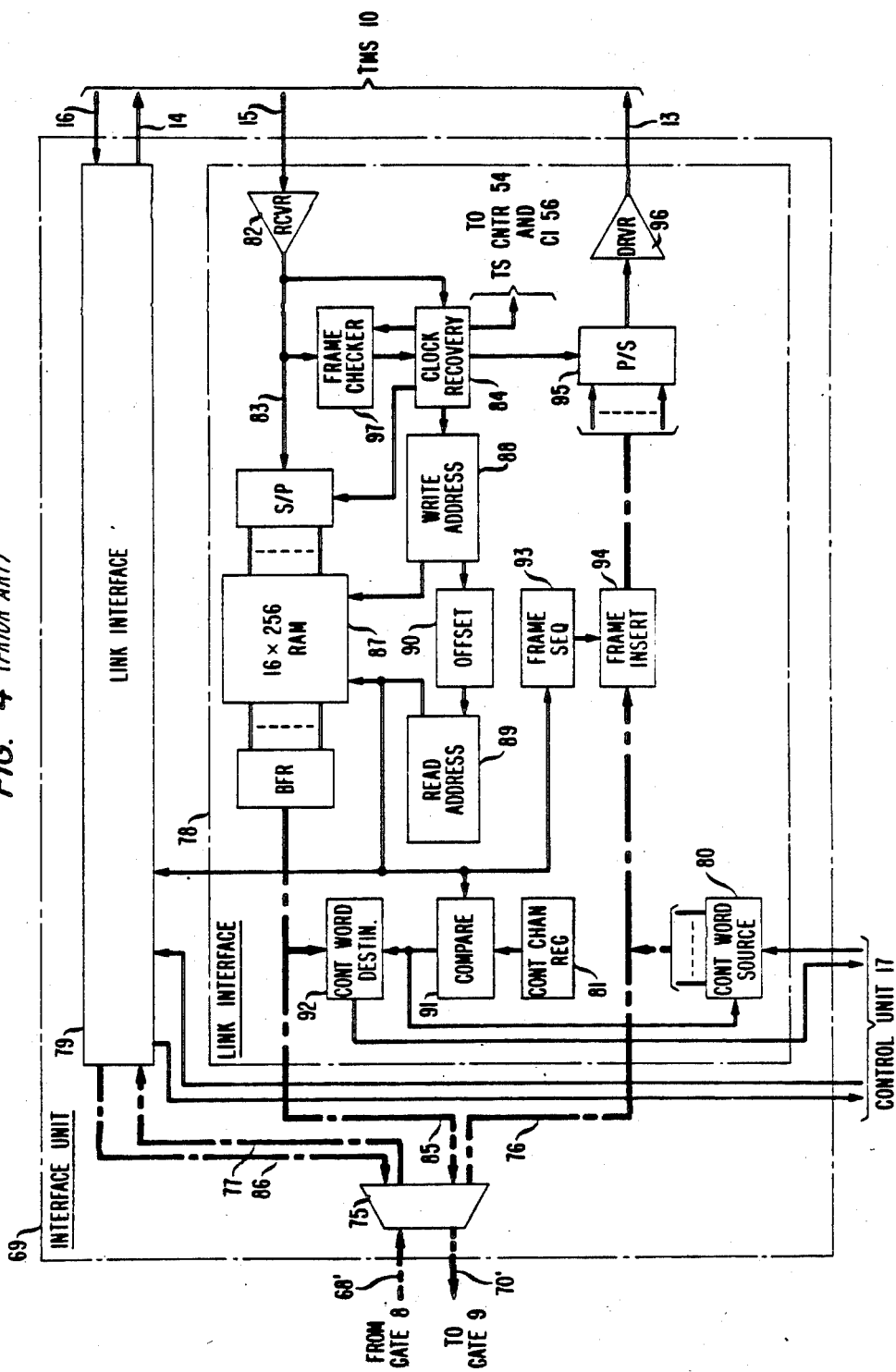
FIG. 4 is a diagram of an interface unit included within each time-slot interchange unit which is utilized for communication with a time-multiplexed switch of System I.

The following is a description of the primary mode of communication between the various control entities of the switching system. Processor 66, in response to a complete dialed number, performs translations with regard to that dialed number and formulates a control message for central control 30 (FIG. 2) so that an idle time slot for the call can be established through time-multiplexed switch 10. This control message is stored in memory 57 by processor 66. A DMA unit 58 of a type well known in the art reads the control message at the rate of one control word per frame and transmits that word to a control word source register 80 (FIG. 4) in interface unit 69 for transmission on the time-multiplexed line to time-multiplexed switch 10. Similarly, control messages are received from other control units and central control 30 at a control word destination register 92 (FIG. 4) in interface unit 69 and transmitted by DMA unit 58 to the memory 57 where they are read by processor 66. Interface unit 69, which is shown in detail in FIG. 4, includes a multiplex/demultiplex circuit 75 and two link interfaces 78 and 79. Multiplex/demultiplex circuit 75 is connected to receive data words from the receive time-slot interchanger 50 via time-multiplexed line 68' and to transmit data words to transmit time-slot interchanger 53 via time-multiplexed line 70'. Recall that both time-multiplexed lines 68' and 70' convey data words at the rate of 512 channels per 125-microsecond frame. Multiplex/demultiplex circuit 75 splits the information received on time-multiplexed line 68' into two time-multiplexed lines 76 and 77 by transmitting the data words in each even-numbered channel on time-multiplexed line 77 and by transmitting each odd-numbered channel on time-multiplexed line 76. Each of the time-multiplexed lines 76 and 77 thus conveys information at the rate of 256 channels per frame. Additionally, multiplex/demultiplex circuit 75 combines the information on two 256-channel time-multiplexed lines 85 and 86 onto the 512-channel time-multiplexed line 70'. This combination occurs by alternatingly transmitting the data words from time-multiplexed lines 85 and 86 such that the data words from time-multiplexed line 85 are transmitted in the odd-numbered channels of time-multiplexed line 70' while data words from time-multiplexed line 86 are transmitted in even-numbered channels. Time-multiplexed lines 76 and 85 are connected to link interface 78 and time-multiplexed lines 77 and 86 are connected to link interface 79. It should be noted that the time-slot interchange unit 11 operates on the basis of 512 time slots (channels) per frame while the link interfaces 78 and 79 and the time-multiplexed switch 10 operate on the basis of 256 time slots (channels) per frame. Further, the channels of data words received from and transmitted to time-slot interchange unit 11 are in complete synchronism. That is, whenever a channel having a given numerical designation is received by link interface 78 from time-slot interchange unit 11, both link interfaces 78 and 79 will be receiving and transmitting channels having the same numerical designation with respect to the time-slot interchange unit 11. In order to maintain synchronism after the split, all odd-numbered channels on time-multiplexed line 68' are delayed by multiplex/demultiplex circuit 75 so that the odd-numbered channel and the immediately following even-numbered channel are transmitted on a respective one of time-multiplexed lines 76 and 77 substantially simultaneously. Similarly, each data word from link interface 79 on time-multiplexed line 86 is delayed by multiplex/demultiplex circuit 75 such that it is transmitted on time-multiplexed line 70' immediately after the data word received by multiplex/demultiplex circuit 75 substantially simultaneously therewith. In the course of the following description, the time slot of a given data word refers to its time slot with respect to link interfaces 78 and 79 and the time-multiplexed switch 10. For example, data words from channels 1 and 2 of time-multiplexed line 68' are both associated with time slot 1 of the link interfaces 78 and 79 and the time-multiplexed switch 10. Each of the link interface units 78 and 79 is uniquely associated with one input/output port pair of time-multiplexed switch 10.

Link interface 78 (FIG. 4) includes the receiver 82 which receives data words transmitted serially from time-multiplexed switch 10 via time-multiplexed line 15 and serially retransmits this information on a conductor 83. A clock recovery circuit 84 receives the incoming bit stream by connection to conductor 83 and recovers a 32.768-megahertz clock signal therefrom. This clock signal is used to provide timing for link interface circuit 78. For reasons to be described in greater detail later herein, the information received on time-multiplexed line 15 is not necessarily in channel synchronization with that transmitted on time-multiplexed line 13. In order to achieve channel synchronism between the data words on time-multiplexed lines 76 and 85, the incoming data words on conductor 83 are buffered in a random access memory circuit 87. The data words on conductor 83 are written into random access memory 87, at a location defined by a write address generator 88. Write address generator 88 receives a 2.048-megahertz clock signal from the clock recovery circuit 84 and in response thereto generates a recurring sequence of 256 write addresses in synchronism with the incoming data words on conductor 83. Data words are read from random access memory 87 for transmission to time-slot interchange unit 11 at locations defined by a read address generator 89 which generates a recurring sequence of 256 read addresses. The read addresses are derived from information received from an offset circuit 90. Offset circuit 90 receives the write addresses generated by the write address generator 88, and effectively subtracts a predetermined number therefrom. The result of this subtraction is then transmitted to read address generator 89. In this manner, read address generator 89 generates a sequence of read addresses which is approximately one-fourth of a frame (64 time slots) behind the addresses generated by the write address generator 88.

Link interfaces 78 and 79 of interface unit 69 operate in a master/slave mode to maintain channel synchronism. In the present embodiment, link interface 78 is the master and continues to operate in the manner described above. The read address generator of link interface 79 is, however, driven by read addresses from the read address generator 89 of link interface 78. It should be noted that, due to possible differences in the length of time-multiplexed lines 15 and 16, more or less than one-quarter frame of information may separate the write addresses and read addresses utilized in link interface 79. This occurs since the data words transmitted on time-multiplexed lines 85 and 86 are in channel synchronism while no such synchronism is required on time-multiplexed lines 15 and 16.

The same channel is used in a given link interface to both transmit and receive control messages. The particular channel used by a given link interface, e.g., link interface 78, to convey control messages is preset and stored in a control channel register 81. Each read address generated by read address generator 89 is transmitted to a comparator 91 which compares that read address to the preset control channel designation stored in control channel register 81. When comparator 91 determines that the instant read address is identical to the control channel designation, it generates a gating signal which is transmitted to control word source register 80 and to a control word destination register 92. Control word destination register 92, in response to the gating signal from comparator 91, stores the information on time-multiplexed line 85. During that particular chnnel, the information on time-multiplexed line 85 comprises the contents of the control channel to be utilized by the control unit 17. By the operation of DMA unit 58, the contents of control word register 92 are transmitted to memory 57 before the next control channel. Similarly, control word source register 80 responds to the gating signal from comparator 91 by gating its contents out to time-multiplexed line 76, thus transmitting the control word. Control words are transmitted and received by link interface 79 in a substantially similar manner, however, the particular control channel designation associated with link interface 79 is different than that associated with link interface 78.

The read addresses generated by read address generator 89 are also transmitted to a frame sequence generator 93. Frame sequence generator 93 responds thereto by generating a unique sequence of framing bits at the rate of one bit per channel. During each channel, the bit generated by the frame sequence generator 93 is transmitted to frame insert circuit 94 which places the framing bit into the G-bit location of the data word from time-slot interchange unit 11. The data word including this framing bit is then transmitted via a parallel-serial register 95 and a driver circuit 96 to time-multiplexed line 13 which is connected to a unique input port of time-multiplexed switch 10. Each data word received by link interface 78 includes a framing bit which is generated and transmitted by the time-multiplexed switch 10. A frame checker 97 reads each framing bit of each data word from time-multiplexed switch 10 and determines if the communication between time-multiplexed switch 10 and itself is still in synchronism. If synchronism exists, no corrections are made; however, if synchronism is found not to exist, reframing is accomplished by communication with the clock recovery circuit 84 in a manner well known in the art.

Figure 5:
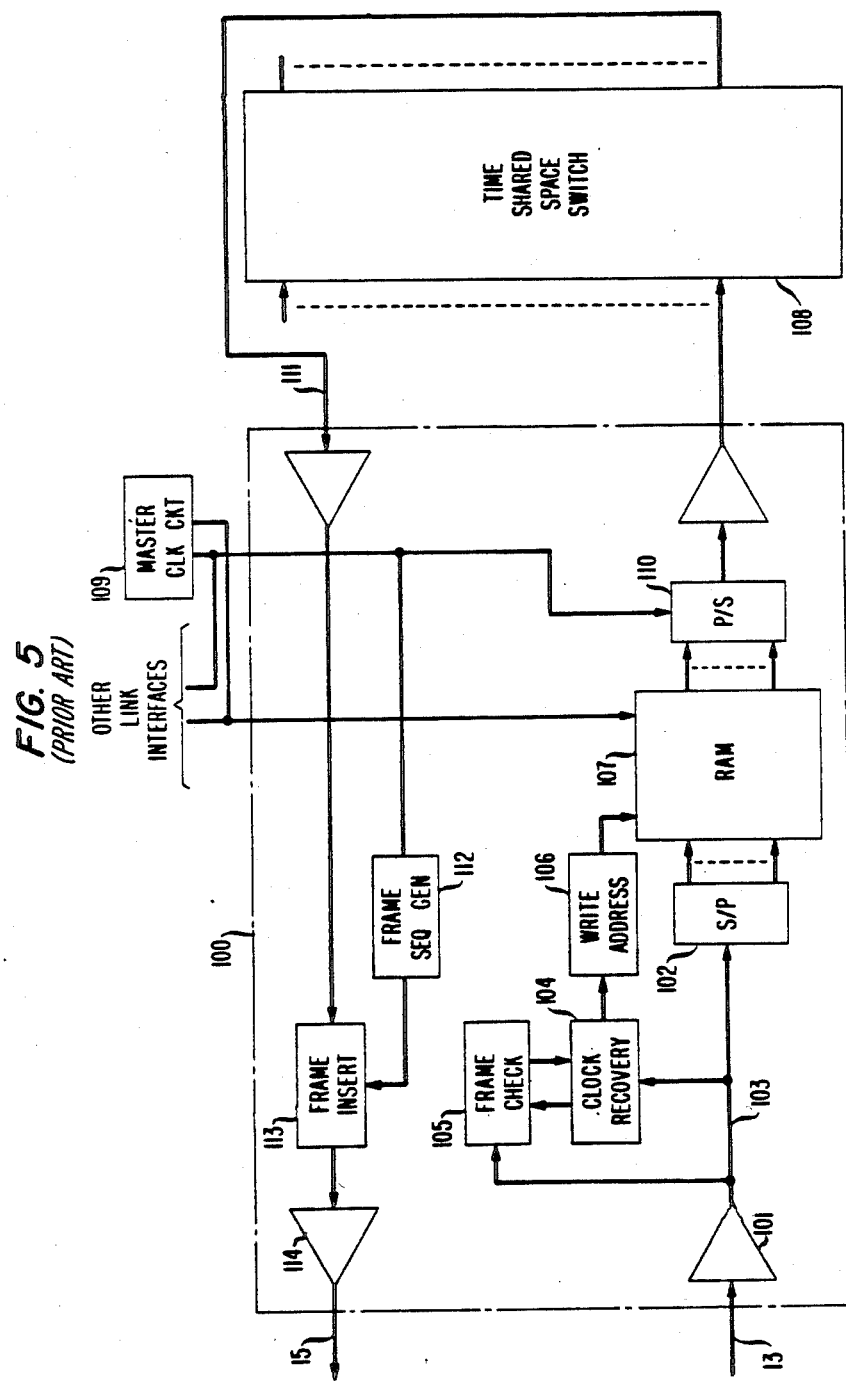
FIG. 5 is a diagram of an interface unit of a time-multiplexed switch which is utilized for communication with a time-slot interchange unit of System I.

The input and output terminals of time-multiplexed switch 10 can be considered in pairs for both terminals are connected to the same link interface. Further, each pair of input and output terminals of the time-multiplexed switch 10 is connected to a time-multiplexed switch link interface of a type similar to link interfaces 78 and 79. Link interface 78 is connected to a time-multiplexed switch link interface 100 (FIG. 5) including a receiver 101 which receives data words from time-multiplexed line 13 and transmits those data words to a serial-parallel register 102 via a time-multiplexed line 103. The bit stream from time-multiplexed line 103 is also applied to a clock recovery circuit 104 and a frame check circuit 105 which derive clock signals therefrom and determine if frame synchronism is present, respectively. Time-multiplexed switch link interface 100 further includes a write address generator 106 which generates a sequence of write addresses in response to signals from clock recovery circuit 104. Each data word transmitted to serial-parallel register 102 is then written into a random access memory 107 at the address generated by write address generator 106.

Time-multiplexed switch 10 also includes a time-shared space division switch 108 which operates in frames of 256 time slots of approximately 488 nanoseconds each to complete paths among its input and output terminals. Control information defining the switching path between the input and output terminals to be connected during each time slot is stored in control memory 29 (FIG. 2) which is read each time slot to establish those connections. Recall that each time slot has a numerical designation and that during a given time slot the data word channel having the same numerical designation is to be switched. Accordingly, all data words in a channel having a given numerical designation must be transmitted to the time-shared space division switch 108 during their associated time slot to avoid inaccurate switching. To this end, time-multiplexed switch 10 includes a master clock circuit 109 for generating a recurring sequence of 256 read addresses which are transmitted to each random access memory of each time-multiplexed switch link interface substantially simultaneously. Accordingly, random access memory 107 and the equivalent random access memories included in all other time-multiplexed switch link interfaces read a data word associated with the same time slot at substantially the same time. The data words read from random access memory 107 are transmitted to a parallel-serial shift register 110 from which they are transmitted to time-shared space division switch 108.

All data words to be transmitted on time-multiplexed line 15 to link interface 78 are received from the time-shared space division switch 108 on a conductor 111 within one time slot of their transmission into time-shared space division switch 108. Time-multiplexed switch link interface 100 includes a frame sequence generator 112 which generates a sequence of framing bits at the rate of one bit per time slot. The framing bits are transmitted to a frame insert circuit 113 which places the frame bit in bit position G of each data word on conductor 111. Each data word on conductor 111 is then transmitted via driver circuit 114 to link interface 78 via time-multiplexed line 15.

Centralized Routing

In System I, the overall control function is cooperatively accomplished by central control 30 and the control units in the switching modules, e.g., control unit 17 in switching module 201. For the purposes of the discussion which follows, control functions performed by the switching module control units are described simply as being performed by the switching modules. The overall processing task of the system is broken down into a number of major tasks called program processes. A process comprises a collection of procedures, each performing some subtask of the process. Associated with a process is a block of memory called a process control block which stores data applicable to the entire process, and a block of memory called a stack which stores data useful to the individual procedures of the process. Processes communicate with each other via messages. The same type of message is used in communicating with another process in the same processor, or another process in a different processor.

In System I, processes are of two types: terminal processes and system processes. System processes remain in existence as long as the system is operational. Terminal processes on the other hand remain in existence only for the duration of individual calls or service events such as diagnostic tests or service evaluation. For each call, two terminal processes are created—an originating terminal process in the switching module connected to the originating line or trunk and a terminating terminal process in the switching module connected to the terminating line or trunk. As an example, consider that subscriber set 25 connected to switching module 229 has just gone off-hook. The off-hook state is detected by scanning within line unit 21. A call processing control system process 2001 (FIG. 7) within switching module 229 is informed of such off-hook detection and, in response, creates an originating terminal process 2002. Originating terminal process 2002 is responsible for controlling the transmission of dial tone to subscriber set 25 and the subsequent reception of digits dialed from subscriber set 25. Originating terminal process 2002 analyzes the dialed digits to obtain values of four variables: PI, DI, DIGCNT and TREAT. The variable PI is the prefix index defining whether a prefix was dialed and if so the prefix type, e.g., the 0+ prefix used for operator-assisted toll calls or the 1+ prefix used for direct-dialed toll calls. The variable DI is the destination index which defines one of a number of possible destination categories for the call, e.g., based on the first three digits (the nxx digits) of the seven-digit directory number, the destination index may define that the destination is a local line or is accessible via one of a plurality of groups of trunks connecting the present system to certain other switching systems. The variable DIGCNT simply defines the number of digits dialed. The variable TREAT defines whether the dialed digits can be processed to complete a call or, as in the case where the calling party only partially dials the intended number, an appropriate announcement is to be transmitted to subscriber set 25. In addition, originating terminal process 2002 determines the value of a screen index SI, based on the characteristics of the originating line, e.g., whether it is a typical residential line or it is connected to a private branch exchange (PBX) or key system. Originating terminal process 2002 then formulates a route request message RTREQ in a message buffer. As shown in FIG. 14, the RTREQ message includes five fields: PATHDES, RTGDATA, DIALDATA, GPI and TREAT. (As with other data structures, messages and relations referred to herein, the RTREQ message may include additional fields not important in understanding the present description.)

The PATHDES field stores a path descriptor used to specify the path through the switching system to be used for the call. Such a path is completely described by specifying the originating peripheral time slot, the network time slot and the terminating peripheral time slot. The originating peripheral time slot is the particular one of the 512 time slots in which information from the originating line or trunk is received by receive time-slot interchanger 50 (FIG. 3) and in which information from transmit time-slot interchanger 53 (FIG. 3) is transmitted to the originating line or trunk. Similarly, the terminating peripheral time slot is the one of the 512 time slots that is used for communication with the terminating line or trunk. The network time slot is the selected commonly available time slot of the 512 time slots transmitted by the receive time-slot interchanger 50 in the originating switching module and of the 512 time slots received by the transmit time-slot interchanger 53 in the destination switching module. To establish the complete path, information must be stored in the control RAM 55 (FIG. 3) in both the originating and terminating switching modules defining the mapping between peripheral time slot and network time slot to be accomplished by time-slot interchange. Intra-module calls are not transmitted through time-multiplexed switch 10. However, for inter-module calls, information is stored in control memory 29 defining that during the network time slot selected for a given call, time-multiplexed switch 10 must provide a path from the originating switching module to the terminating switching module. In the present example, originating terminal process 2002 only knows the originating peripheral time slot for the call at this time. The remainder of the PATHDES field is left blank.

The RTGDATA field is used to store a number of variables used to implement certain call processing features not important to the understanding of the present description and not further described herein. The RTGDATA field also stores a variable TERMTYP used subsequently to define the type of termination for the call, i.e., whether a line, trunk or announcement termination. The DIALDATA field is used to store the variables PI, DI, SI, and DIGCNT determined by originating terminal process 2002 as well as the received dialed digits. The GPI field is used to store the global port identity of the port connected to originating subscriber set 25. The point at which a given line or trunk is connected to the switching system of FIG. 2 is referred to herein as a port. (In the case of a multiple-channel digital facility, each channel is considered to be connected to a different port.) Each port of the system has a unique global port identity. A number of announcement circuits included in digital service unit 67 (FIG. 3) each also have unique global port identities. For ports connected to party lines, the GPI field also identifies the individual parties on those lines. In the RTREQ message, the GPI field defines the global port identity of the originating port. The TREAT field is used to store the TREAT variable determined by originating terminal process 2002.

Once the RTREQ message has been formulated, it is transmitted by originating terminal process 2002 to a routing system process 2003 (FIG. 7) in central control 30. Routing system process 2003 stores the RTREQ message in a data structure referred to as a routing data block (RDBLK) 2101. Routing system process 2003 uses the information in the RTREQ message to access a centralized database, in a manner described in detail herein, in order to determine the global part identity of the terminating port. Routing system process 2003 also selects an available network time slot to be used for the call and, if the terminating port is connected to a different switching module than the originating port, writes information defining the selected time slot into control memory 29. Routing system process 2003 then formulates depending on the value of the TERMTYP variable, a line termination request (LNTREQ) message, a trunk termination request (TKTREQ) message or an announcement termination request (ANTREQ) message in a message buffer. As shown in FIG. 14, the LNTREQ message includes four fields: PATHDES, RTGDATA, FARPID and GPI. The PATHDES and RTGDATA fields were previously described with respect to the RTREQ message. However the network time slot as determined by routing system process 2003 is added into the PATHDES field. The FARPID field is used to store a process identifier defining the originating terminal process, in the present example, originating terminal process 2002, as determined from the header of the RTREQ message. The GPI field stores the global port identity of the terminating port as determined by routing system process 2003. When the terminating port is connected to a trunk or to an announcement circuit, a TKTREQ message or an ANTREQ message is formulated. As shown in FIG. 14, the TKTREQ message and the ANTREQ message include the same fields as the LNTREQ message and, in addition, the TKTREQ message includes a DIGDATA field used to store the digits to be transmitted over the trunk to another switching system. Assume for the present example that the terminating port determined by routing system process 2003 (FIG. 7) is connected to subscriber set 23. The LNTREQ message formulated in the message buffer is transmitted by routing system process 2003 to a termination system process 2004 in switching module 201. In response, process 2004 reads a busy/idle map (also referred to later herein as the PORTSTATUS relation) stored in switching module 201 to determine whether subscriber set 23 is presently busy or idle. If subscriber set 23 is idle, process 2004 creates a terminating terminal process 2005 and forwards the information received in the LNTREQ message to process 2005 via a line termination (LNTERM) message (or, in a trunk termination (TKTERM) message or an announcement termination (ANTERM) message, if a TKTREQ message or an ANTREQ message had been received). Terminating terminal process 2005 effects the transmission of ringing voltage to subscriber set 23, and the transmission of an E-bit continuity signal, described in the above-cited Beuscher et al. U.S. Pat. No. 4,322,843, and audible ringing tones to switching module 229. Terminating terminal process 2005 then transmits a setup complete (SETUPCOMP) control message to originating terminal process 2002 in switching module 229 including the now completed path descriptor PATHDES. In response, originating terminal process 2002 effects the transmission of the E-bit continuity signal to switching module 201. When switching module 201 receives the E-bit continuity signal from switching module 229, terminating terminal process 2005 determines the terminating peripheral time slot to be used to communicate with subscriber set 23 and writes information in the control RAM 55 of switching module 201 defining the mapping between the terminating peripheral time slot and the network time slot. Similarly, when switching module 229 receives the E-bit continuity signal from switching module 201, originating terminal process 2002 determines the originating peripheral time slot to be used to communicate with subscriber set 25 and writes information in the control RAM 55 of switching module 229 defining the mapping between the originating peripheral time slot and the network time slot. The communication path between subscriber sets 25 and 23 has now been set up.

Figure 7:
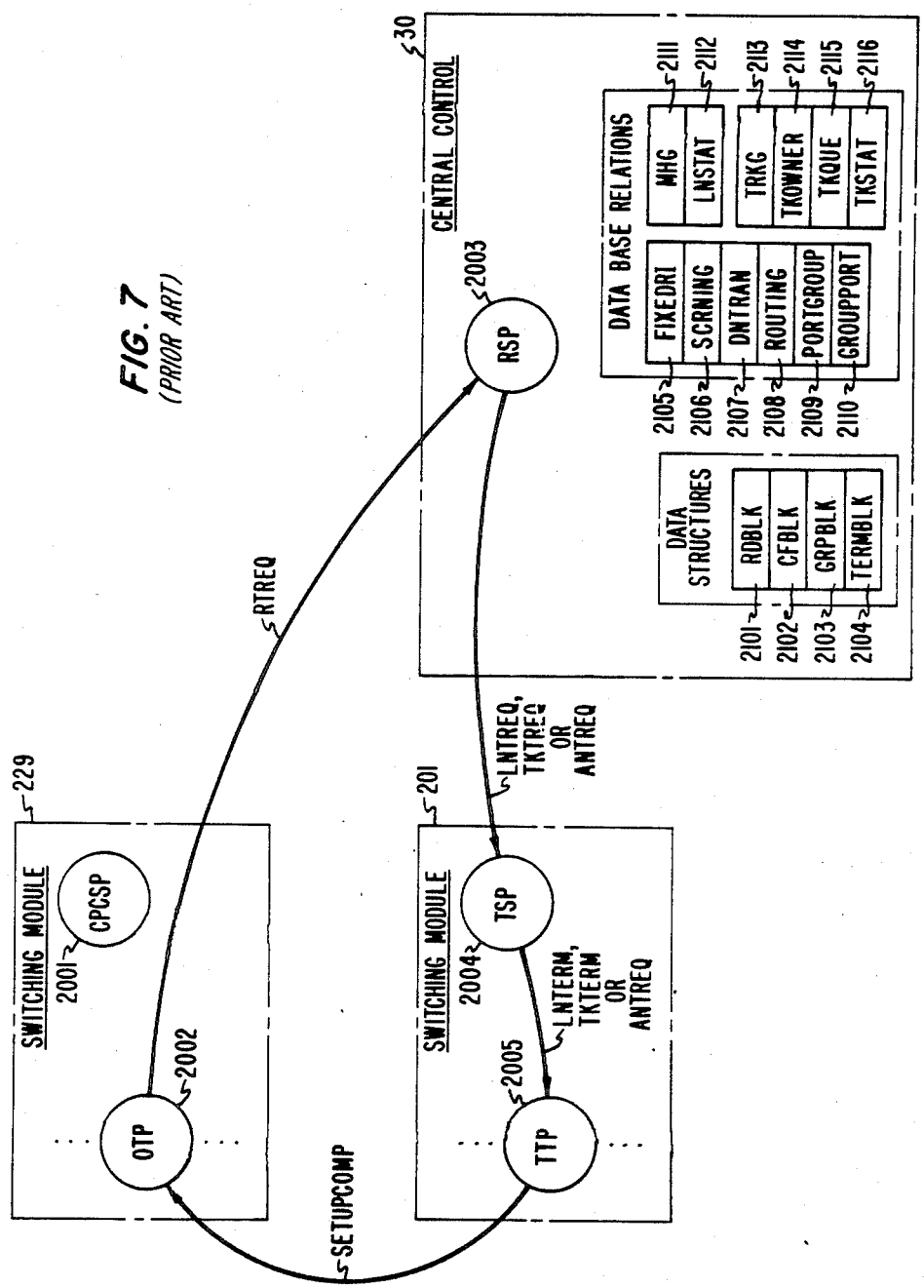
FIG. 7 is a functional diagram used to illustrate an exemplary call setup sequence in System I.
Figure 8:
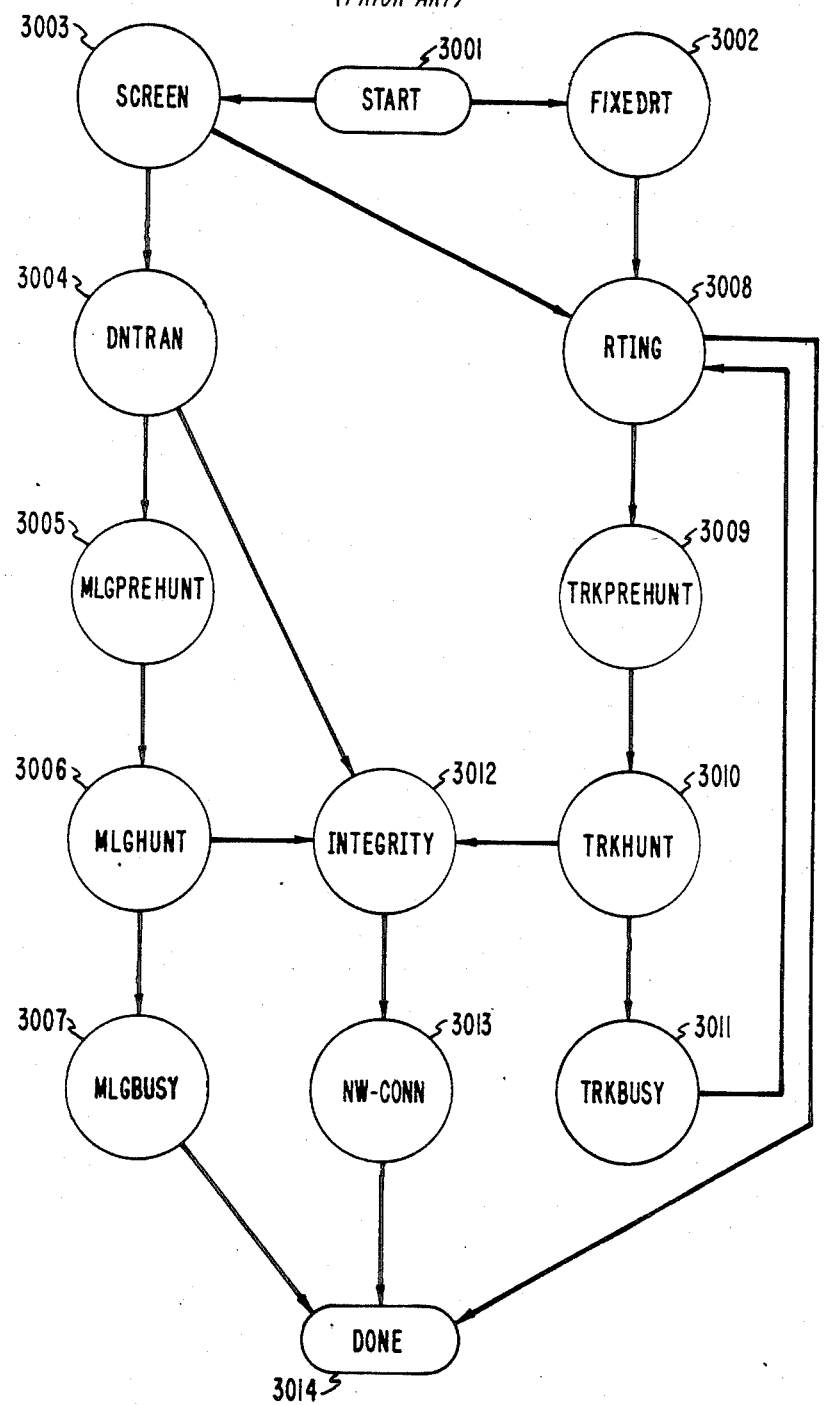
FIG. 8 is a state diagram for a routing program used in System I.
Figure 9:
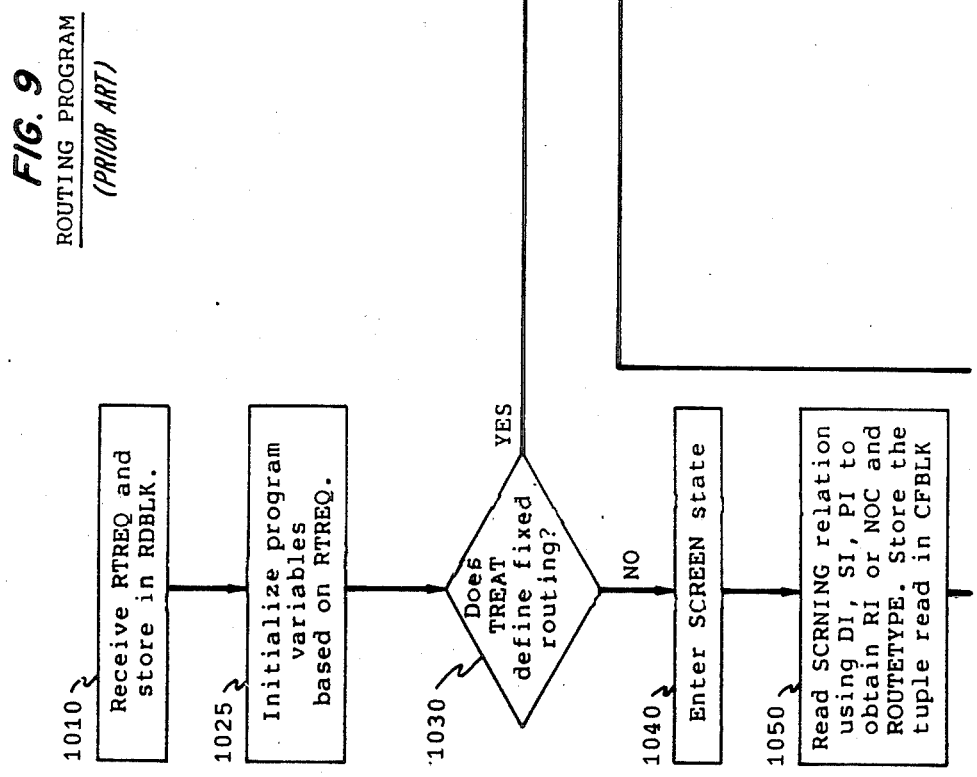
FIGS. 9 through 13, when arranged in accordance with FIG. 44, present a flow chart for the routing program used in System I.
Figure 10:
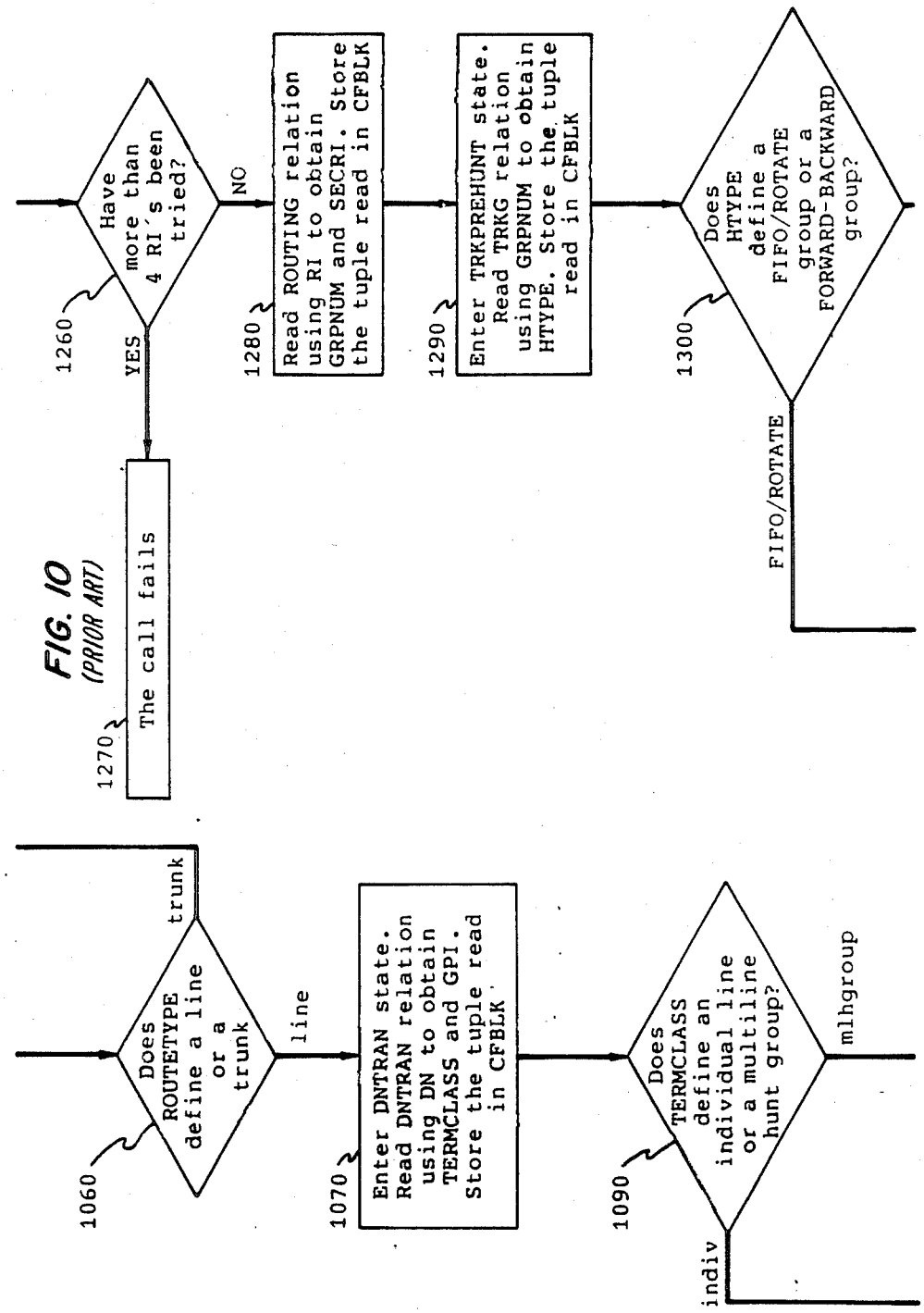
Figure 11:
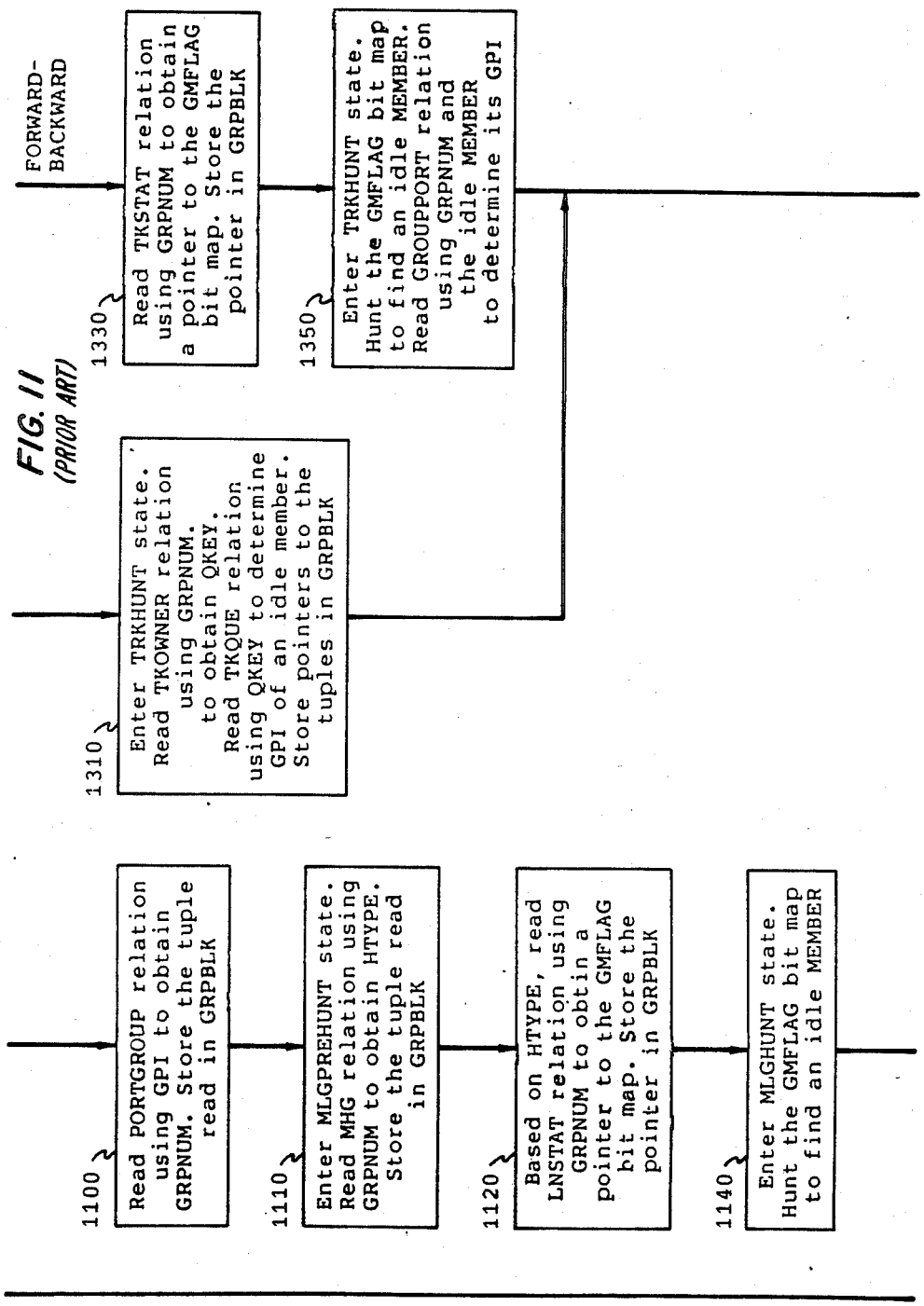
Figure 12:
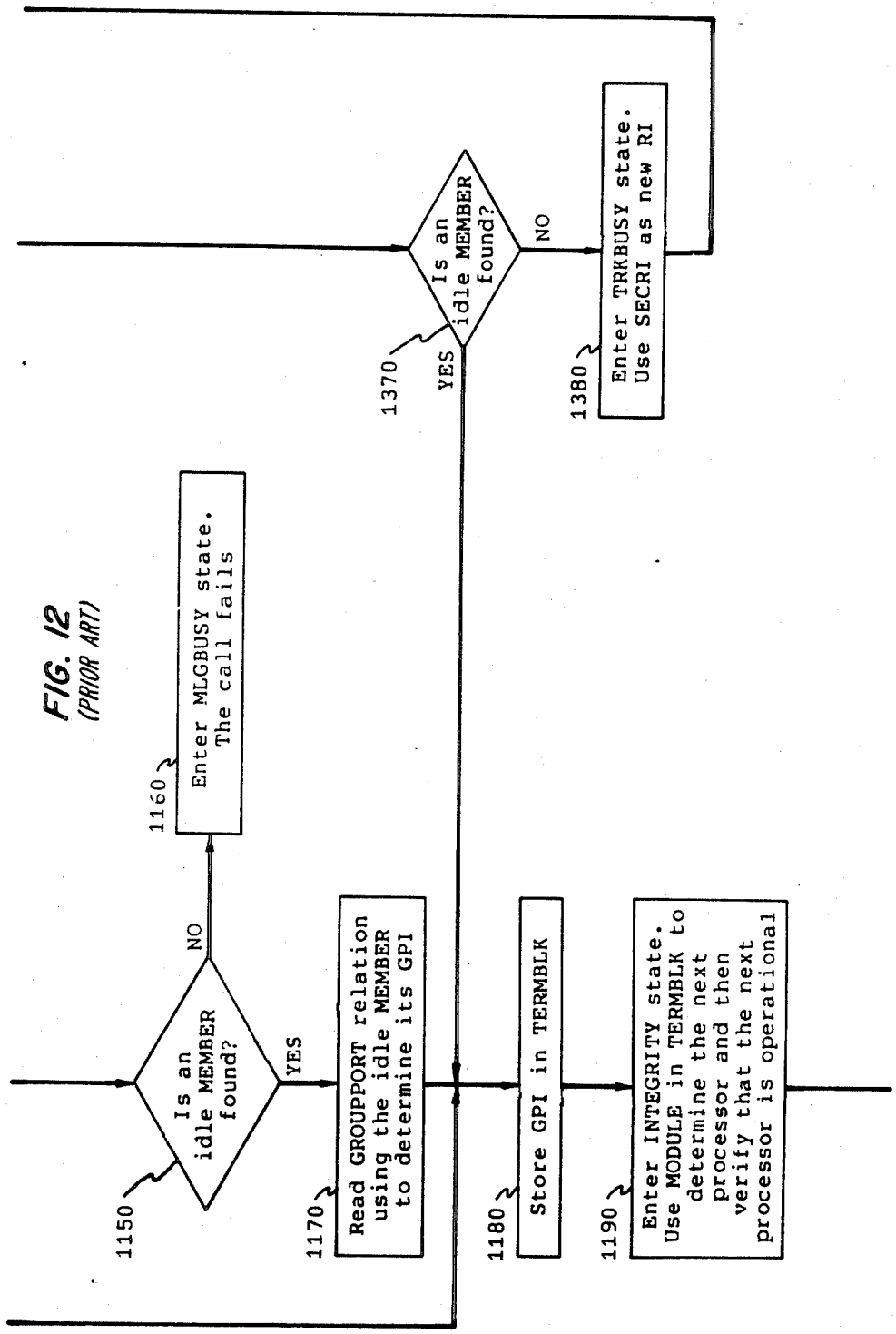
Figure 13:
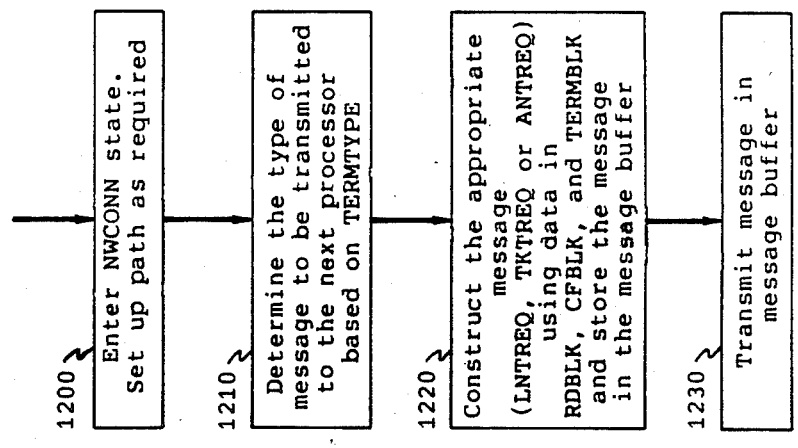

Recall that routing system process 2003 performed three basic functions in the described example—determining the terminating port and its global port identity, selecting an available network time slot and, for inter-module calls, setting up the path through time-multiplexed switch 10, i.e., writing information defining the selected time slot in control memory 29. A flow chart of the routing program executed by routing system process 2003 in performing these functions is shown in FIGS. 9 through 13. A state diagram defining the operational states of routing system process 2003 is shown in FIG. 8. In System I presently being described, the single routing system process 2003 performs the functions of terminating port determination and network time slot selection for all calls within the system. Routing system process 2003 also performs the function of time-multiplexed switch 10 path setup for all inter-module calls. Routing system process 2003 processes one call at a time—i.e., it responds to each RTREQ message by executing the routing program to generate either a LNTREQ message, a TKTREQ message or an ANTREQ message. As shown in FIG. 7, routing system process 2003 uses four data structures during program execution—a routing data block (RDBLK) 2101, a call flow block (CFBLK) 2102, a group block (GRPBLK) 2103 and a termination block (TERMBLK) 2104. Routing system process 2003 also has access to a centralized database comprising 12 relations 2105 through 2116 described later herein.

Relational databases are considered to be a collection of relations, as described in C. J. Date, *An Introduction to Database Systems,* 3rd edition, Addison-Wesley, 1981. A relation can be considered as a rectangular table. Rows in the table are called tuples and columns are attributes having unique names. A named attribute in a specific tuple is referred to as an item. A key is a subset of attributes whose values are used to uniquely identify a tuple of the relation. A key is said to be composite if it consists of more than one attribute. Occasionally, a relation may have more than one candidate key. In that case, one of the candidates is designated as the primary key of the relation. Each attribute can take on a specific set of values, called the domain of the attribute. An illustrative relation named PART is shown in Table 1.

TABLE 1

| | | The Relation PART | | |
|---|---|---|---|---|
| P# | PNAME | COLOR | WEIGHT | CITY |
| P1 | Nut | Green | 13 | Amsterdam |
| P2 | Bolt | Red | 18 | Tel Aviv |
| P3 | Bolt | Blue | 18 | Rome |
| P4 | Screw | Blue | 15 | London |
| P5 | Cam | Yellow | 13 | Paris |
| P6 | Cog | Black | 20 | Rome |

The attribute P# is the primary key of the relation since specifying its value serves to uniquely identify a tuple of the relation. For example, specifying P#=P4 identifies the tuple (P4, Screw, Blue, 15, London).

The execution of the routing program (FIGS. 9 through 13) begins in the START state 3001 (FIG. 8) when a PTREQ message is received. During block 1010 (FIG. 9), the received RTREQ message is stored in the first two fields—the HEADER field and the TEXT field—of the routing data block RDBLK (FIG. 15). The message header is analyzed and the process identity of the originating terminal process is stored in the ORIGTPI field of RDBLK. The RTGSTATE field of the RDBLK defines the state in the state diagram of FIG. 8 that the routing program is presently in. The RTGSTATE field is updated to define the next state before each state transition occurs. The RICOUNT field is used in connection with trunk routing as described later herein.

Execution proceeds first to block 1025 (FIG. 9) during which a number of program variables are initialized based on the RTREQ. message, and then to decision block 1030 during which it is determined whether the variable TREAT as received in the RTREQ message defines a request for fixed routing, for example, routing to an announcement informing the originating subscriber that the number was only partially dialed. If the variable TREAT defines fixed routing, execution proceeds to block 1240 during which the FIXEDRT state 3002 (FIG. 8) is entered. One of the variables initialized is TERMTYP which defines that the requested termination is an announcement circuit. The FIXEDRI relation (FIG. 16) is read using TREAT as the key to obtain a route index (RI) that will be subsequently used to find the global port identity of the appropriate announcement circuit. The tuple of the FIXEDRI relation defined by the key TREAT is stored in the call flow block CFBLK (FIG. 15).

However, if the variable TREAT does not define fixed routing, execution proceeds from block 1030 to block 1040 during which the SCREEN state 3003 (FIG. 8) is entered. During block 1050, the SCRNING relation (FIG. 16) is read using the variables DI, SI and PI as the composite key. The SCRNING relation includes the attributes RI, NOC and ROUTETYPE. The ROUTETYPE attribute defines whether the terminating port is connected to a line or a trunk. In the case of a line, the NOC attribute defines the normalized office code of the terminating port. The normalized office code represents an encoding of the first three digits (nxx) of a seven-digit directory number. For example, the nxx numbers 355, 357 and 420 of a typical central office might be encoded as the normalized office codes 1, 2 and 3. When the ROUTETYPE attribute defines a trunk, the RI attribute defines a route index into the ROUTING relation (FIG. 16) which is subsequently read to obtain the number of a particular trunk group. The tuple read from the SCRNING relation as defined by the composite key DI, SI and PI, is stored in the CFBLK (FIG. 15).

Execution proceeds to decision block 1060 during which the ROUTETYPE attribute is examined to determine whether the requested termination is a line or a trunk. If the ROUTETYPE attribute defines a line, execution proceeds to block 1070 and the DNTRAN state 3004 (FIG. 8) is entered. The TERMTYP variable is set to define that the requested termination is a line. Recall that the digits dialed by the originating subscriber set were transmitted as part of the RTREQ message and that the normalized office code (NOC) was obtained by reading the SCRNING relation. Directory numbers (DNs) stored by central control 30 for the purpose of directory number translation are not stored as seven-digit numbers but rather as five-digit numbers comprising the combination of the single-digit NOC with the last four dialed digits. The DN obtained by combining the NOC from the SCRNING relation with the last four dialed digits received in the RTREQ message is used as a key to read the DNTRAN relation (FIG. 16). The DNTRAN relation includes a TERMCLASS attribute which defines whether the line defined by the key is an individual line or is part of a multi-line hunt group, and the GPI attribute which defines the global port identity of the line. The tuple of the DNTRAN relation defined by the key DN is stored in the CFBLK (FIG. 15) and execution proceeds to decision block 1090.

During block 1090, a determination is made based on the TERMCLASS attribute, of whether the defined line is an individual line or is part of a multi-line hunt group. When an individual line is indicated, the function of determining the terminating port has been completed and execution proceeds to block 1180 during which the GPI of the terminating port is stored in the TERMBLK (FIG. 15). Note that the GPI comprises two fields—the MODULE field defining which of the switching modules includes the terminating port and the PORT field defining a particular one of the ports on that switching module.

Execution proceeds to block 1190 and the INTEGRITY state 3012 (FIG. 8) is entered. Central control 30 periodically communicates with the control units of each of the switching modules to verify their operational status and maintains such status information in a status table. During block 1190, the status table is read using the MODULE field stored in the TERMBLK, to verify that the processor in the defined switching module is operational. In block 1200, the NWCONN state 3013 (FIG. 8) is entered. During block 1200 an available network time slot is selected and, if the call is an intermodule call, the instructions defining the selected time slot are stored in control memory 29. In block 1210, the TERMTYP variable is used to determine whether a LNTREQ message, a TKTREQ message or an ANTREQ message is to be formulated in the message buffer. The appropriate message is then constructed during block 1220 using data in the RDBLK, CFBLK and TERMBLK data structures. Execution then proceeds to block 1230 during which the message stored in the message buffer is transmitted to the control unit in the terminating switching module and the DONE state 3014 (FIG. 8) is entered.

Returning to decision block 1090, if the TERMCLASS attribute, rather than defining an individual line, instead defines a multi-line hunt group, execution proceeds from block 1090 to block 1100. A multi-line hunt group is a group of lines which share the same directory number or set of directory numbers. In block 1100, the PORTGROUP relation (FIG. 16) is read using as a key the GPI obtained from the DNTRAN relation. The PORTGROUP relation includes the GRPNUM attribute which defines the number of a multi-line hunt group and the MEMBER attribute which defines the particular member of a given group. The tuple read from the PORTGROUP relation is stored in the GRPBLK (FIG. 15), execution proceeds to block 1110 and the MLGPREHUNT state 3005 (FIG. 8) is entered. During block 1110, the MHG relation (FIG. 17) is read using the GRPNUM attribute as a key. The MHG relation includes the HTYPE attribute which defines one of a number of relations that store the dynamic busy/idle data for multi-line hunt groups, only the LNSTAT relation (FIG. 17) being included in the present description for illustration. The tuple read from the MHG relation is stored in the GRPBLK (FIG. 15). Given that the HTYPE attribute defines the LNSTAT relation, execution proceeds to block 1120. During block 1120, the LNSTAT relation is read using the GRPNUM attribute as a key. The LNSTAT relation includes the GMFLAG bit map defining the busy/idle status of each member of the hunt group. Rather than storing the entire bit map, a pointer to that bit map is stored in the GRPBLK (FIG. 15), execution proceeds to block 1140 and the MLGHUNT state 3006 (FIG. 8) is entered. During block 1140, an idle member of the hunt group is selected. The GMFLAG bit map accessible via the stored pointer is used to determine idle members. The selection is made in accordance with a predetermined hunt algorithm based on the HTYPE attribute. Execution proceeds to block 1150 during which it is determined whether the hunting done during block 1140 is successful in finding an idle hunt group MEMBER. If no such MEMBER is found, execution proceeds to block 1160, the MLGBUSY state 3007 (FIG. 8) is entered and the call fails. If, however, an idle MEMBER is found, execution proceeds to block 1170 and the GROUPPORT relation (FIG. 16) is read using the idle MEMBER and the GRPNUM attribute as keys to obtain the GPI of the terminating port. The function of determining the terminating port has now been completed and execution proceeds to block 1180 and proceeds through blocks 1190, 1200, 1210, 1220 and 1230 as described above.

Returning to decision block 1060, if the ROUTETYPE attribute, rather than defining a line, instead defines a trunk, execution proceeds from block 1060 to block 1250. The variable TERMTYPE is set to define that the requested termination is a trunk if block 1250 is reached from block 1060. Block 1250 is also reached from block 1240. In block 1250, the RTING state 3008 (FIG. 8) is entered, the RICOUNT variable in the RDBLK is incremented and execution proceeds to decision block 1260. During block 1260 it is determined whether more than a fixed number, e.g., four, route indices (RIs) have been tried to complete the call. If so, execution proceeds to block 1270 and the call fails. However, if four or less RIs have been tried, execution proceeds to block 1280 during which the ROUTING relation (FIG. 16) is read using RI as a key. The ROUTING relation includes the GRPNUM attribute which is the number of a particular trunk group, and the SECRI attribute which is a secondary route index to use in case the call cannot be completed to the defined trunk group. The tuple from the ROUTING relation is stored in the CFBLK (FIG. 15).

Execution proceeds to block 1290 and the TRKPREHUNT state 3009 (FIG. 8) is entered. The TRKG relation (FIG. 18) is read using GRPNUM as a key. The TRKG relation includes the HTYPE attribute which defines the type of hunting to be used for the group. The TRKG tuple read is stored in the GRPBLK (FIG. 15) and execution proceeds to decision block 1300 during which it is determined whether the HTYPE attribute defines a first-in-first-out (FIFO) group, a rotate group or a forward/backward group. In the present example, the hunt group is either a FIFO group in the case of one-way outgoing trunks, a rotate group in the case of announcement circuits, or a forward/backward group in the case of two-way trunks. In FIFO hunt groups, trunks are assigned in the order that key become idle. In rotate hunt groups, announcement circuits are assigned on a rotational basis so that their use is equally distributed. In forward/backward hunt groups, a given switching system always hunts for an idle group member starting at the beginning of the group list while the switching system connected at their other end of the trunks, hunts for an idle group member starting at the end of the group list to reduce the likelihood of glare. If HTYPE defines a FIFO group or a rotate group, execution proceeds to block 1310 and the TRKHUNT state 3010 (FIG. 8) is entered. The TKOWNER relation (FIG. 18) is first read to obtain the attribute QKEY which is then used as a key to read the TKQUE relation (FIG. 18). The TKQUE relation includes the GPI attribute which defines the global port identity of the idle group member to be used for the call. The TKQUE relation also includes the NIM attribute which defines the next idle member of the group to be used the next time the TKQUE relation is accessed. Pointers to the tuples from the TKOWNER relation and the TKQUE relation are stored in the GRPBLK (FIG. 15).

Returning to decision block 1300, if HTYPE defines a forward/backward group, execution proceeds to block 1330 during which the TKSTAT relation (FIG. 18) is read using GRPNUM as a key. The TKSTAT relation includes the GMFLAG bit map defining the busy/idle status of each member of the trunk group. Rather than storing the entire bit map, a pointer to that bit map is stored in the GRPBLK (FIG. 15), execution proceeds to block 1350 and the TRKHUNT state 3010 (FIG. 8) is entered. During block 1350, an idle member of the trunk group is selected in accordance with the predetermined forward or backward algorithm using the GMFLAG bit map accessible via the stored pointer. Using GRPNUM and the selected idle MEMBER as a composite key, the GROUPPORT relation (FIG. 16) is read to determine the GPI.

After the completion of either block 1350 or block 1310, execution proceeds to decision block 1370 during which it is determined whether the hunting done in blocks 1350 or 1310 was successful in finding an idle trunk group MEMBER. If no such MEMBER was found, execution proceeds to block 1380 and the TRKBUSY state 3011 (FIG. 8) is entered. The secondary route index (SECRI) read from the ROUTING relation is made the next route index (RI) and execution returns back to block 1250. However, if an idle MEMBER was found, the function of determining the terminating port has been completed and execution proceeds to block 1180 and proceeds through blocks 1190, 1200, 1210, 1220 and 1230 as described above.

SYSTEM II

Figure 20:
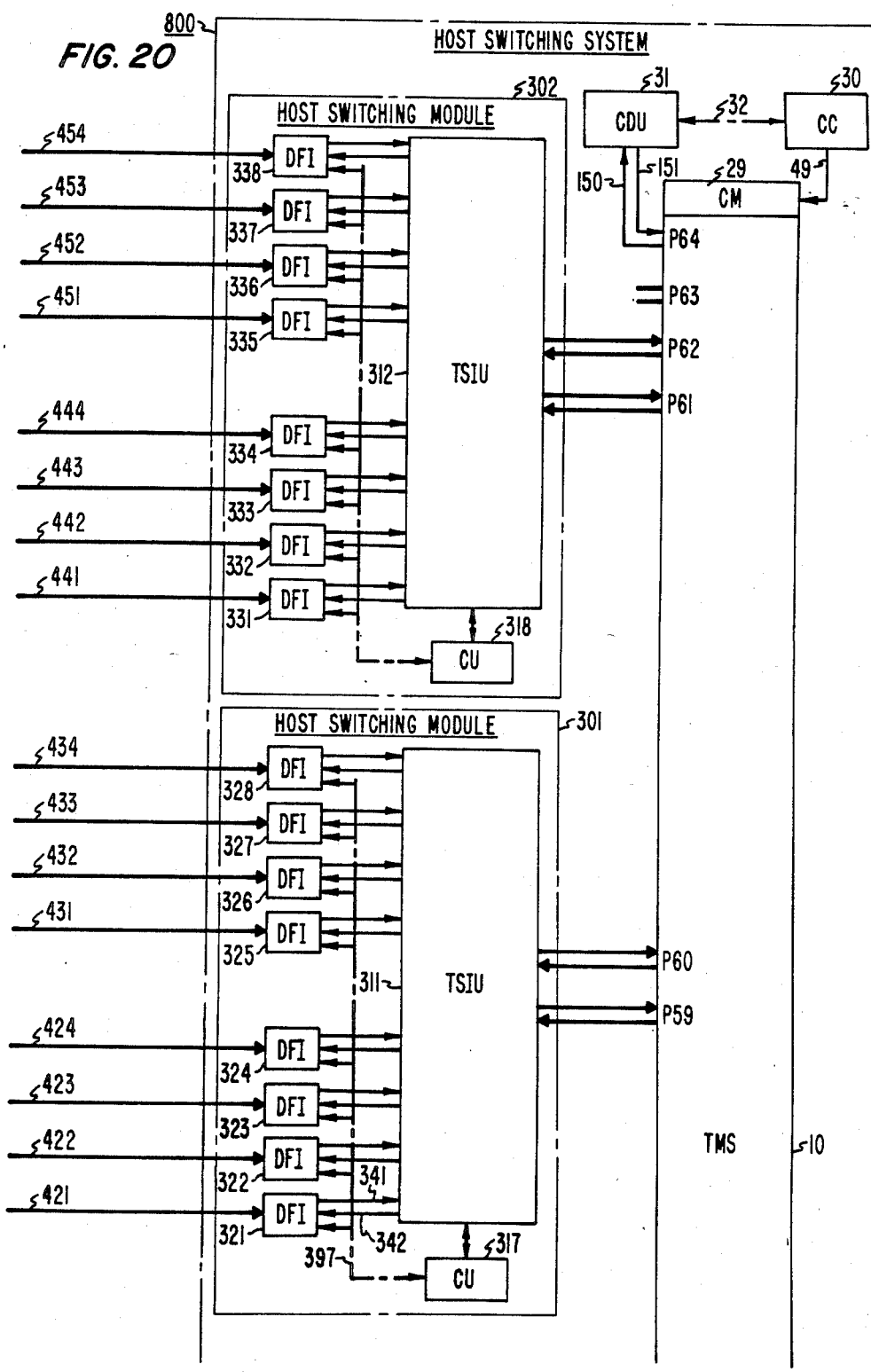
Figure 21:
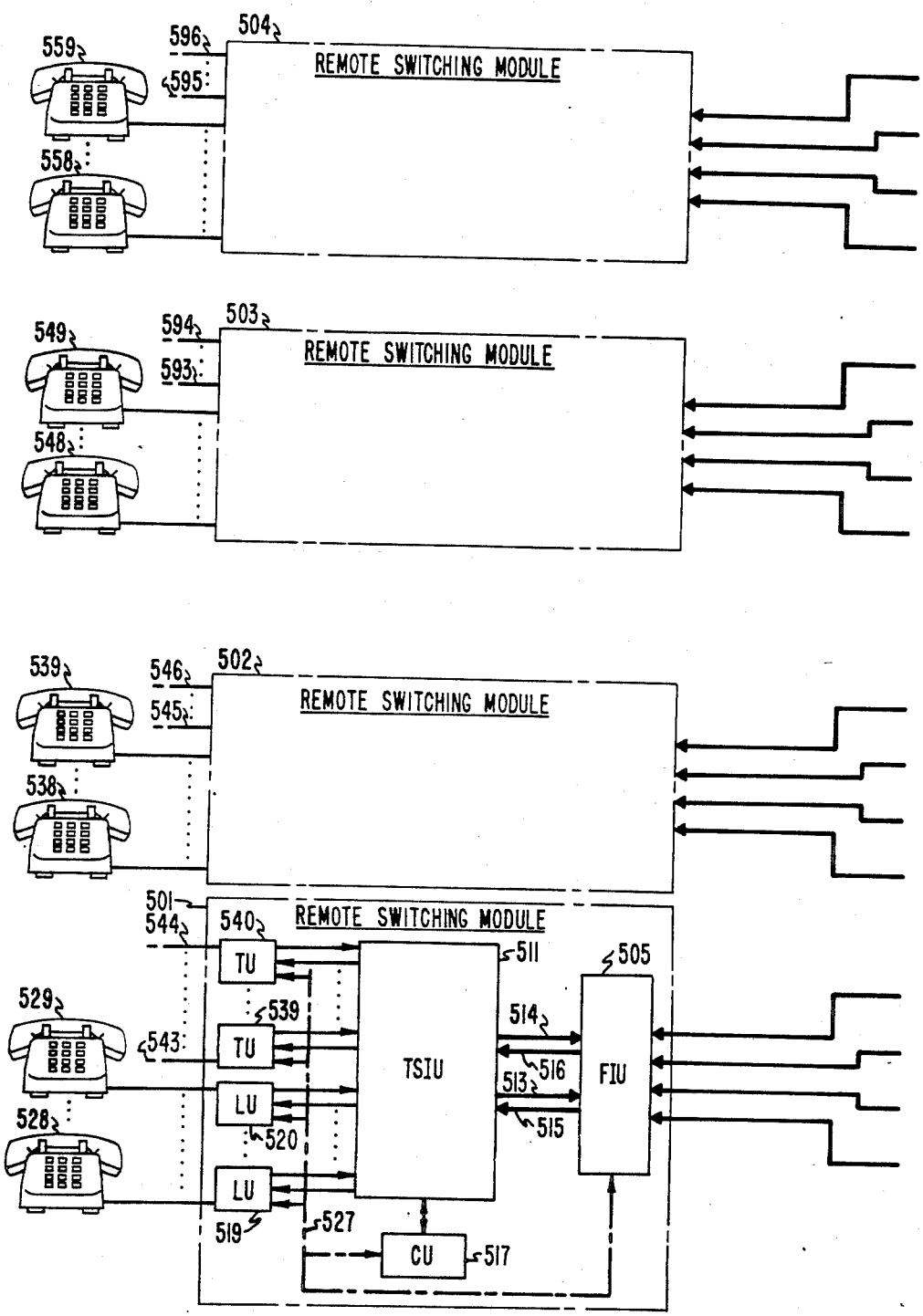

A time division switching system which includes a remote switching capability is shown in FIGS. 19 through 21, when arranged in accordance with FIG. 22. The system, which is referred to herein as System II, includes a host switching system 800 (FIGS. 19 and 20) and four, individual remote switching modules 501, 502, 503 and 504 (FIG. 21). Host switching system 800 comprises the time division switching system of FIG. 2, as described above, and two host switching modules 301 and 302, module 301 being connected to input/output terminal pairs P59 and P60 of time-multiplexed switch 10 and module 302 being connected to input/output terminal pairs P61 and P62. In this embodiment, each remote switching module is connected to a host switching module via four bidirectional, digital transmission facilities such as the T1 carrier system disclosed in the J. H. Green et al., U.S. Pat. No. 4,059,731. Specifically, host switching module 301 is connected to module 501 by transmission facilities 421 through 424 and to module 502 by transmission facilities 431 through 434 and host switching module 302 is connected to module 503 by transmission facilities 441 through 444 and to module 504 by transmission facilities 451 through 454.

Host switching module 301 includes a time-slot interchange unit 311 and an associated control unit 317 which are substantially identical to time-slot interchange unit 11 and control unit 17, respectively. Time-slot interchange unit 311 transmits and receives information via two 256-channel time-multiplexed lines connected to input/output terminal pairs P59 and P60 of time-multiplexed switch 10. Control channel 59 at input/output terminal pair 59 and control channel 60 at input/output terminal pair P60 are used to convey control messages between control unit 317 and control distribution unit 31. The digital facility interfaces 321 through 328 interfacing time-slot interchange unit 311 and the transmission facilities 421 through 424 and 431 through 434 are substantially identical. Digital facility interface 321 is described in detail in the above-cited Chodrow et al. U.S. Pat. No. 4,550,404.

Host switching module 302, comprising time-slot interchange unit 312, control unit 318 and digital facility interfaces 331 through 338, is substantially identical to module 301. Control unit 318 and control distribution unit 31 exchange control messages using control channel 61 at input/output terminal pair P61 and control channel 62 at input/output terminal pair P62.

The four remote switching modules 501 through 504 are substantially identical. Each remote switching module includes a facilities interface unit which, in the present embodiment, interfaces with the four digital transmission facilities from a host switching module. For example, remote switching module 501 (FIG. 21) includes facilities interface unit 505 which interfaces with facilities 421 through 424 from host switching module 301. Facilities interface unit 505 multiplexes and transmits the information received on the four transmission facilities connected thereto, in predetermined channels on a pair of 256-channel time-multiplexed lines 515 and 516 connected to a time-slot interchange unit 511 and appropriately demultiplexes and transmits information, received from time-slot interchange unit 511 on a pair of 256-channel time-multiplexed lines 513 and 514, in predetermined channels on the four transmission facilities. Facilities interface unit 505 is described in detail in the above-cited Chodrow et al. U.S. Pat. No. 4,550,404. Remote switching module 501 also includes a control unit 517 associated with time-slot interchange unit 511 and a plurality of peripheral units, e.g., line units 519 and 520 serving subscriber sets such as sets 528 and 529 and trunk units 539 and 540 connected to trunks 543 and 544. The relationship of time-multiplexed lines 513 through 516, time-slot interchange unit 511, control unit 517, line units 519 and 520, subscriber sets 528 and 529, trunk units 539 and 540 and trunks 543 and 544 is substantially the same as that of time-multiplexed lines 13 through 16, time-slot interchange unit 11, control unit 17, line units 19 and 20 subscriber sets 23 and 24, trunk units 39 and 40 and trunks 43 and 44.

In the present embodiment, channel 1 on two of the four transmission facilities interconnecting a given remote switching module, e.g., 501, to host switching module 301 is established as a control channel. Accordingly, there are eight control channels between the four remote switching modules 501 through 504 and control distribution unit 31. The four control channels received by time-slot interchange unit 311 from transmission facilities 421 through 424 and 431 through 434 are conveyed to time-multiplexed switch 10 in channels 63 and 64 at input/output terminal pair P59 and channels 65 and 66 at input/output terminal pair P60. Similarly, the four control channels received by time-slot interchange unit 312 from transmission facilities 441 through 444 and 451 through 454 are conveyed to time-multiplexed switch 10 in channels 67 and 68 at input/output terminal pair P61 and channels 69 and 70 at input/output terminal pair P62. Central control 30 writes the appropriate instructions into control memory 29 such that channels 63 and 64 at input terminal P59, channels 65 and 66 at input terminal P60, channels 67 and 68 at input terminal P61 and channels 69 and 70 at input terminal P61 are always transmitted via output terminal P64 to control distribution unit 31 and such that channels 63 and 64 at input terminal P64 are transmitted to output terminal P59, channels 65 and 66 at input terminal P64 are transmitted to output terminal P60, channels 67 and 68 at input terminal P64 are transmitted to output terminal P61 and channels 69 and 70 at input terminal P64 are transmitted to output terminal P62. In this embodiment, control distribution unit 31 must be able to accommodate 70 of the 256 possible control channels at input/output terminal pair P64 rather than only 58 as in the control distribution unit 31 of System I.

Although the primary mode of control communication between the remote switching modules and the host switching modules is via the above-described control channels of time-multiplexed switch 10 and control distribution unit 31, control communication also occurs, in a manner described in the above-cited Chodrow et al. U.S. Pat. No. 4,550,404, (using what is referred to as the derived data link on the transmission facilities, e.g., 421 through 424. The derived data link is described in U.S. Pat. No. 4,245,340, J. E. Landry.

Distributed Routing

In contrast to System I where the routing function is centrally performed by central control 30, in System II the routing function is distributed to the remote switching modules 501 through 504. Recall that in System I only central control 30 has a routing system process, process 2003 (FIG. 7), and its associated data structures, RDBLK 2101, CFBLK 2102, GRPBLK 2103 and TERMBLK 2104 and the centralized database comprising the FIXEDRI relation 2105, the SCRNING relation 2106, the DNTRAN relation 2107, the ROUTING relation 2108, the PORTGROUP relation 3109, the GROUPPORT relation 2110, the MHG relation 2111, the LNSTAT relation 2112, the TRKG relation 2113, the TKOWNER relation 2114, the TKQUE relation 2115 and the TKSTAT relation 2116. In System II, central control 30 similarly has a routing system process, process 3603 (FIG. 23), and the associated data structures, RDBLK 3101, CFBLK 3102, GRPBLK 3103 and TERMBLK 3104 and the database comprising the FIXEDRI relation 3105, the SCRNING relation 3106, the DNTRAN relation 3107, the ROUTING relation 3108, the PORTGROUP relation 3109, the GROUPPORT relation 3110, the MHG relation 3111, the LNSTAT relation 3112, the TRKG relation 3113, the TKOWNER relation 3114, the TKQUE relation 3115 and the TKSTAT relation 3116. In addition however, each remote switching module has a routing system process and the associated data structures and database. For example, remote switching module 501 has routing system process 3602 (FIG. 23), the associated data structures RDBLK 3201, CFBLK 3202, GRPBLK 3203 and TERMBLK 3204 and the database comprising the FIXEDRI relation 3205, the SCRNING relation 3206, the DNTRAN relation 3207, the ROUTING relation 3208, the PORTGROUP relation 3209, the GROUPPORT relation 3210, the MHG relation 3211, the LNSTAT relation 3212, the TRKG relation 3213, the TKOWNER relation 3214, the TKQUE relation 3215 and the TKSTAT relation 3216. The remote switching modules 502, 503 and 504 each similarly has a routing system process and associated data structures and database. In System II, the RDBLK data structure includes a RTSEQ field and a SWREQ field and the MHG and TRKG relations each include a MODULE field as shown in FIG. 32 and described later herein. In the present embodiment, the FIXEDRI, SCRNING, ROUTING, MHG and TRKG relations are redundant between central control 30 and the remote switching modules 501 through 504. For each of those relations, all the pertinent data for the system is stored in central control 30 and in each of the remote switching modules 501 through 504 as well. The DNTRAN relation 3107 in central control 30 stores the directory number translation information for all the lines connected to the system. However the DNTRAN relation in each of the remote switching modules, e.g., DNTRAN relation 3207 in remote switching module 501, stores the directory number translation information for only those lines connected to that remote switching module. Similarly, the PORTGROUP relation 3109 and the GROUPPORT relation 3110 in central control 30 store the group translation information for all of the switching system ports. The corresponding relations in each of the remote switching modules, e.g., PORTGROUP relation 3209 and GROUPPORT relation 3210 in remote switching module 501, store only such information as needed for the ports on that remote switching module. The relations in each remote switching module that are used to store the dynamic busy/idle data for multi-port hunt groups, i.e., in remote switching module 501, the LNSTAT relation 3212 for multi-line hunt groups and the TKOWNER relation 3214, the TKQUE relation 3215 and the TKSTAT relation 3216 for trunk groups, store such data for only those groups that have all of their lines or trunks connected to that remote switching module. The dynamic data for all other multi-port hunt groups in the system is stored in the LNSTAT relation 3112, the TKOWNER relation 3114, the TKQUE relation 3115, and the TKSTAT relation 3116 in central control 30. The MODULE field in the MHG and TRKG relations (FIG. 32) defines for each multi-port hunt group, one of the remote switching modules 501 through 504 or central control 30 as the location of the dynamic data for that group.

Figure 24:
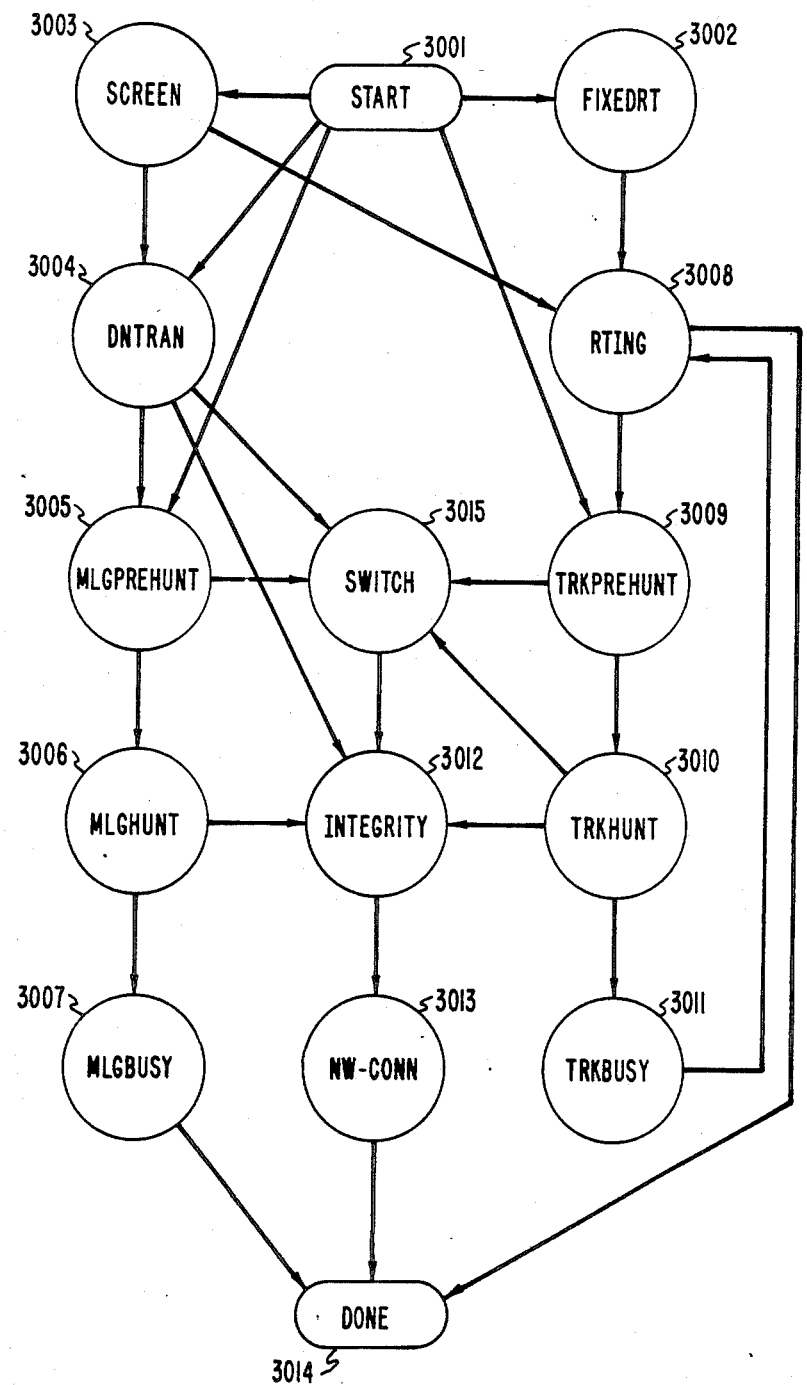
FIG. 24 is a state diagram for a routing program used in System II.
Figure 25:
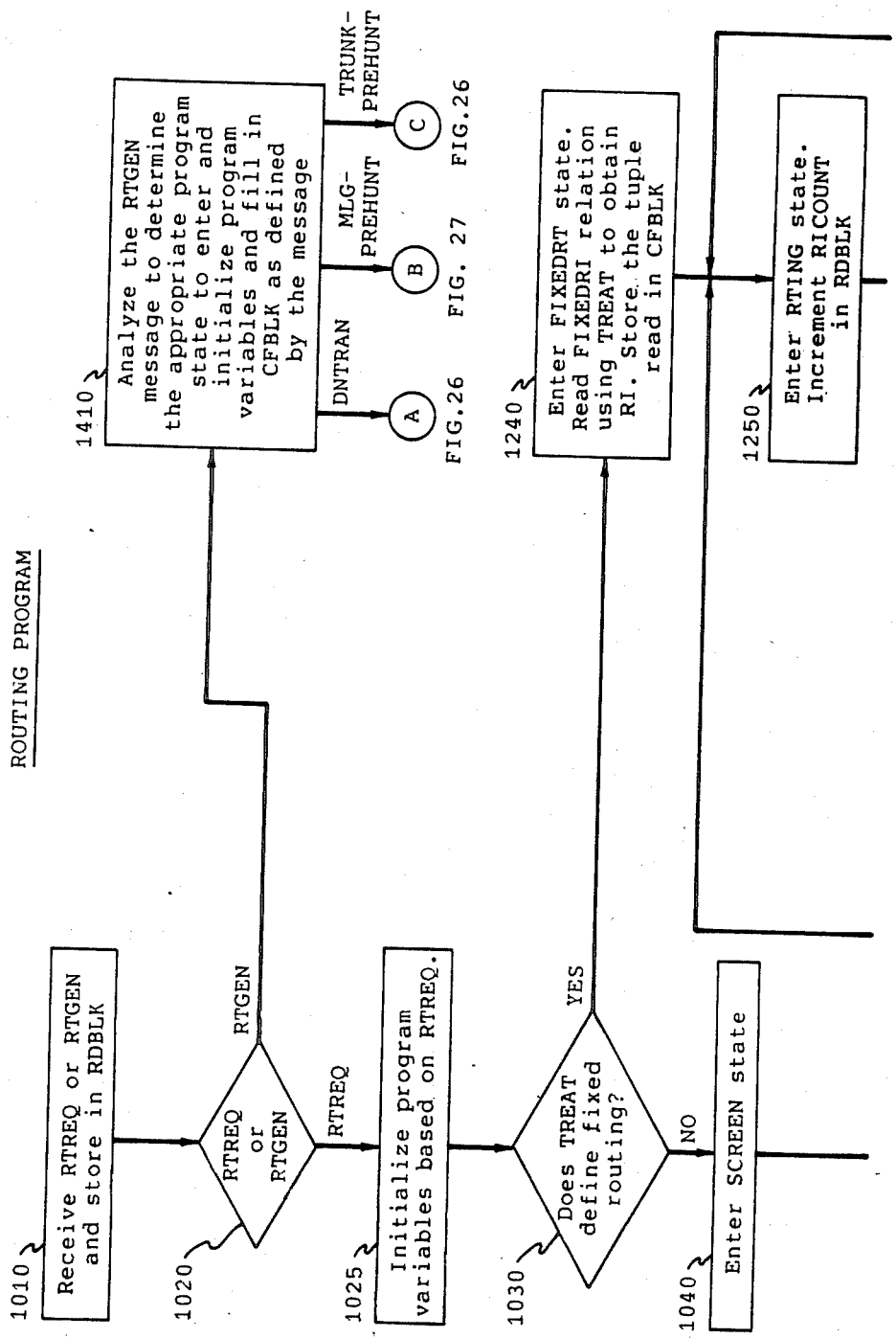
FIGS. 25 through 29, when arranged in accordance with FIG. 45, present a flow chart for the routing program used in System II.

All of the routing system processes, e.g., 3603 and 3602, execute the same routing program, the flow chart for which is shown in FIGS. 25 through 29. The state diagram associated with those routing system processes is shown in FIG. 24.

As a first example, consider that subscriber set 528 has just gone off-hook. The off-hook state is detected by scanning within line unit 519. A call processing control system process 3601 (FIG. 23) within remote switching module 501 is informed of such off-hook detection and, in response, creates an originating terminal process 3604. Originating terminal process 3604 is responsible for controlling the transmission of dial tone to subscriber set 528 and the subsequent reception of digits dialed from subscriber set 528. Originating terminal process 3604 analyzes the dialed digits to obtain values of the prefix index (PI), destination index (DI), digit count (DIGCNT) and treatment (TREAT) variables. Originating terminal process 3604 determines the value of the screen index (SI) based on the characteristics of the originating line. Originating terminal process 3604 then formulates a route request message RTREQ in a message buffer. The RTREQ message (FIG. 14) has been previously described in the descrpiton of System I.

Once the RTREQ message has been formulated, it is transmitted by originating terminal process 3604 to routing system process 3602 (FIG. 2) still within remote switching module 501. Routing system process 3602 stores the RTREQ message in RDBLK 3201. Routing system process 3602 uses the information in the RTREQ message to access its associated database. Assume that the digits dialed from subscriber set 528 in this example represent the directory number of subscriber set 529 also connected to remote switching module 501. Accordingly, the DNTRAN relation 3207 contains the necessary directory number translation information since the terminating port is on the same remote switching module as the originating port. In that case, routing system process 3602 is able to complete the determination of the terminating port. Routing system process 3602 also selects a time slot commonly available between the receive time-slot interchanger and the transmit time-slot interchanger in time-slot interchange unit 511 to be used to connect the originating peripheral time slot to the terminating peripheral time slot. Routing system process 3602 then formulates depending on the value of the TERMTYP variable, a line termination request (LNTREQ) message, a trunk termination request (TKTREQ) message or an announcement termination request (ANTREQ) message in a message buffer. Each of those messages is shown in FIG. 14 and has been described herein. In the present example a LNTREQ message is formulated. The PATHDES field of the LNTREQ message includes the definition of the selected call time slot between the receive time-slot interchanger and the transmit time-slot interchanger. The LNTREQ message formulated in the message buffer is transmitted by routing system process 3602 to a termination system process 3606. In response, process 3606 reads the busy/idle map stored in remote switching module 501 to determine whether subscriber set 529 is presently busy or idle. If subscriber set 529 is idle, process 3606 creates a terminating terminal process 3605 and forwards the information received in the LNTREQ message to process 3605 via a line termination (LNTERM) message (or, in a trunk termination (TKTERM) message or an announcement termination (ANTERM) message, if a TKTREQ message or an ANTREQ message had been received). Terminating terminal process 3605 effects the transmission of ringing voltage to subscriber set 529, and the transmission of audible ringing tones back to subscriber set 528. Terminating terminal process 3605 then transmits a SETUP-COMP message to originating terminal process 3604 including the now completed path descriptor PATHDES. Originating terminal process 3604 and terminating terminal process 3605 write information in the control RAM in time-slot interchange unit 511 respectively defining the mapping between the originating peripheral time slot and the commonly available time slot selected by routing system process 3602 and the mapping between the terminating peripheral time slot and the selected commonly available time slot. The communication path between subscriber sets 528 and 529 has now been set up.

Figure 23:
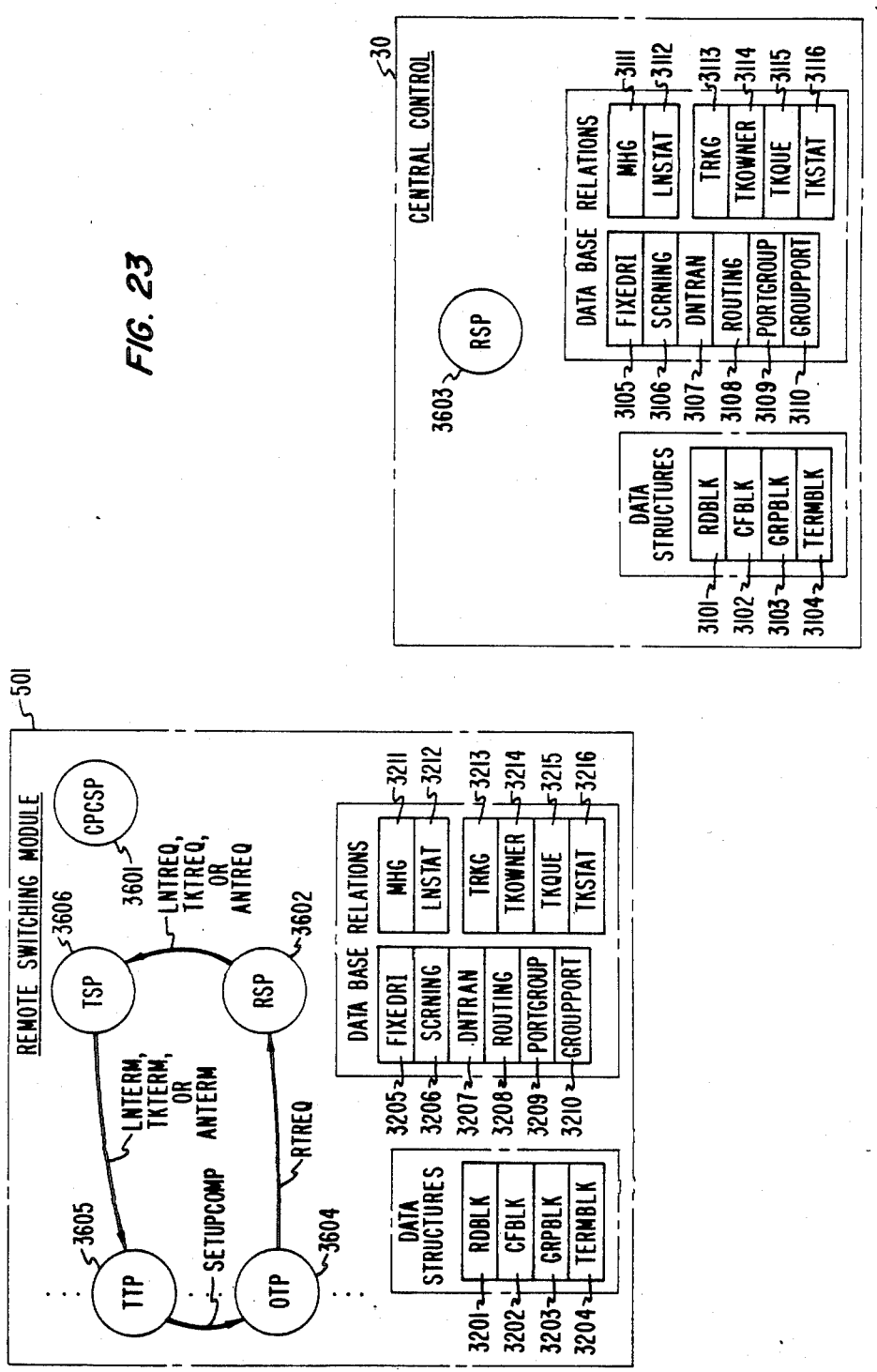
FIG. 23 is a functional diagram illustrating a first exemplary call setup sequence used in System II.

A very similar scenario to that just described with respect to FIG. 23 would also apply for calls to multi-port hunt groups controlled within remote switching module 501, i.e., groups of lines or trunks having all members connected to remote switching module 501.

As a second example, assume that the digits dialed by subscriber set 528 represent the directory number of subscriber set 529 as before, but that subscriber set 529 is part of a multi-line hunt group not controlled by remote switching module 501 but instead controlled by central control 30. Call processing control system process 3601 (FIG. 30) is informed of the off-hook detection as before and creates an originating terminal process 3611. Originating terminal process 3611 then transmits a RTREQ message to routing system process 3602, which stores the received RTREQ message in RDBLK 3201. Routing system process 3602 then executes its routing program (FIGS. 25 through 29). When program execution reaches the point that the LNSTAT relation 3212 is to be accessed, the dynamic data defining the busy/idle status of the multi-line hunt group including subscriber set 529 is not present. Therefore a generalized routing message RTGEN (FIG. 32) is formulated in the message buffer. The RTGEN message includes the PATHDES, RTGDATA and ORIGTPI fields described before with respect to the RTREQ message. The RTGEN message also includes a REQ-TERM field that defines the state of the routing program to be entered when routing is continued by the next processor and the value of the key required to read the next relation. The RTGEN message further includes the RTCONTDA field which defines values of a number of variables which have already been determined by routing system process 3602, for example variables stored in CFBLK 3202, in order that unnecessary work is not repeated when routing is continued. In addition, the RTGEN message also includes an ORIGGPI field and a TERMGPI field which store the global port identities of the originating port and the terminating port, respectively. Of course the TERMGPI field cannot be filled in until after the determination of the terminating port is completed. The RTGEN message is transmitted to routing system process 3603 in central control 30 which enters its routing program at the point defined by the REQTERM field. Information from the RTGEN message is stored in the appropriate fields in RDBLK 3101 and CFBLK 3102. Since the dynamic data defining the busy/idle status of the multi-line hunt group including subscriber set 529 is present in the LNSTAT relation 3112, routing system process 3603 is able to complete the determination of the terminating port. Assume that subscriber set 23 connected to switching module 201 is a member of the same multi-line hunt group that subscriber set 529 is in and that subscriber set 23 is assigned to the call as a result of the hunting effected by routing system process 3603. Routing system process 3603 selects an available network time slot to be used for the call and, since the terminating port is connected to a different switching module than the originating port, writes information defining the selected time slot into control memory 29. Routing system process 3603 then transmits an RTGEN message, which includes the selected network time slot in its PATHDES field and which also includes a completed TERMGPI field, to a termination system process 3610 in switching module 201. In response, process 3610 reads a busy/idle map stored in switching module 201 to determine whether subscriber set 23 is presently busy or idle. If subscriber set 23 is presently idle, process 3610 creates a terminating terminal process 3612 and forwards the information in the RTGEN message to process 3612 via a LINTERM message. Terminating terminal process 3612 effects the transmission of ringing voltage to subscriber set 23 and the transmission of an E-bit continuity signal and audible ringing tones to host switching module 301. Terminating terminal process 3612 then transmits a SETUPCOMP message to originating terminal process 3611 in remote switching module 501. In response, originating terminal process 3611 effects the selection of a time slot for the call on one of the transmission facilities 421 through 424 (FIG. 20), e.g., 421, and also effects a control communication with host switching module 301 such that time-slot interchange unit 311 connects the selected call time slot on transmission facility 421 to the selected network time slot of time-multiplexed switch 10. Such control communication with host switching module 301 is described in the above-cited Chodrow et al. U.S. Pat. No. 4,550,404. Once the E-bit continuity signal from switching module 201 is received by remote switching module 501 via host switching module 301, originating terminal process 3611 writes information in the control RAM of time-slot interchange unit 511 defining the mapping between the originating peripheral time slot and the selected call time slot on transmission facility 421. Similarly, once the E-bit continuity signal is received by switching module 201, terminating terminal process 3612 writes information in the control RAM 55 of time-slot interchange unit 11 defining the mapping between the terminating peripheral time slot and the network time slot. The communication path between subscriber sets 528 and 23 has now been set up.

Figure 30:
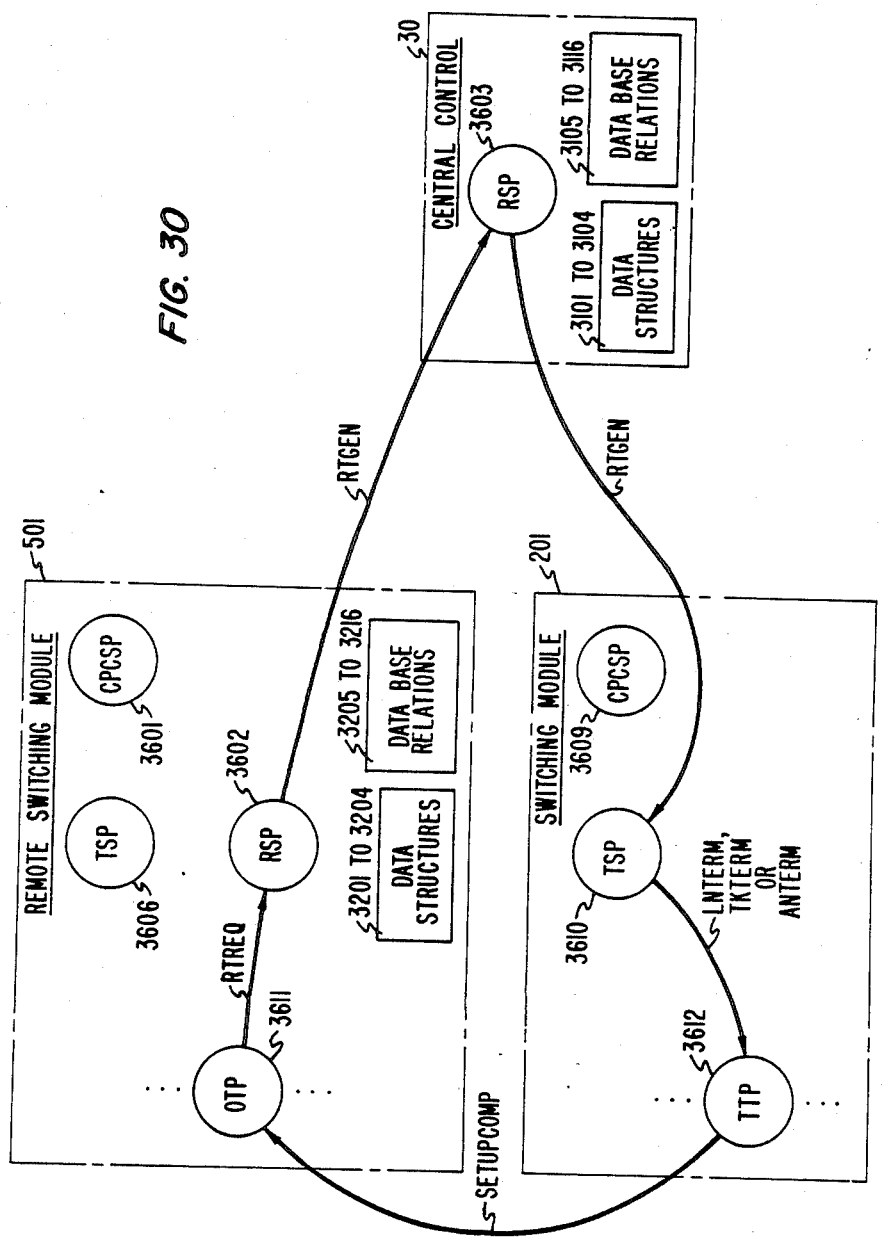
FIGS. 30 and 31 illustrate second and third exemplary call setup sequences used in System II.

A very similar scenario to that just described with respect to FIG. 30 would also apply to calls from remote switching module 501 to individual lines not connected to remote switching module 501 and also to calls to trunk groups not controlled by remote switching module 501.

As a third example, consider that subscriber set 24 connected to switching module 201 has just gone off-hook. Call processing control system process 3609 (FIG. 31) is informed of the off-hook detection and, in response, creates an originating terminal process 3621. Originating terminal process 3621 analyzes the digits dialed by subscriber set 24 to obtain values of PI, DI, DIGCNT and TREAT, and determines SI based on the characteristics of the originating line. Note that switching module 201 does not have a routing system process. Therefore, originating terminal process 3621 transmits a RTREQ message to routing system process 3603 in central control 30. Routing system process 3603 stores the RTREQ message in RDBLK 3101 and begins the execution of its routing program (FIGS. 25 through 29). Assume that the digits dialed by subscriber set 24 require the use of a group of trunks all of which are connected to remote switching module 501, e.g., trunks 543 and 544. Assume further that the trunk group is a first-in-first-out (FIFO) group. Since the group is controlled by remote switching module 501 rather than central control 30, the dynamic data defining the busy/idle status of the trunks in the trunk group is not present in the TKOWNER relation 3114 and the TKQUE relation 3115 in central control 30. Therefore, when the execution of the routing program reaches the point that the TKOWNER relation 3114 and the TKQUE relation 3115 are to be accessed, a RTGEN message is formulated since the required data is not available. The MODULE field of the TRKG relation 3113 defines that the dynamic data for the group is located in remote switching module 501. Routing system process 3603 selects the network time slot through time-multiplexed switch 10 to be used for the call and then transmits the RTGEN message to routing system process 3602 in remote switching module 501. Routing system process 3602 enters its routing program at the point defined by the REQTERM field in the RTGEN message. Information from the RTGEN message is stored in the appropriate fields in RDBLK 3201 and CFBLK 3202. Since the dynamic data defining the busy/idle status of the required trunk group is present in the TKOWNER relation 3214 and the TKQUE relation 3215 in remote switching module 501, routing system process 3602 is able to complete the determination of the terminating port. Assume that trunk 543 is assigned to the call as a result of the hunting effected by routing system process 3602. Routing system process 3602 then transmits a RTGEN message, including a completed TERMGPI field, to termination system process 3606. In response, process 3606 creates a terminating terminal process 3622 and forwards the information in the RTGEN message to process 3622 via a TKTERM message. Terminating terminal process 3622 determines the terminating peripheral time slot to be used for communication with trunk 543. Terminating terminal process 3622 effects a selected of the call time slot on one of the transmission facilities 421 through 424 (FIG. 20), e.g., 422, and also effects a control communication with host switching module 301 such that time-slot interchange unit 311 connects the selected call time slot on transmission facility 422 to the selected network time slot of time-multiplexed switch 10. Terminating terminal process 3622 effects the transmission of an E-bit continuity signal to switching module 201 via host switching module 301 and also transmits a SETUPCOMP message to originating terminal process 3621 in switching module 201. In response to the SETUPCOMP message, originating terminal process 3621 begins the transmission of an E-bit continuity signal back to remote switching module 501 via host switching module 301. In response to the E-bit continuity signals, the originating terminal process 3621 and the terminating terminal process 3622 write information in the respective control RAMs such that the originating peripheral time slot is mapped to the network time slot and the terminating peripheral time slot is mapped to the selected call time slot on transmission facility 422. The communication path between subscriber set 23 and trunk 543 has now been completed.

Figure 31:
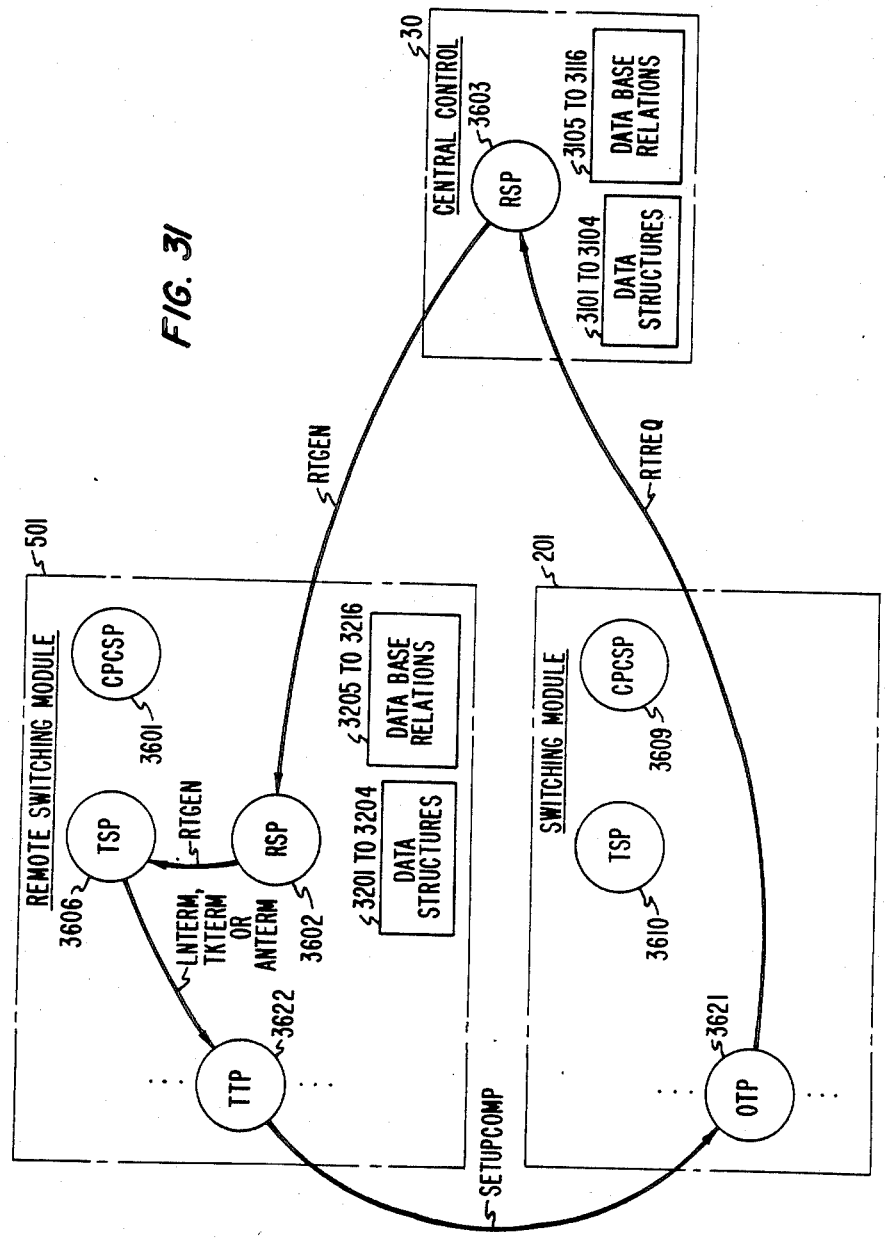

A very similar scenario to that just described with respect to FIG. 31 would also apply to calls from switching module 201 to multi-line hunt groups controlled by remote switching module 501. Since the DNTRAN relation 3107 stored in central control 30 has the directory number translation information for all the lines of the system, the determination of the terminating port can be completed by routing system process 3603 in central control 30 for all calls from switching module 201 to individual lines.

The routing program of FIGS. 25 through 29, which is stored in central control 30 and in each of the remote switching modules 501 through 504 as well, is a modification of the routing program of FIGS. 9 through 13 used for centralized routing in System I. Accordingly blocks of the flow charts where the same or similar functions are performed are identified by the same number in both flow charts. Similarly, the state diagram of FIG. 24, which includes one additional state and number of additional state transitions with respect to the state diagram of FIG. 8, has the corresponding states identified by the same number.

The routing program of FIGS. 25 through 29 is described herein in terms of the required modifications of the routing program of FIGS. 9 through 13. The routing program of FIGS. 25 through 29 is initiated from the START state 3001 (FIG. 24) upon the receipt by a routing system process of either a RTREQ message or a RTGEN message. During block 1010 (FIG. 25), the received message is stored in the RDBLK. The RTGSEQ field (FIG. 32) of the RDBLK is used to define whether the present execution of the routing program was in response to a RTREQ message or a RTGEN message. Execution proceeds to decision block 1020 where a branch occurs depending on the type of received message. If the received message was a RTREQ message, execution proceeds in the same manner as previously described with respect to the routing program of FIGS. 9 through 13, unless one of the accessed relations does not have the requested data present. Recall that the FIXEDRI, SCRNING, ROUTING, MHG and TRKG relations are redundant between central control 30 and the remote switching modules 501 through 504. Therefore, barring errors, attempted accesses of those relations should always be successful. However, the DNTRAN relation in central control 30 stores the directory number translation information for all the lines connected to the system, while the DNTRAN relation in each of the remote switching modules 501 through 504 stores the directory number translation information for only those lines connected to that remote switching module. Therefore attempts to access the DNTRAN relation in a remote switching module will only be successful for the lines connected thereto. This is reflected in the flow chart by the addition of decision block 1080 during which it is determined whether the access of the DNTRAN relation attempted during block 1070 was successful. If the needed data was not available, execution proceeds from decision block 1080 to a block 1400 and the SWITCH state 3015 (FIG. 24) is entered. During block 1400, a SWREQ variable is stored in the RDBLK (FIG. 15) defining the program state of the state diagram of FIG. 24 to be entered by the next routing system process. When block 1400 is reached from decision block 1080, the stored SWREQ variable defines the DNTRAN state 3004 (FIG. 24) as the program state to be entered by the next routing system process. Execution then proceeds to block 1190 and the program moves from the SWITCH state 3015 to the INTEGRITY state 3012 (FIG. 24). During block 1190, the next processor is determined. If the present processor is in a remote switching module, the next processor is always central control 30. If the present processor is central control 30, the MODULE field in the TERMBLK is used to determine the location of the next processor. The status table is checked to verify that the next processor is operational and execution proceeds to block 1200. During block 1200 the NWCONN state 3013 is entered. In a remote switching module, if the terminating port has been determined without communicating with central control 30, the selection of the time slot commonly available between the receive time-slot interchanger and the transmit time-slot interchanger to be used to connect the originating peripheral time slot to the terminating peripheral time slot is made during block 1200. In central control 30, the commonly available network time slot for the call is selected and, if the call is an inter-module call, information is written in control memory 29 to set up the network path during block 1200. Execution proceeds to block 1210 and the type of message to be transmitted to the next processor is determined. The RTGSEQ field in the RDBLK is used to determine whether the present execution of the routing program resulted from the receipt of a RTREQ message or a RTGEN message. If the execution resulted from the receipt of a RTGEN message, then a RTGEN message is constructed. If the execution resulted from the receipt of a RTREQ message but a switch has occurred, again a RTGEN message is constructed. If no switch has occurred, then the TERMTYP variable in the RTGDATA field (stored as part of the TEXT field in the RDBLK) is used to determine whether a LNTREQ, TKTREQ, or ANTREQ message is constructed. Execution proceeds to block 1220 during which the appropriate message type is constructed using data in the RDBLK, CFBLK and TERMBLK and the meassage is stored in the message buffer. Execution then proceeds to block 1230, the message in the message buffer is transmitted, and execution concludes in the DONE state 3014 (FIG. 24).

Recall that the relations in each remote switching module that are used to store the dynamic busy/idle data for multi-port hunt groups, i.e., multi-line hunt groups or trunk groups, store such data for only those groups that have all of their lines or trunks connected to that remote switching module. Also recall that the dynamic data for all other multi-port hunt groups in the system is stored in central control 30. This means that the dynamic data for any given hunt group is only stored in one location. Therefore, while a failure in accessing the DNTRAN relation should only occur in a remote switching module, failures in accessing the LNSTAT, TKOWNER, TKQUE or TKSTAT relations may occur either in a remote switching module or in central control 30. The possibility of a failure in accessing the LNSTAT relation is reflected in the program flow chart by including the decision block 1130 after block 1120 when access of the LNSTAT relation is attempted. If the requested data from the LNSTAT relation is not available, execution proceeds from block 1130 to block 1390. During block 1390, the MODULE field which was obtained during block 1110 when the MHG relation (FIG. 32) was read, is stored in the TERMBLK and execution proceeds to block 1400. In block 1400, the SWITCH state 3015 (FIG. 24) is entered and the SWREQ variable defining the MLGPREHUNT state 3005 (FIG. 24) as the state to be entered by the next routing system process, is stored in the RDBLK. Execution then proceeds through blocks 1190, 1200, 1210, 1220 and 1230 and a RTGEN message is constructed and transmitted as before.

Similarly, decision block 1320 is inserted after block 1310 where the attempted access of the TKOWNER and TKQUE relations occurs, and decision block 1340 is inserted after block 1330 where the attempted access of the TKSTAT relation occurs. Execution proceeds from either of the decision blocks 1320 or 1340, via blocks 1390, 1400, 1190, 1200, 1210, 1220 and 1230 as before. In both cases, during block 1400, the SWREQ variable stored in the RDBLK defines the TRKPREHUNT state 3009 (FIG. 24) as the program state to be entered by the next routing system process.

What has just been described is the execution of the routing program of FIG. 25 through 29 in response to the receipt of a RTREQ message. When a RTGEN message is received, execution proceeds from decision block 1020 to block 1410. During block 1410, the REQTERM field in the RTGEN message is used to determine the program state in which execution is to begin. The REQTERM field also stores the value of the key to the first relation to be accessed. The RTCONTDA field in the RTGEN message contains the values of other needed variables such that work already completed in one routing system process need not be repeated in the next routing system process. Such information is subsequently filled into the CFBLK. In the present embodiment, the REQTERM field defines the DNTRAN state 3004, the MLGPREHUNT state 3005 or the TRKPREHUNT state 3009 as the program state to be entered. As shown in the flow chart, execution proceeds from block 1410 to block 1070, block 1110 or block 1290 in accordance with the definition in the REQTERM field.

It is be understood that although in System II, the routing function is distributed to only the remote switching modules, the concept of distributed routing can be extended by distributing the routing function in a similar manner to all of the system switching modules.

SYSTEM III

Figure 34:
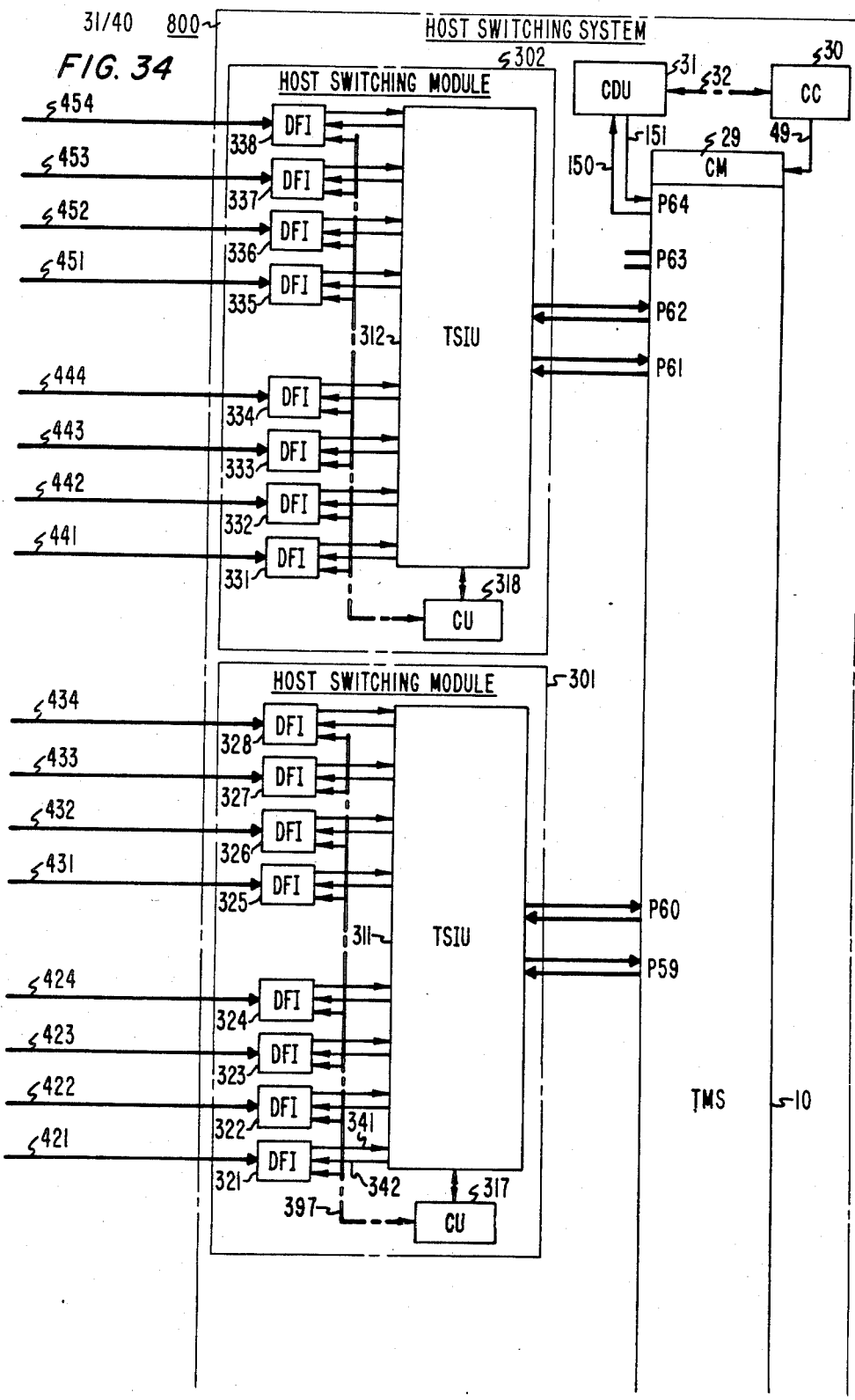
Figure 35:
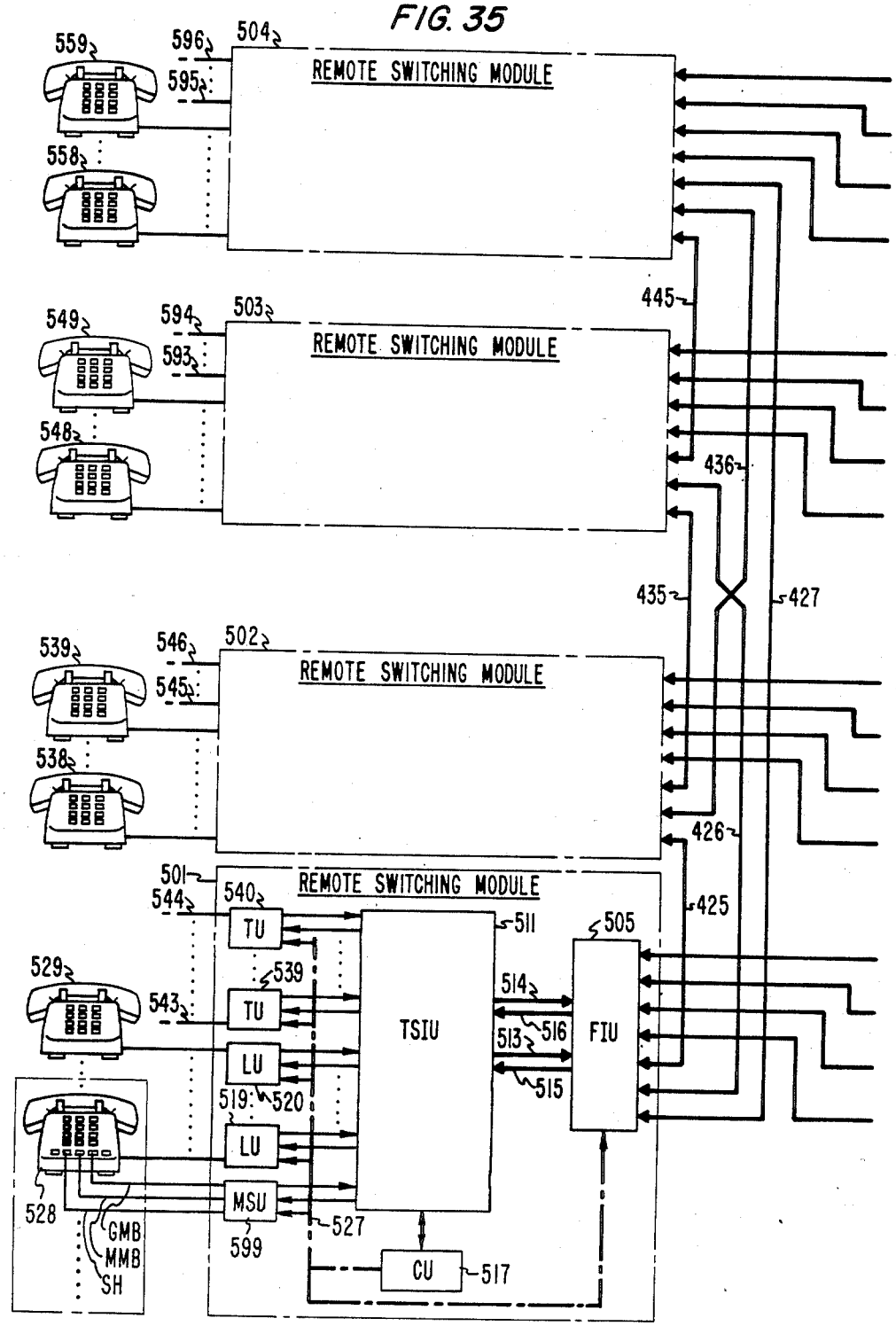

A time division switching system referred to herein as System III, which represents a modification to System II in that the remote switching modules 501, 502, 503 and 504 are interconnected in a grouping known as a cluster, is shown in FIG. 33 through 35, when arranged in accordance with FIG. 36. In System III, each pair of remote switching modules is interconnected by a digital, bidirectional transmission facility such as the above-mentioned T1 carrier system. Module 501 (FIG. 35) is connected by transmission facilities 425, 426 and 427 to modules 502, 503 and 504, respectively, module 502 is connected by transmission facilities 435 and 436 to modules 503 and 504, respectively, and modules 503 and 504 are interconnected by transmission facility 445. In System III, each facilities interface unit, e.g., 505, interfaces with seven transmission facilities.

As in System II, the primary mode of control communication between two remote switching modules is again via the time-multiplexed switch 10 control channels and control distribution unit 31. However, since the cluster of remote switching modules operates as an integrated entity even in a stand-alone operation mode when the cluster of remote switching modules is not under the control of host system 800, control communication is also possible on the transmission facilities directly interconnecting the remote switching modules. Such control communication is described in detail in the above-cited Chodrow et al. U.S. Pat. No. 4,550,404. As described in that application, the control communication is achieved using one of the 24 channels on the directly interconnecting transmission facility or using the derived data link on that facility.

As was also true in System II, the routing function in System III is distributed to the remote switching modules 501 through 504. Each remote switching module has a routing system process, its associated data structures RDBLK, CFBLK, GRPBLK and TERMBLK and database comprising the FIXEDRI, SCRNING, DNTRAN, ROUTING, PORTGROUP, GROUPPORT, MHG, LNSTAT, TRKG, TROWNER, TKQUE and TKSTAT relations. As in System II, the FIXEDRI, SCRNING, ROUTING, MHG and TRKG relations are redundant between central control 30 and the remote switching modules 501 through 504. For each of those relations, all the pertinent data for the system is stored in central control 30 and in each of the remote switching modules 501 through 504 as well. Again the DNTRAN relation in central control 30 stores the directory number translation information for all the lines connected to the system. However, in contrast to System II where the DNTRAN relation in each remote switching module stored the directory number translation information for only the lines connected to that remote switching module, in System III, the DNTRAN relation in each remote switching module stores the directory number translation information for all the lines connected to the entire cluster of remote switching modules 501 through 504. Thus for calls originating on a given remote switching module to an individual line connected to any remote switching module in the cluster, the function of determining the terminating port can be completed by the routing system process in the given originating remote switching module. The PORTGROUP and GROUPPORT relations stored in the remote switching modules also store information for all the ports on the cluster of remote switching modules. As in System II, the relations in each remote switching module that are used to store the dynamic busy/idle data for multi-port hunt groups, i.e., the LNSTAT relation for multi-line hunt groups and the TKOWNER, TKQUE and TKSTAT relations for trunk groups, store such data for only those groups that have all of their lines or trunks connected to one remote switching module. Therefore, for a call originating on a first remote switching module to a multi-port group connected to a second remote switching module, the routing system process in the first remote switching module can execute its routing program up until the point that the dynamic data is accessed. A RTGEN message (FIG. 32) is then transmitted to the routing system process in the second remote switching module which completes the determination of the terminating port.

Twenty-three of the channels or time slots on a given transmission facility between two remote switching modules, are used for calls between those modules. The 24th channel is used to convey the signaling bits for the other 23 channels. (In the present embodiment of System III, the derived data link on the transmission facility, rather than one of the 23 channels, is used for control communication in the stand-alone mode of operation.) Each of the two remote switching modules is the controller of 11 or 12 of the 23 time slots on the transmission facility therebetween. For example, remote switching module 501 is the controller of time slots 1 through 12 on transmission facility 435 and remote switching module 502 is the controller of time slots 13 through 23. Each remote switching module maintains a time slot status map defining the busy/idle status of each time slot on each transmission facility connected thereto. If remote switching module 501 is required to assign a time slot on transmission facility 435 to a call, it first determines whether one of the time slots 1 through 12 is available by reading its time slot status map. If one or more of the time slots 1 through 12 is available, it assigns one to the call. However, if none is available, remote switching module 501 informs remote switching module 502 of the required assignment and module 502 reads its time slot status map to determine whether one of the time slots 13 through 23 is available. If one or more of the time slots 13 through 23 is available, one of the available time slots is selected for the call. If none is available, remote switching modules 501 and 502 communicate with central control 30 to establish the call. The call is completed via one of the transmission facilities 421 through 424, one of the transmission facilities 431 through 434, and host switching module 301. Further if the remote switching modules were connected to different host switching modules as, for example, remote switching module 501 connected to host switching module 301 and remote switching module 503 connected to host switching module 302, the call would be completed using a network time slot of time-multiplexed switch 10.

In System III, ten of the subscriber sets shown in FIGS. 33 through 35 comprise a multi-line hunt group A (Table 2).

TABLE 2

| Multi-line Hunt Group A | |
|---|---|
| Member | Subscriber Set |
| 1 | 528 |
| 2 | 529 |
| 3 | 538 |

TABLE 2-continued

| Multi-line Hunt Group A | |
|---|---|
| Member | Subscriber Set |
| 4 | 539 |
| 5 | 548 |
| 6 | 549 |
| 7 | 558 |
| 8 | 23 |
| 9 | 24 |
| 10 | 25 |

For purposes of illustration, subscriber set 528 is shown in FIG. 35 as having a plurality of keys for controlling group A—for example, a GROUP MAKE BUSY key GMB, a MEMBER MAKE BUSY key MMB, and a STOP HUNT key SH. The key GMB is used to request that all members of the group be defined as busy. Similarly the key MMB is used to request that a particular member of the group be defined as busy. The key SH is used to request that hunting be stopped when a particular group member is reached. Each of the keys GMB, MMB and SH is connected by an individual line to a metallic services unit 599 included in remote switching module 501. Metallic services unit 599 includes a plurality of scan points which detect the status of the keys GMB, MMB and SH. Metallic services unit 599 reports key status information to control unit 517 via path 527. Any of the other subscriber sets in multi-line hunt group A could also include such keys connected to metallic services unit 599. In addition, the other remote switching modules 502 through 504 could include metallic services units connected to hunt group keys.

Remote switching module 501 includes two relations concerning multi-line hunt group keys. The KEYLIST relation (FIG. 38) has the GPI attribute defining the global port identities of the metallic services unit 599 scan points associated with such keys. The HUNT-KEYS relation (FIG. 38) includes the KEYGPI, KEYTYPE and BUSYGPI attributes. The KEYGPI attribute defines the global port identities of the scan points associated with keys. The KEYTYPE attribute defines the key as a group make busy, member make busy, or stop hunt key. The BUSYGPI attribute defines the global port identities of group members to be marked busy in the dynamic hunt data for the group when a particular key is activated.

In the normal operation of system III, the dynamic hunt data defining the busy/idle status of hunt group A is stored in the LNSTAT relation in central control 30 since group A is a global group—i.e., it has members on more than one switching module. However, when the cluster of remote switching modules 501 through 504 goes into stand-alone operation, the LNSTAT relation in each of those modules is modified to include hunt data for hunt group A. In module 501, the PORTSTATUS relation is read and the group members on module 501, i.e., subscriber sets 528 and 529, are marked busy or idle in the LNSTAT relation to reflect the present status of those sets. The other members of group A are marked busy in the LNSTAT relation in module 501. Similarly, in the LNSTAT relation of module 502, subscriber sets 538 and 539 are marked as busy or idle in accordance with their status in the PORTSTATUS relation and the other group A members are defined as busy. In the LNSTAT relation of module 503, subscriber sets 548 and 549 are defined as busy or idle in accordance with their present status and the other group A members are marked busy. In the LNSTAT relation of module 504, subscriber set 558 is defined to reflect its present status and the other group A members are marked busy. Hunting is completed in a sequential fashion in a sequence defined in a static relation CLIDAT (FIG. 38). The CLIDAT relation includes the cluster identifier (CLID) attribute followed by a sequence of module attributes MOD1, MOD2, MOD3, MOD4. The tuple of the CLIDAT relation relevant to the present description is also shown in FIG. 38. A CLID attribute of 1 identifies the cluster of remote switching modules 501 through 504. The module attributes MOD1, MOD2, MOD3 and MOD4 define the sequence of modules 501, 502, 503 and 504. Accordingly, for call originations on module 501 to a global multi-port hunt group having at least one member on the cluster of modules 501 through 504, the dynamic relation for the group is first hunted in module 501, then, if no idle member is found, the dynamic relation in module 502 is hunted, followed by the dynamic relations in modules 503 and 504. For originations on module 502, the sequence is 502, 503, 504, 501. For originations on module 503, the sequence is 503, 504, 501, 502, and for originations on module 504, the sequence is 504, 501, 502, 503. The same sequence is used for the transmission of KEYSTATUS messages among the modules of the cluster to appropriately reflect the status of keys as detected by metallic services unit 599, in the dynamic data stored in the modules 501 through 504.

Consider the following example. Assume that one or more of the remote switching modules 501 through 504 become isolated from host switching system 800 due to a failure of some or all the transmission facilities 421 through 424, 431 through 434, 441 through 444, and 451 through 454. Each remote switching module monitors its control channels to host system 800 to verify the integrity of the transmission facilities to host system 800. If a given remote switching module, e.g., 501, does not detect any control message activity with host system 800 for a predetermined time interval, it transmits a test control message over its control channel to host system 800. Thereafter, if remote switching module 501 does not receive an acknowledgment of the test control message within a specified time, it initiates a transition of the entire cluster of remote switching modules 501 through 504 to stand-alone operation by communicating with the other modules 502 through 504 concerning such transition using the derived data link of the directly interconnecting transmission facilities 425, 426 and 427. As part of the transition to stand-alone operation, remote switching module 501 creates a tuple for multi-line hunt group A in its dynamic relation LNSTAT. Module 501 then reads its PORTSTATUS relation to determine the present busy/idle status of subscriber sets 528 and 529. Assume for this example that sets 528 and 529 are busy. Accordingly all members of multi-line group A are marked busy in the LNSTAT relation in remote switching module 501. It is emphasized that remote switching module 501 updates the status of only the group A members on module 501— namely subscriber sets 528 and 529—and the other group A members remain marked as busy in module 501 irrespective of their true status. Assume that subscriber sets 538 and 539 on module 502 and subscriber set 558 on module 504 are also busy but that subscriber sets 548 and 549 on module 503 are presently idle. Accordingly all members of multi-line group A are marked busy in the LNSTAT relation in module 502 and in the LNSTAT relation in module 504. However, in the LNSTAT relation in module 503, subscriber sets 548 and 549 (members 5 and 6) are marked idle. Once the dynamic data in each of the modules 501 through 504 has been thus populated to include global hunt groups, module 501 transmits KEYSTATUS messages to module 502 defining the present state of the keys GMB, MMB and SH. The KEYSTATUS messages are relayed to module 503 and then to module 504. The dynamic hunt data of the LNSTAT relations of the modules 501 through 504 is updated in accordance with any activated keys.

Figure 37:
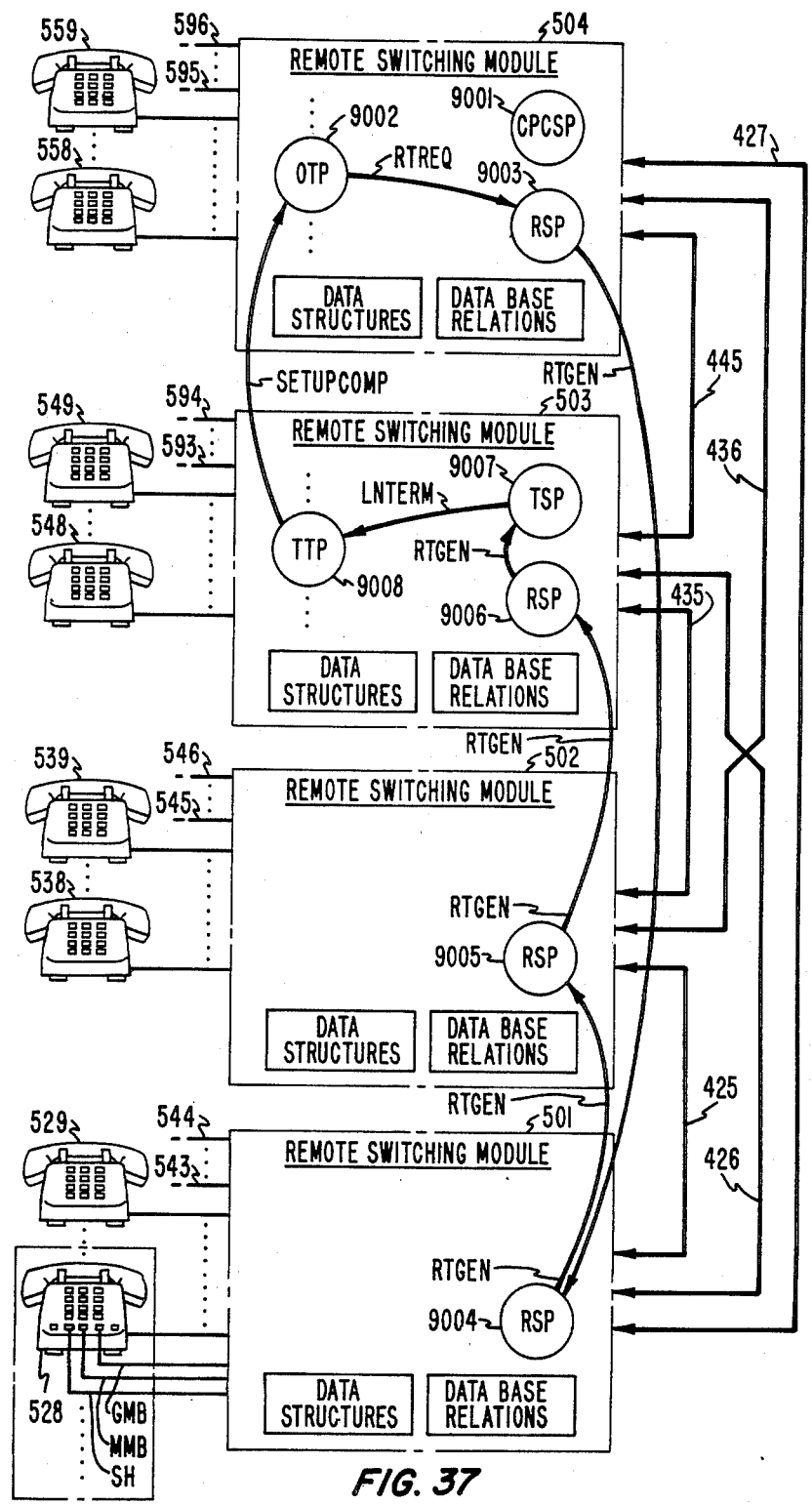
FIG. 37 illustrates an exemplary call setup sequence involved in processing a call to a multi-port hunt group in System III in accordance with the present invention.

Once the transition to stand-alone operation has been completed as described, assume that subscriber set 559 connected to remote switching module 504 goes off-hook and dials the directory number of multi-line hunt group A, which directory number is associated with subscriber set 528. A call processing control system process 9001 in module 504 (FIG. 37) is informed of the detection of off-hook status and responds by creating an originating terminal process 9002 which receives the dialed directory number. Originating terminal process 9002 analyzes the dialed digits to obtain values of the prefix index (PI), destination index (DI), digit count (DIGCNT) and treatment (TREAT) variables. Originating terminal process 9002 also determines the value of the screen index (SI), based on the characteristics of the originating line. Originating terminal process 9002 then formulates a route request message RTREQ in a message buffer. The RTREQ message (FIG. 14) has been previously described in the description of System I.

Once the RTREQ message has been formulated, it is transmitted to a routing system process 9003 within remote switching module 504. Routing system process 9003 stores the RTREQ message in its associated RDBLK. (Each routing system process has the associated data structures RDBLK, CFBLK, GRPBLK and TERMBLK and the database comprising the FIXEDRI, SCRNING, DNTRAN, ROUTING, PORTGROUP, GROUPPORT, MHG, LNSTAT, TRKG, TKOWNER, TKQUE and TKSTAT relations.) Routing system process 9003 uses the information in the RTREQ message to access its associated database. Since the DNTRAN relation stored in remote switching module 504 includes the directory number translation information for all lines connected to the modules 501 through 504, routing system process 9003 determines that the directory number is associated with subscriber set 528. Routing system process 9003 also determines that the port associated with subscriber set 528 is part of multi-line hunt group A and hunts the dynamic relation LNSTAT for an idle member. Since all members of multi-line hunt group A are marked busy in the LNSTAT relation of module 504, the determination of the terminating port cannot be completed. Instead a RTGEN message is transmitted to a routing system process 9004 in module 501. The determination of module 501 as the next module to hunt is determined in accordance with the CLIDAT relation as described above. The RTGEN message defines a routing program state (the MLGPREHUNT state), such that work done by routing system process 9003 in module 504 such as directory number translation need not be repeated by routing system process 9004 in module 501. In accordance with the present example, all members of multi-line hunt group A are also marked busy in the LNSTAT relation in module 501, so process 9004 is unable to complete the terminating port determination and instead transmits a RTGEN message on to a routing system process 9005 in remote switching module 502. Again all members of multi-line hunt group A are marked busy in the LNSTAT relation in module 502 and a RTGEN message is transmitted on to a routing system process 9006 in remote switching module 503. In accordance with the present example, both subscriber sets 548 and 549 are marked idle in the LNSTAT relation in module 503. Hunting begins with the group member associated with the dialed directory number which is the present example is member 1 (subscriber set 528) and proceeds linearly until an idle member is reached. (Hunting can be effected in accordance with any of a number of hunt algorithms—e.g. linear hunting which begins with the dialed member and proceeds sequentially stopping with the last member number, circular hunting which varies in that hunting continues from the last member number back to the first member number such that all group members are hunted, or uniform hunting which attempts to balance incoming calls among group members.) Accordingly, member 5 (subscriber set 548) is reached first and assigned to the call. Member 5 is immediately marked busy in the LNSTAT relation in module 503. Routing system process 9006 thereafter transmits a RTGEN message to a termination system process 9007 which responds by reading the PORTSTATUS relation in module 503 to verify that subscriber set 548 is still idle. If subscriber set 548 is idle, termination system process 9007 creates a terminating terminal process 9008 and forwards the call information thereto in a LNTERM message (FIG. 14) previously described herein. At this point, knowing the terminating port for the call and also knowing that the originating port is connected to remote switching module 504, process 9008 reads the time slot status map to determine the busy/idle status of time slots 1 through 12 on transmission facility 445 interconnecting remote switching modules 503 and 504. Assuming that one of the 12 time slots is available, process 9008 makes the time slot assignment for the call. (The alternatives when none of the 12 time slots are available are discussed above.) The remainder of the call setup sequence is completed in the typical fashion, including the transmission of a SETUPCOMP message to originating terminal process 9002 in remote switching module 504 and the mapping of the originating peripheral time slot and the terminating peripheral time slot to the call time slot on transmission facility 445. When subscriber set 548 returns to on-hook status at the end of the call, subscriber set 548 is again marked idle in both the PORTSTATUS and LNSTAT relations in module 503.

Figure 39:
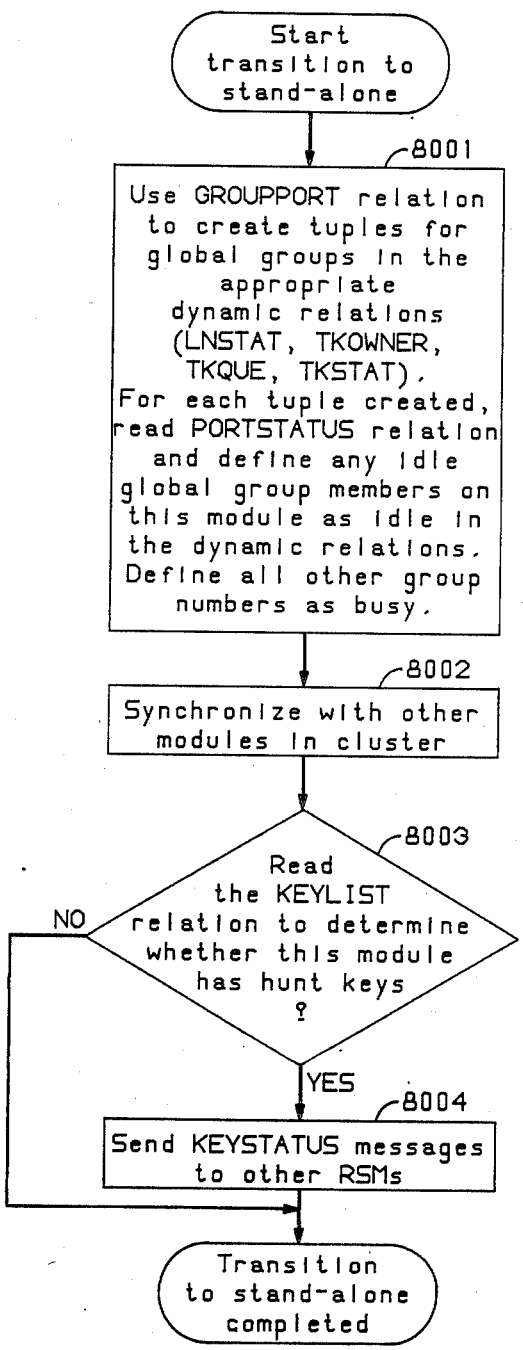
FIG. 39 is a flow chart used in the transition from a normal mode of operation to a stand-alone mode of operation in System III.

A flow chart of the program executed by control unit 517 in remote switching module 501 upon initiating a transition to a stand-alone mode of operation is shown in FIG. 39. In block 8001, the GROUPPORT relation is accessed to determine all global groups having at least one port on one of the cluster of remote switching modules 501 through 504. For each such group found, tuples are created in the appropriate dynamic relations (LNSTAT for lines and TKSTAT or TKOWNER and TKQUE for trunks). For each tuple created, any idle group members on remote switching module 501 are marked as idle in the associated dynamic relation of module 501. All other group members are marked busy. Execution is then delayed in block 8002 and message communication is effected among the modules 501 through 504 to determine when all the modules 501 through 504 have completed block 8001 such that the dynamic data relations have been initially populated. Once such synchronization has been achieved, execution proceeds to decision block 8003 and a determination is made using the KEYLIST relation of whether remote switching module 501 has hunt keys. In the present example, subscriber set 528 of remote switching module 501 has the hunt keys GMB, MMB and SH. Accordingly, execution proceeds to block 8004 and remote switching module 501 generates KEYSTATUS messages defining the present state of such hunt keys, and transmits the KEYSTATUS messages to remote switching module 502. From module 502, the KEYSTATUS messages are forwarded to remote switching modules 503 and 504 in accordance with the sequence defined by the CLIDAT relation. When all such KEYSTATUS messages have been transmitted (and the associated LNSTAT relations updated), the transition to stand-alone is completed.

Figure 28:
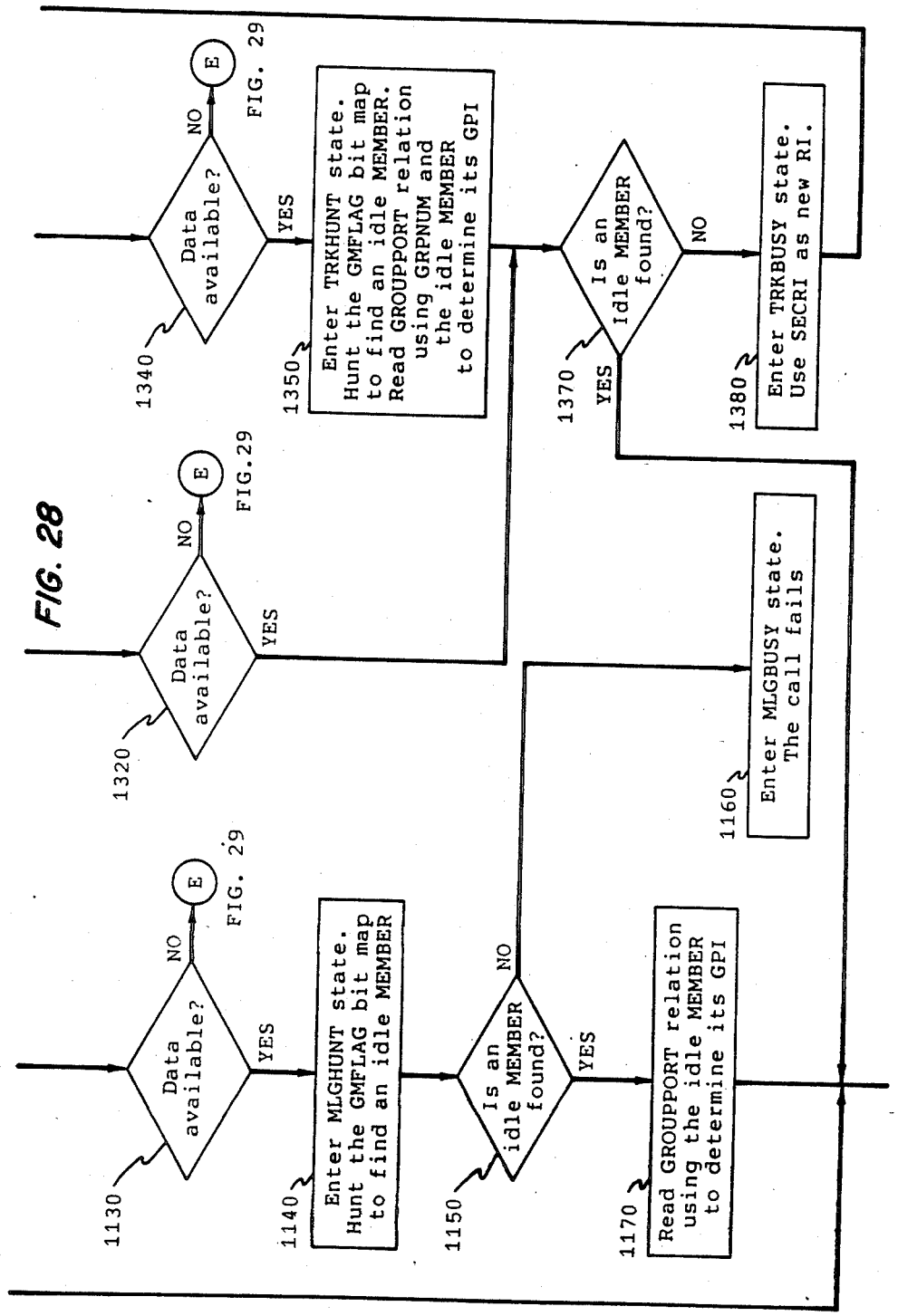
Figure 29:
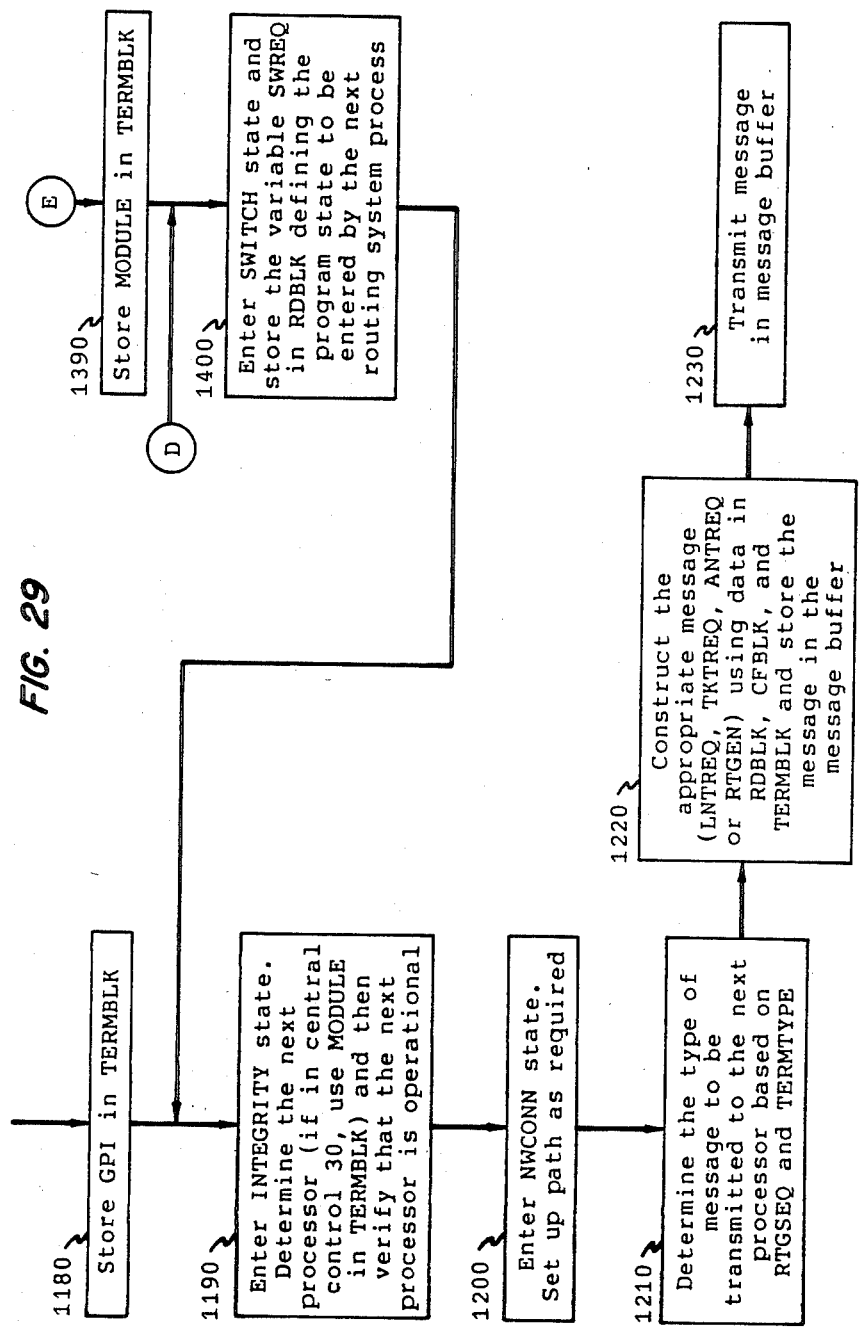
Figure 40:
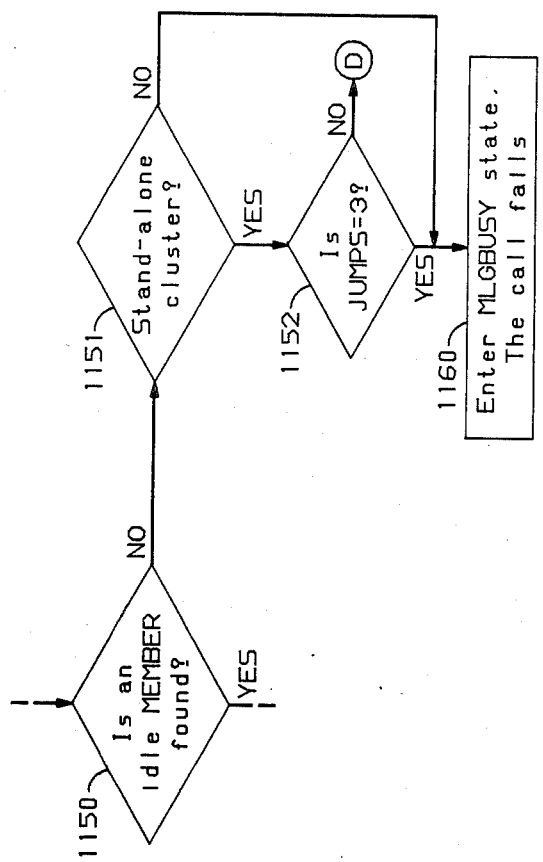
FIGS. 40, 41 and 42 each define modifications made to the flow chart of FIGS. 25-29 to define the operation of the routing program used in System III.
Figure 41:
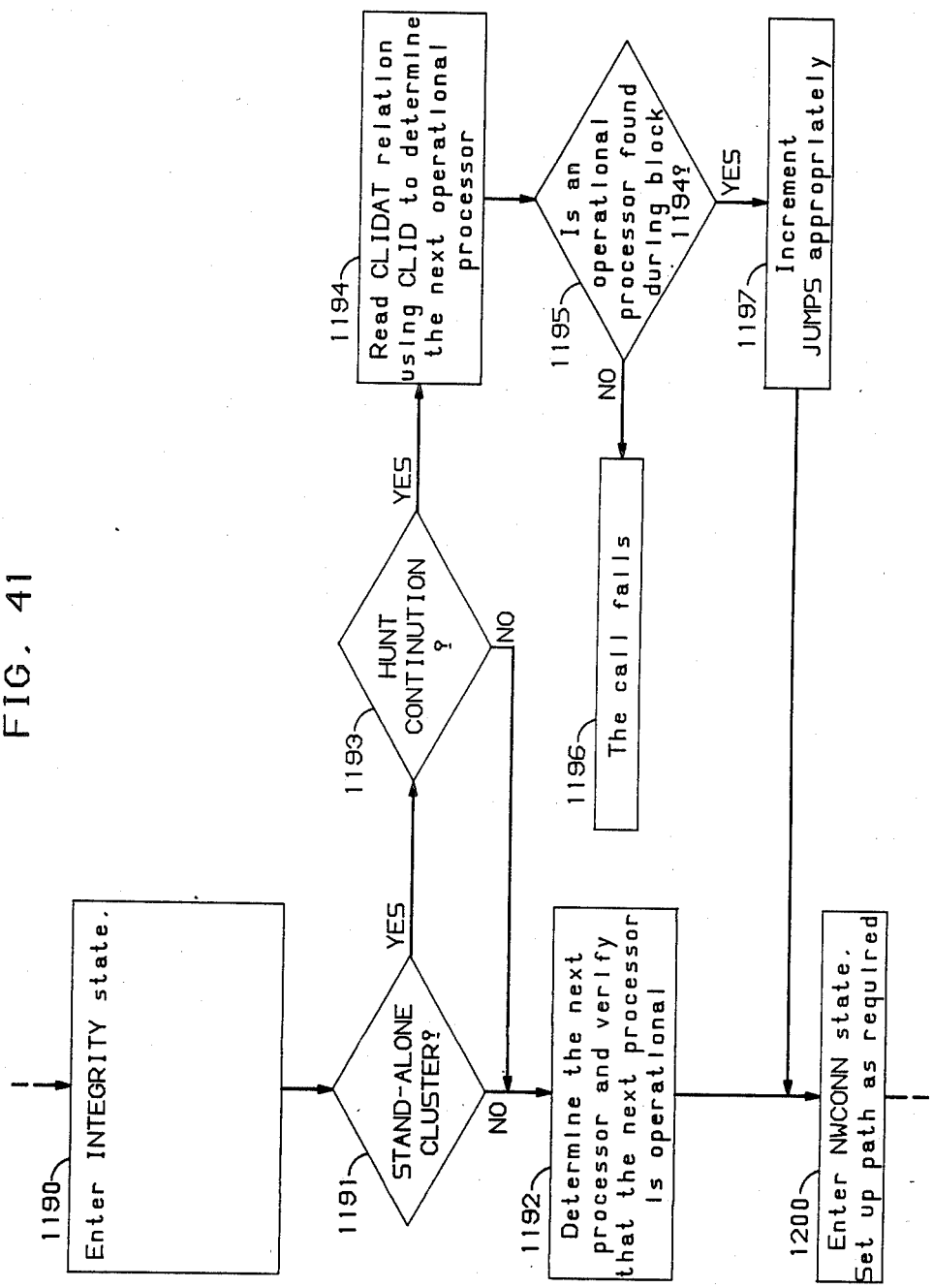
Figure 42:
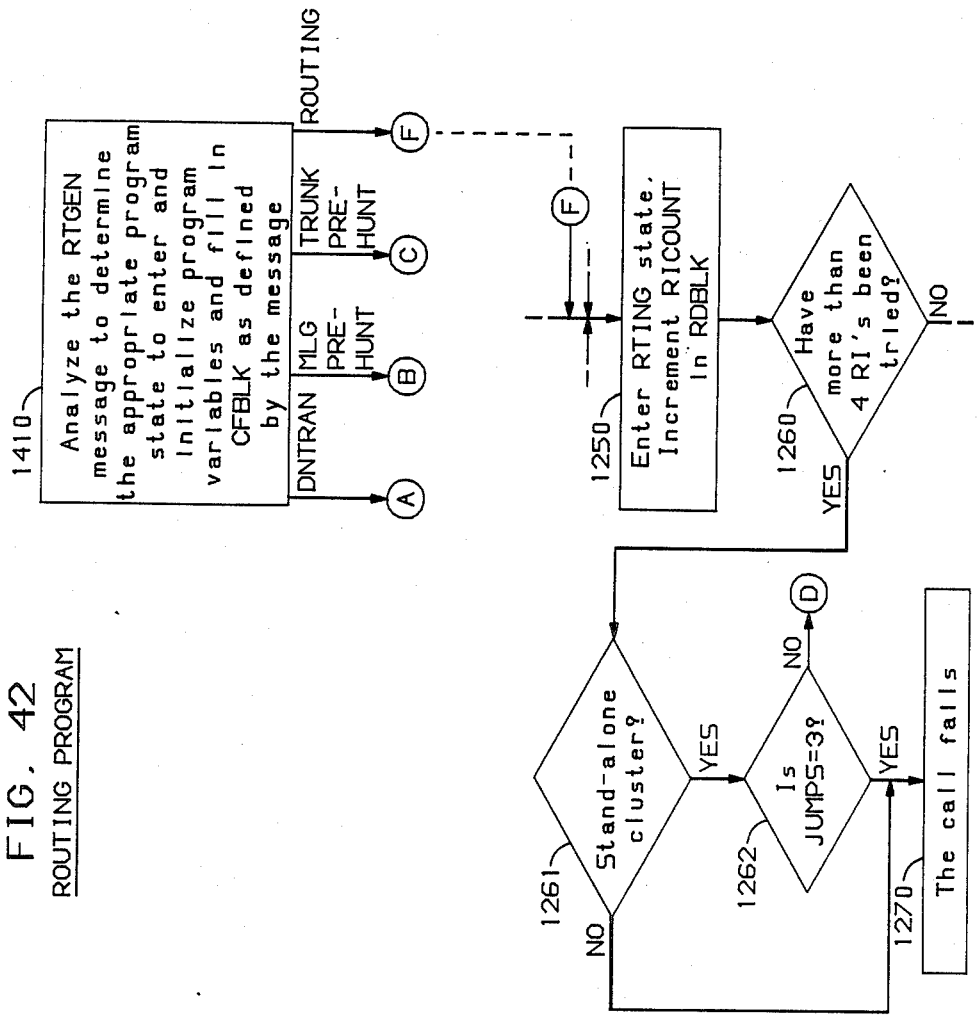
Figure 43:
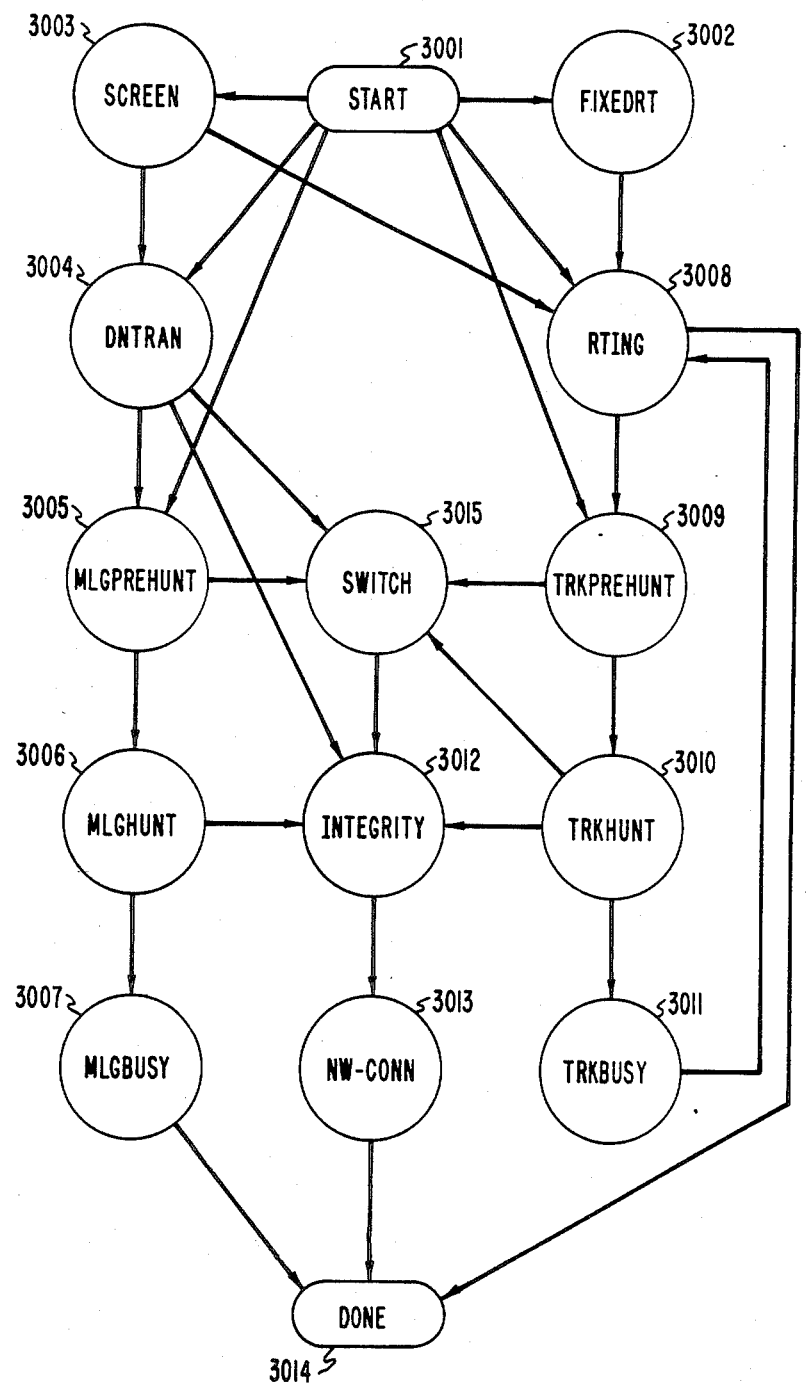
FIG. 43 is a state diagram for the routing program used in System III.
Figure 44:
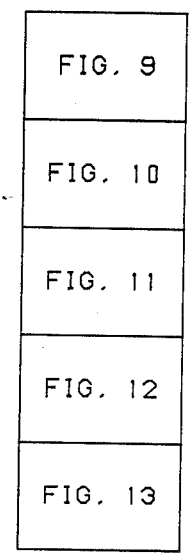
Figure 45:
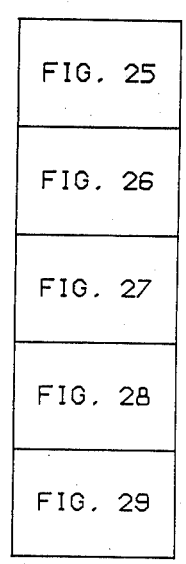

Certain flow chart modifications to the routing program of FIGS. 25 through 29 needed in order to implement the above-described hunt group control mechanism, are shown in three separate FIGS. 40 through 42. The associated modified state diagram showing three additional state transitions is shown in FIG. 43. Blocks 1151 and 1152 (FIG. 40) are inserted in the flow chart between blocks 1150 and 1160 (FIG. 28). When no idle multi-line hunt group member is found in block 1150, execution proceeds to decision block 1151 and a determination is made of whether the present execution of the routing program is during the stand-alone mode of operation of a remote switching module included in a cluster of such modules. If so, execution proceeds to decision block 1152 and a determination is made of whether a variable JUMPS is equal to three. The variable JUMPS is used to store the number of jumps between remote switching modules that have been completed when hunting a global group. In the present embodiment, there are four remote switching modules 501 through 504 in the cluster, so at most three jumps are required to complete hunting. If a negative decision is made in block 1151 or if affirmative decisions are made in both blocks 1151 and 1152, execution proceeds to block 1160, the MLGBUSY state is entered and the call fails. However, an affirmative decision in block 1151 followed by a negative decision in block 1152 results in a branch to block 1400 (FIG. 29) and the SWITCH state 3015 (FIG. 43) is entered. The variable SWREQ is stored in RDBLK defining the MLGPREHUNT state 3005 (FIG. 43) as the program state to be entered by the next routing system process. Execution proceeds from block 1400 (FIG. 29) to block 1190 (FIG. 41) and the INTEGRITY state 3012 (FIG. 43) is entered. (FIG. 41 represents program modifications which replace block 1190 of FIG. 29 with the blocks 1190 through 1197 of FIG. 41.) From block 1190, a decision block 1191 is reached wherein a determination is again made of whether the present execution is in a cluster of remote switching modules in stand-alone operation. If so, execution proceeds to a decision block 1193 and a determination is made of whether routing is to be continued in another module to complete the hunting of a global group. If a negative decision is made in either of the blocks 1191 or 1193, execution proceeds to block 1192 and the next processor is determined and its operational status verified in the normal manner. However, affirmative decisions in blocks 1191 and 1193 result in the execution of block 1194. During block 1194, the CLIDAT relation is read using CLID as the key. In the present example, the module attributes MOD1, MOD2, MOD3, and MOD4 of the relevant tuple define the hunt sequence of modules 501, 502, 503 and 504. A determination is also made of whether the next module in the sequence is presently operational. If the next module is not operational, a subsequent operational module not previously hunted is selected. For example, if execution is presently in module 503 and module 504 is not operational, hunting is instead continued in module 501, if module 501 has not been hunted previously. From block 1194, execution proceeds to a decision block 1195 and a determination is made of whether an operational processor is found during block 1194. If not, execution proceeds to block 1196 and the call fails. However, if an operational processor is found in block 1194, execution proceeds from block 1195 to block 1197 and the variable JUMPS is incremented accordingly. For example, if the next processor in the sequence is operational, the variable JUMPS is incremented by one. If the next processor is not operational, but the following processor in the sequence is, the variable JUMPS is incremented by two. The variable JUMPS is never incremented to exceed three. Execution proceeds from either block 1192 or block 1197 to blocks 1200, 1210, 1220 and 1230 as before. As shown in FIG. 38, the variable JUMPS is stored in the RDBLK data structure. When hunting is continued, the variable JUMPS is included in the RTCONTDA field of the RTGEN message transmitted to the subsequent module.

Figure 26:
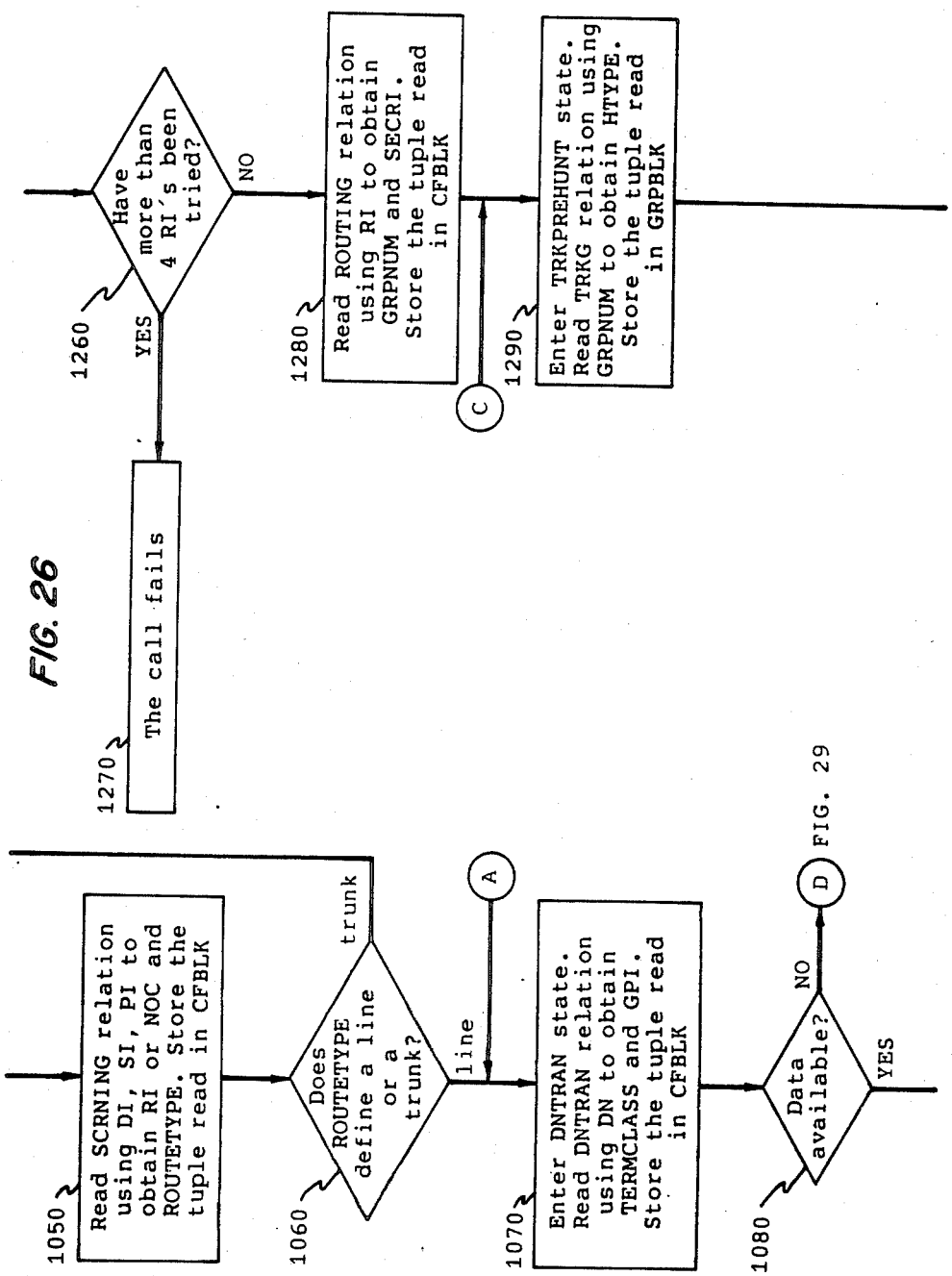
Figure 27:
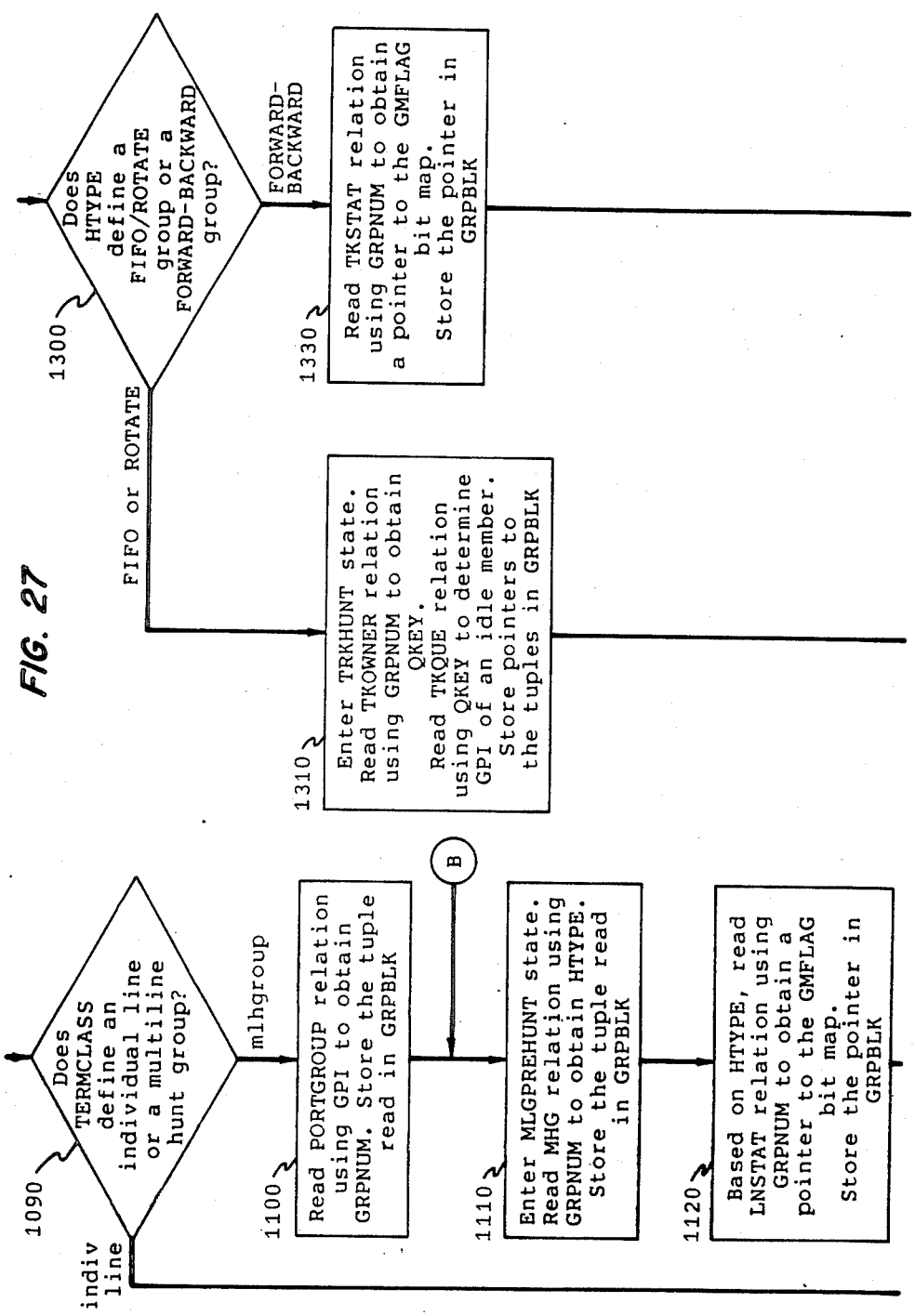

In an analogous manner to that described above with respect to multi-line hunt groups, blocks 1261 and 1262 (FIG. 42) are inserted between block 1260 and 1270 (FIG. 26) to allow for the continuation of hunting of trunk groups. Recall that the initial route index RI obtained by reading either the FIXEDRI or SCRNING relations was stored in the CFBLK in either block 1240 (FIG. 25) or block 1050 (FIG. 26). That stored route index is included in the RTCONTDA field of the RTGEN message transmitted to continue hunting of a trunk group such that the hunting can begin with that same initial route index in the subsequent module. Routing resumes in the next module in the ROUTING state 3008 (FIG. 43). This is indicated in the flow chart of FIG. 42 by the additional alternative of branching from block 1410 to block 1250 when trunk group hunting is being continued. (In the embodiment of System III being described, each trunk group is associated with a secondary route index SECRI. In an alternate embodiment of System III, it is possible that certain trunk groups do not have an associated secondary route index. In the routing program for the alternate embodiment, additional program steps are inserted between blocks 1370 and 1380 of the routing program of FIG. 28, to effect a jump to another module when hunting of a trunk group is unsuccessful in one module and the trunk group has no secondary route index.)

Recall that the tuple read from the PORTGROUP relation in block 1100 (FIG. 27) is stored in GRPBLK for calls to multi-line hunt groups. The MEMBER attribute of that tuple is used to define where the hunting of a given group begins. In the above-described example, the directory number of subscriber set 528 (member 1 of multi-line hunt group A) was dialed and accordingly the hunting of multi-line hunt group A should begin with member 1. The starting member number is included in the RTCONTDA field of the RTGEN message transmitted to continue hunting of a multi-line hunt group such that the hunting can begin with the same member in the subsequent module.

When the cluster of remote switching modules 501 through 504 is operating in stand-alone mode, each module 501 through 504 is continually monitoring its control channels to host system 800 to detect a resumption of control communication. When control communication is detected by all four modules 501 through 504, the normal mode of operation is resumed, the dynamic hunt data in central control 30 is updated to reflect the present status of all global group members on the cluster of remote switching modules 501 through 504, and the control of global multi-port hunt groups is returned again to central control 30. The tuples for global groups are then removed from the dynamic relations (LNSTAT, TKSTAT, TKNOWNER, TKQUE) in the remote switching modules 501 through 504.

It is to be understood that the above-described embodiment is merely illustrative of the principles of the present invention and that many variations may be devised by those skilled in the art without departing from the spirit and scope of the invention.

What is claimed is:

1. In a distributed call processing system for use in a switching system having a plurality of ports including at least one multi-port hunt group, said call processing systen comprising a plurality of control units each associated with a subset of said plurality of ports and each storing hunt data defining the busy/idle status of any ports of said hunt group that are associated with said each control unit, a method of processing a call to said hunt group comprising the steps of:
(A) a first one of said control units accessing its hunt data in response to said call to determine whether any port of said hunt group is defined as idle,
(B) upon determining no idle port in said step (A), said first control unit transmitting a message to a second one of said control units defining said call, and
(C) said second control unit accessing its hunt data in response to said message to determine whether any port of said hunt group is defined as idle.

2. A method in accordance with claim 1 further comprising the steps of:
(D) upon determining an idle port in said step (C), said second control unit assigning said determined idle port to receive said call.

3. A method in accordance with claim 2 further comprising the step of:
(E) said second control unit updating its hunt data to define said assigned port as busy.

4. A method in accordance with claim 3 further comprising the steps of:
(F) said second control unit detecting a status change from busy to idle at said assigned port and
(G) said second control unit updating its hunt data to define said assigned port as idle.

5. In a distributed call processing system for use in a switching system having a plurality of ports including at least one multi-port hunt group, said call processing system comprising a plurality of control units each associated with a subset of said plurality of ports, said each control unit storing hunt data defining the busy/idle status of any ports of said hunt group that are associated with said each control unit, and said each control unit also storing reference data defining one of the other ones of said control units, a method of processing a call to said hunt group comprising the steps of:
(A) one of said control units accessing its hunt data in response to said call to determine whether any port of said group is defined as idle,
(B) upon determining no idle port in said step (A), said one of said control units transmitting a message defining said call to said hunt group to the other one of said control units defined by said reference data of said one of said control units, and
(C) successive ones of said control units executing said steps (A) and (B) in response to messages defining said call until an idle port is determined during an execution of said step (A).

6. A method in accordance with claim 5 further comprising the step of:
(D) when a given one of said control units determines an idle port during an execution of said step (A), said given control unit assigning said determined idle port to receive said call.

7. A method in accordance with claim 6 further comprising the step of:
(E) said given control unit updating its hunt data to define said assigned port as busy.

8. A method in accordance with claim 7 further comprising the steps of:
(F) said given control unit detecting a status change from busy to idle at said assigned port and
(G) said given control unit updating its hunt data to define said assigned port as idle.

9. A method in accordance with claim 5 wherein each of said plurality of control units executes said steps (A) and (B) at most once in processing said call.

10. In a distributed call processing system for use in a switching system having a plurality of ports including at least one multi-port hunt group, said call processing system being operative in two modes and comprising a plurality of distributed control units each associated with a subset of said plurality of ports, said call processing system further comprising a central control storing hunt data defining the busy/idle status of each port of said hunt group when said call processing system is operating in a first one of said modes, and each of said distributed control units storing hunt data defining the busy/idle status of any ports of said hunt group associated with said each distributed control unit when said call processing system is operating in a second one of said modes, a method of processing a call to said hunt group comprising the steps of:
(A) when said call processing system is operating in said first mode, said central control accessing its hunt data in response to said call to determine whether any port of said group is defined as idle,
(B) upon determining an idle port in said step (A), said central control assigning said idle port determined in said step (A) to receive said call,
(C) when said call processing system is operating in said second mode, one of said distributed control units accessing its hunt data in response to said call to determine whether any port of said hunt group is defined as idle,
(D) upon determining no idle port in said step (C), said one of said distributed control units transmitting a message to one of the other ones of said distributed control units defining said call, and
(E) successive ones of said distributed control units executing said steps (C) and (D) in response to messages defining said call until an idle port is determined during an execution of said step (C).

11. A method in accordance with claim 10 further comprising the steps of:
(F) when a given one of said distributed control units determines an idle port during an execution of said step (C), said given distributed control unit assigning said determined idle port to receive said call.

12. A method in accordance with claim 10 wherein each of said distributed control units stores reference data defining one of the other ones of said distributed control units and said step (D) comprises the steps of:
(D1) upon determining no idle port in said step (C), said one of said distributed control units accessing its reference data to determine the other one of said distributed control units defined thereby and
(D2) said one of said distributed control units transmitting a message defining said call to said hunt group, to the other one of said distributed control units determined in said step (D1).

13. A method in accordance with claim 10 wherein each of said plurality of distributed control units executes said steps (C) and (D) at most once in processing said call.

14. A distributed control switching system having a plurality of ports including a multi-port hunt group, said switching system comprising a plurality of control units each for controlling the establishment of calls from a subset of said plurality of ports associated with said each control unit, the ports of said group being associated with more than one of said control units, said each control unit comprising means for storing hunt data for said group defining the busy/idle status of each port of said group that is associated with said each control unit, and said each control unit further comprising means responsive both to calls to said group from ports associated with said each control unit and to messages from other ones of said control units defining calls to said group, for accessing the hunt data stored by the storing means of said each control unit, means for determining whether any port of said group is defined by said accessed hunt data as idle, means responsive to a determination of an idle port by said determining means for assigning said determined idle port to receive a call to said group, and means responsive to a determination of no idle port by said determining means for transmitting a message defining a call to said group to one of the other ones of said control units.

15. A distributed control switching system in accordance with claim 14 wherein said each control unit further comprises
means for effecting a transmission of an alerting signal to said assigned port.

16. A distributed control switching system in accordance with claim 14 wherein said each control unit further comprises
means for updating the hunt data of said each control unit to define said assigned port as busy.

17. A distributed control switching system in accordance with claim 16 wherein said each control unit further comprises
means for detecting a status change from busy to idle at said assigned port and means for updating the hunt data of said each control unit to define said assigned port as idle.

18. A distributed control switching system having a plurality of ports including a multi-port hunt group, said switching system comprising
   a plurality of control units each for controlling the establishment of calls from a subset of said plurality of ports associated with said each control unit, the ports of said group being associated with more than one of said control units,
   said each control unit comprising means for storing hunt data for said group defining the busy/idle status of each port of said group that is associated with said each control unit, and for storing reference data defining one of the other ones of said control units, and
   said each control unit further comprising means responsive both to calls to said group from ports associated with said each control unit and to messages from other ones of said control unit defining calls to said group, for accessing the hunt data stored by the storing means of said each control unit, means for determining whether any port of said group is defined by said accessed hunt data as idle, means responsive to a determination of an idle port of said determining means for assigning said determined idle port to receive a call to said group, means responsive to a determination of no idle port by said determining means for accessing the reference data stored by the storing means of said each control unit, and means for transmitting a message defining a call to said group to the control unit defined by said accessed reference data.

19. A distributed control switching system in accordance with claim 18 wherein said each control unit further comprises
   means for effecting a transmission of an alerting signal to said assigned port.

20. A distributed control switching system in accordance with claim 18 wherein said each control unit further comprises
   means for updating the hunt data of said each control unit to define said assigned port as busy.

21. A distributed control switching system in accordance with claim 20 wherein said each control unit further comprises
   means for detecting a status change from busy to idle at said assigned port and
   means for updating the hunt data of said each control unit to define said assigned port as idle.

* * * * *